(12) United States Patent
Kawaguchi et al.

(10) Patent No.: US 10,936,128 B2
(45) Date of Patent: Mar. 2, 2021

(54) SENSOR DEVICE, INPUT DEVICE, AND ELECTRONIC APPARATUS

(71) Applicant: Sony Corporation, Tokyo (JP)

(72) Inventors: Hiroto Kawaguchi, Kanagawa (JP); Shogo Shinkai, Kanagawa (JP); Kei Tsukamoto, Kanagawa (JP); Tomoko Katsuhara, Kanagawa (JP); Hayato Hasegawa, Kanagawa (JP); Fumihiko Iida, Kanagawa (JP); Takayuki Tanaka, Kanagawa (JP); Tomoaki Suzuki, Kanagawa (JP); Taizo Nishimura, Kanagawa (JP); Hiroshi Mizuno, Kanagawa (JP); Yasuyuki Abe, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/550,934

(22) Filed: Aug. 26, 2019

(65) Prior Publication Data

US 2020/0097106 A1   Mar. 26, 2020

Related U.S. Application Data

(60) Continuation of application No. 15/964,688, filed on Sep. 1, 2017, now abandoned, which is a division of
(Continued)

(30) Foreign Application Priority Data

Feb. 12, 2013  (JP) .................................. 2013-024941
Sep. 5, 2013   (JP) .................................. 2013-184402

(51) Int. Cl.
*G06F 3/044*   (2006.01)
*G06F 3/041*   (2006.01)
*G06F 3/047*   (2006.01)

(52) U.S. Cl.
CPC .............. *G06F 3/044* (2013.01); *G06F 3/047* (2013.01); *G06F 3/0414* (2013.01);
(Continued)

(58) Field of Classification Search
CPC ........ G06F 3/044; G06F 3/047; G06F 3/0414; G06F 2203/04102; G06F 2203/04103; G06F 2203/04106
See application file for complete search history.

(56) References Cited

U.S. PATENT DOCUMENTS 4,687,885 A   8/1987   Talmage, Jr. et al.
5,561,326 A   10/1996  Ito et al.
(Continued)

FOREIGN PATENT DOCUMENTS

EP   1 840 714 A1   10/2007
EP   2 544 081 A2   1/2013
(Continued)

OTHER PUBLICATIONS

U.S. Appl. No. 12/940,309, filed Nov. 5, 2010, Honda et al.
(Continued)

*Primary Examiner* — Mark W Regn
(74) *Attorney, Agent, or Firm* — Wolf, Greenfield & Sacks, P.C.

(57) ABSTRACT

The sensor device includes a first conductive layer, a second conductive layer, an electrode substrate, a first support, and a second support. The first conductive layer is formed to be deformable sheet-shaped. The second conductive layer is disposed to be opposed to the first conductive layer. The electrode substrate includes multiple first electrode wires and multiple second electrode wires and is disposed to be deformable between the first conductive layer and the second conductive layer, the multiple second electrode wires being disposed to be opposed to the multiple first electrode
(Continued)

US 10,936,128 B2

Page 2 wires and intersecting with the multiple first electrode wires. The first support includes multiple first structures, the multiple first structures connecting the first conductive layer and the electrode substrate. The second support includes multiple second structures, the multiple second structures connecting the second conductive layer and the electrode substrate.

20 Claims, 47 Drawing Sheets

Related U.S. Application Data application No. 14/763,657, filed as application No. PCT/JP2013/007186 on Dec. 6, 2013, now Pat. No. 9,785,297.

(52) U.S. Cl.
CPC ............ *G06F 2203/04102* (2013.01); *G06F 2203/04103* (2013.01); *G06F 2203/04106* (2013.01)

(56) References Cited

U.S. PATENT DOCUMENTS

| | | |
|---|---|---|
| 5,815,141 A | 9/1998 | Phares |
| 6,094,981 A | 8/2000 | Hochstein |
| 6,708,564 B2 | 3/2004 | Ishikawa et al. |
| 6,979,873 B2 | 12/2005 | Fujii |
| 7,249,509 B2 | 7/2007 | Hirano |
| 7,513,154 B2 | 4/2009 | Ino |
| 7,603,903 B2 | 10/2009 | Ohta |
| 8,063,886 B2 | 11/2011 | Serban et al. |
| 8,225,660 B2 | 7/2012 | Sakai et al. |
| 8,256,288 B2 | 9/2012 | Matsunaga |
| 8,826,734 B2 | 9/2014 | Ohkoshi et al. |
| 8,913,031 B2 | 12/2014 | Honda et al. |
| 9,310,200 B2 | 4/2016 | Kabasawa et al. |
| 9,664,947 B2 | 5/2017 | Kawaura |
| 9,760,183 B2 | 9/2017 | Kawaguchi et al. |
| 9,785,297 B2 | 10/2017 | Kawaguchi et al. |
| 9,811,226 B2 | 11/2017 | Itaya et al. |
| 10,055,067 B2 | 8/2018 | Shinkai et al. |
| 10,115,543 B2 | 10/2018 | Katsuhara et al. |
| 10,282,041 B2 | 5/2019 | Shinkai et al. |
| 2003/0127308 A1 | 7/2003 | Chen et al. |
| 2003/0154787 A1 | 8/2003 | Yoshiuchi et al. |
| 2004/0096594 A1 | 5/2004 | Takeuchi et al. |
| 2005/0217373 A1 | 10/2005 | Ishikawa et al. |
| 2006/0147701 A1 | 7/2006 | Lockridge |
| 2007/0044557 A1 | 3/2007 | Takemasa et al. |
| 2007/0074914 A1* | 4/2007 | Geaghan ............... G06F 3/044 178/18.06 |
| 2007/0229464 A1 | 10/2007 | Hotelling et al. |
| 2008/0180585 A1 | 7/2008 | Kubota et al. |
| 2008/0202251 A1 | 8/2008 | Serban et al. |
| 2009/0122026 A1 | 5/2009 | Oh |
| 2009/0135162 A1 | 5/2009 | Van De Wijdeven et al. |
| 2009/0231305 A1 | 9/2009 | Hotelling et al. |
| 2009/0243817 A1* | 10/2009 | Son ....................... G06F 3/0414 340/407.2 |
| 2009/0256825 A1 | 10/2009 | Klinghult et al. |
| 2010/0026659 A1 | 2/2010 | Long et al. |
| 2010/0307242 A1 | 12/2010 | Sakai et al. |
| 2011/0025631 A1* | 2/2011 | Han ....................... G06F 3/044 345/173 |
| 2011/0032211 A1 | 2/2011 | Christoffersen |
| 2011/0069036 A1 | 3/2011 | Anno |
| 2011/0074728 A1 | 3/2011 | Liu |
| 2011/0090175 A1 | 4/2011 | Mamba et al. |
| 2011/0115738 A1 | 5/2011 | Suzuki et al. |
| 2011/0175845 A1* | 7/2011 | Honda .................. G06F 3/0414 345/174 |
| 2011/0181548 A1 | 7/2011 | Sekiguchi |
| 2011/0212661 A1 | 9/2011 | Lee et al. |
| 2011/0240989 A1 | 10/2011 | Sekine et al. |
| 2012/0038583 A1 | 2/2012 | Westhues et al. |
| 2012/0070614 A1 | 3/2012 | Takahashi et al. |
| 2012/0086666 A1 | 4/2012 | Badaye et al. |
| 2012/0098783 A1 | 4/2012 | Badaye et al. |
| 2012/0098788 A1* | 4/2012 | Sekiguchi ............... G06F 3/044 345/174 |
| 2012/0113071 A1 | 5/2012 | Kawaguchi et al. |
| 2012/0169625 A1 | 7/2012 | Fan et al. |
| 2012/0218221 A1 | 8/2012 | Igeta |
| 2012/0235953 A1 | 9/2012 | Kim et al. |
| 2012/0298497 A1 | 11/2012 | Maeda et al. |
| 2012/0319974 A1* | 12/2012 | Kim ....................... G06F 3/044 345/173 |
| 2013/0033450 A1 | 2/2013 | Coulson et al. |
| 2013/0076994 A1 | 3/2013 | Kawaura |
| 2013/0234734 A1 | 9/2013 | Iida et al. |
| 2014/0007682 A1 | 1/2014 | Kabasawa et al. |
| 2014/0210490 A1 | 7/2014 | Hayakawa et al. |
| 2014/0299360 A1 | 10/2014 | Yoshida |
| 2015/0212633 A1 | 7/2015 | Yamagishi et al. |
| 2015/0241908 A1 | 8/2015 | Ozyilmaz et al. |
| 2015/0270076 A1 | 9/2015 | Katsuhara et al. |
| 2015/0277626 A1 | 10/2015 | Shinkai et al. |
| 2015/0280708 A1 | 10/2015 | Goto et al. |
| 2015/0346839 A1 | 12/2015 | Kawaguchi et al. |
| 2015/0363023 A1 | 12/2015 | Kawaguchi et al. |
| 2016/0011691 A1 | 1/2016 | Shinkai et al. |
| 2016/0023444 A1 | 1/2016 | Uejukkoku et al. |
| 2016/0026297 A1 | 1/2016 | Shinkai et al. |
| 2016/0188039 A1 | 6/2016 | Yoon et al. |
| 2016/0202800 A1 | 7/2016 | Itaya et al. |
| 2016/0294388 A1 | 10/2016 | Kawaguchi et al. |
| 2017/0364182 A1 | 12/2017 | Kawaguchi et al. |
| 2018/0088709 A1 | 3/2018 | Itaya et al. |

FOREIGN PATENT DOCUMENTS

| | | |
|---|---|---|
| JP | 63-121219 A | 5/1988 |
| JP | 03-020832 A | 2/1991 |
| JP | 04-125722 A | 4/1992 |
| JP | 2007-272898 A | 10/2007 |
| JP | 2008-181438 A | 8/2008 |
| JP | 2009-123106 A | 6/2009 |
| JP | 2009-169523 A | 7/2009 |
| JP | 2009-211531 A | 9/2009 |
| JP | 2011-065515 A | 3/2011 |
| JP | 2011-154512 A | 8/2011 |
| JP | 2011-170659 A | 9/2011 |
| JP | 2011-175528 A | 9/2011 |
| JP | 2012-133580 A | 7/2012 |
| JP | 2012-178093 A | 9/2012 |
| JP | 2013-015976 A | 1/2013 |
| JP | 2013-105275 A | 5/2013 |
| WO | WO 97/040482 A1 | 10/1997 |
| WO | WO 2012/024254 A1 | 2/2012 |
| WO | WO 2012/050875 A1 | 4/2012 |
| WO | WO 2012/051342 A1 | 4/2012 |
| WO | WO 2013/132736 A1 | 9/2013 |
| WO | WO 2014/125539 A1 | 8/2014 |

OTHER PUBLICATIONS

U.S. Appl. No. 13/069,669, filed Mar. 23, 2011, Sekine et al.
U.S. Appl. No. 13/286,487, filed Nov. 1, 2011, Kawaguchi et al.
U.S. Appl. No. 13/608,048, filed Sep. 10, 2012, Kawaura.
U.S. Appl. No. 13/927,299, filed Jun. 26, 2013, Kabasawa et al.
U.S. Appl. No. 14/644,666, filed Mar. 11, 2015, Katsuhara et al.
U.S. Appl. No. 14/661,368, filed Mar. 18, 2015, Shinkai et al.
U.S. Appl. No. 14/665,063, filed Mar. 23, 2015, Goto et al.
U.S. Appl. No. 14/759,667, filed Jul. 8, 2015, Kawaguchi et al.
U.S. Appl. No. 14/763,657, filed Jul. 27, 2015, Kawaguchi et al.
U.S. Appl. No. 14/771,918, filed Sep. 1, 2015, Shinkai et al.
U.S. Appl. No. 14/774,732, filed Sep. 11, 2015, Shinkai et al.
U.S. Appl. No. 14/777,776, filed Sep. 17, 2015, Kawaguchi.

(56) References Cited

OTHER PUBLICATIONS

U.S. Appl. No. 14/914,405, filed Feb. 25, 2016, Itaya et al.
U.S. Appl. No. 15/694,688, filed Sep. 1, 2017, Kawaguchi et al.
U.S. Appl. No. 15/784,108, filed Oct. 14, 2017, Itaya et al.
U.S. Appl. No. 16/043,756, filed Jul. 24, 2018, Itaya et al.
Japanese Office Action dated Oct. 18, 2016 in connection with Japanese Application No. 2013-187049.
European Office Action dated Jan. 11, 2017 in connection with European Application No. 14759066.5.
International Search Report and Written Opinion dated Oct. 20, 2014 in connection with International Application No. PCT/JP2014/004330.
International Search Report and Written Opinion and English translation thereof dated Mar. 11, 2014 in connection with International Application No. PCT/JP2013/007186.
International Preliminary Report on Patentability and English translation thereof dated Aug. 27, 2015 in connection with International Application No. PCT/JP2013/007186.
International Search Report and Written Opinion and English translation thereof dated May 13, 2014 in connection with International Application No. PCT/JP2014/000628.
International Preliminary Report on Patentability and English translation thereof dated Sep. 24, 2015 in connection with International Application No. PCT/JP2014/000628.
International Search Report and Written Opinion and English translation thereof dated May 20, 2014 in connection with International Application No. PCT/JP2014/000632.
International Preliminary Report on Patentability and English translation thereof dated Oct. 1, 2015 in connection with International Application No. PCT/JP2014/000632.
International Preliminary Report on Patentability dated Mar. 24, 2016 in connection with International Application No. PCT/JP2014/004330.
Indian Examination Report dated Jul. 28, 2020 in connection with Indian Application No. 6916/DELNP/2015.

* cited by examiner

SENSOR DEVICE, INPUT DEVICE, AND ELECTRONIC APPARATUS

CROSS REFERENCES TO RELATED APPLICATIONS

This application claims the benefit under 35 U.S.C. § 120 as a continuation of U.S. patent application Ser. No. 15/694,688, titled "SENSOR DEVICE, INPUT DEVICE, AND ELECTRONIC APPARATUS," filed on Sep. 1, 2017, which is a divisional of U.S. patent application Ser. No. 14/763,657, titled "SENSOR DEVICE, INPUT DEVICE, AND ELECTRONIC APPARATUS," filed on Jul. 27, 2015, which is the National Stage of International Application No. PCT/JP2013/007186, filed in the Japanese Patent Office as a Receiving Office on Dec. 6, 2013, which claims the priority benefit of Japanese Patent Application Number JP2013-184402, filed in the Japanese Patent Office on Sep. 5, 2013, and Japanese Patent Application Number JP2013-024941, filed in the Japanese Patent Office on Feb. 12, 2013, each of which is hereby incorporated by reference in its entirety.

TECHNICAL FIELD

The present technology relates to a sensor device, an input device, and an electronic apparatus that are capable of electrostatically detecting an input operation.

BACKGROUND ART

As a sensor device for an electronic apparatus, for example, there is known a configuration including a capacitive element and being capable of detecting an operation position and a pressing force of an operating element with respect to an input operation surface (see, for example, Patent Document 1).

Patent Document 1: Japanese Patent Application Laid-open No. 2011-170659

SUMMARY OF INVENTION

Problem to be Solved by the Invention

In recent years, an input method with a high degree of freedom has been performed by a gesture operation using the movement of fingers. Moreover, if a pressing force on an operation surface can be stably detected with high accuracy, a greater diversity of input operations are expected to be achieved.

In view of the circumstances as described above, it is an object of the present technology to provide a sensor device, an input device, and an electronic apparatus that are capable of highly accurately detecting an operation position and a pressing force.

Means for Solving the Problem

In order to achieve the object described above, according to an embodiment of the present technology, there is provided a sensor device including a first conductive layer, a second conductive layer, an electrode substrate, a first support, and a second support.

The first conductive layer is formed to be deformable sheet-shaped.

The second conductive layer is disposed to be opposed to the first conductive layer.

The electrode substrate includes multiple first electrode wires and multiple second electrode wires, the multiple second electrode wires being disposed to be opposed to the multiple first electrode wires and intersecting with the multiple first electrode wires, the electrode substrate being disposed to be deformable between the first conductive layer and the second conductive layer and being capable of electrostatically detecting a change in distance from each of the first conductive layer and the second conductive layer.

The first support includes multiple first structures and a first space portion, the multiple first structures connecting the first conductive layer and the electrode substrate, the first space portion being formed between the multiple first structures.

The second support includes multiple second structures and a second space portion, the multiple second structures being each disposed between the first structures adjacent to each other and connecting the second conductive layer and the electrode substrate, the second space portion being formed between the multiple second structures.

According to the sensor device, a relative distance between each of the first and second conductive layers and the electrode substrate changes when the sensor device is pressed from above the first conductive layer. Based on the change in distance, an input operation such as a press can be electrostatically detected. Therefore, the amount of capacitance change with respect to the input operation can be increased, and detection sensitivity can be enhanced. This makes it possible to detect not only a conscious pressing operation but also a minute pressing force when a contact operation is made, and thus the sensor device can also be used as a touch sensor.

Further, since the sensor device does not have a configuration in which an operating element and each electrode wire of the electrode substrate is directly capacitively coupled, but performs an input operation via the first conductive layer, even in the case of using a gloved finger or an operating element such as a fine-tipped stylus, the input operation can be detected with high accuracy.

The electrode substrate may further include multiple detection portions, each of the multiple detection portions being formed in each of intersection regions of the multiple first electrode wires and the multiple second electrode wires and having a capacitance variable in accordance with a relative distance from each of the first conductive layer and the second conductive layer.

This allows a detection of an input operation in a so-called mutual capacitance system in which detection is performed based on the amount of capacitance change between the first and second electrode wires. Therefore, simultaneous detection at two or more positions in a multi-touch operation is easy to perform.

The multiple detection portions may be formed to be opposed to the multiple first structures.

With this, in the case where the first structure is displaced to the second conductive layer side by an input operation from above the first conductive layer, the detection portion opposed to this first structure is also displaced to the second conductive layer side accordingly. Therefore, a relative distance between the detection portion and the second conductive layer can be easily changed, and detection sensitivity can be improved.

Alternatively, the multiple detection portions may be formed to be opposed to the multiple second structures.

Due to the configuration described above, the second structure and the detection portion are each opposed to the first space portion. This allows a relative distance between the first conductive layer and the detection portion to be easily changed via the first space portion, and detection sensitivity can be improved.

The first support may include a first frame, the first frame connecting the first conductive layer and the electrode substrate and being disposed along a circumferential edge of the electrode substrate, and the second support may include a second frame, the second frame connecting the second conductive layer and the electrode substrate and being disposed to be opposed to the first frame.

The first and second frames reinforce the circumferential portion of the entire sensor device, so that the strength of the sensor device is improved and handling performance can be enhanced.

Further, the second conductive layer may include a step portion.

This can enhance the rigidity of the second conductive layer and the strength of the entire sensor device.

Further, in the sensor device according to one embodiment of the present technology, the second structure is not limited to be disposed between the first structures adjacent to each other. For example, the first structures and the second structures may be disposed to be opposed to each other.

With this, a region in which the first structures and the second structures are disposed to be opposed to (overlap) each other is difficult to deform, and thus is a region having low detection sensitivity. This allows detection sensitivity in the sensor device to be controlled and the degree of freedom of the device configuration to be enhanced.

Moreover, the electrode substrate is not limited to a configuration to electrostatically detect a change in distance from each of the first conductive layer and the second conductive layer. For example, a change in distance from each of the operating element made of a conductor and the second conductive layer may be electrostatically detected.

Further, the first support is not limited to a configuration including the first space portion. Gaps between the multiple first structures may be filled with an elastic material or the like.

Alternatively, the second support is not limited to a configuration including the second space portion. Gaps between the multiple second structures may be filled with an elastic material or the like.

Further, each of the multiple first electrode wires may include multiple first unit electrode bodies, the multiple first unit electrode bodies each including multiple first sub-electrodes, each of the multiple second electrode wires may include multiple second unit electrode bodies, the multiple second unit electrode bodies each including multiple second sub-electrodes and being opposed to the multiple first unit electrode bodies, and the electrode substrate may include a base material, the multiple first electrode wires and the multiple second electrode wires being disposed on the base material, and multiple detection portions in which the multiple first sub-electrodes of each of the first unit electrode bodies and the multiple second sub-electrodes of each of the second unit electrode bodies are opposed to each other in an in-plane direction of the electrode substrate.

With this, the first electrode wires and the second electrode wires are opposed to each other in the in-plane direction of the electrode substrate, to be capacitively coupled. This makes it possible to make the electrode substrate thinner and achieve downsizing of the entire sensor device. Moreover, since the multiple first and second sub-electrodes form the detection portions, the amounts of capacitive coupling of the detection portions can be enhanced, and detection sensitivity as a sensor device can be enhanced.

According to an embodiment of the present technology, there is provided an input device including an operation member, a first conductive layer (conductive layer), an electrode substrate, a first support, and a second support.

The operation member is deformable sheet-shaped and includes a first surface and a second surface, the first surface receiving an operation by a user, the second surface being on the opposite side to the first surface.

The first conductive layer is disposed to be opposed to the second surface.

The electrode substrate includes multiple first electrode wires and multiple second electrode wires, the multiple second electrode wires being disposed to be opposed to the multiple first electrode wires and intersecting with the multiple first electrode wires, the electrode substrate being disposed to be deformable between the operation member and the conductive layer and being capable of electrostatically detecting a change in distance from the first conductive layer.

The first support includes multiple first structures and a first space portion, the multiple first structures connecting the operation member and the electrode substrate, the first space portion being formed between the multiple first structures.

The second support includes multiple second structures and a second space portion, the multiple second structures being each disposed between the first structures adjacent to each other and connecting the conductive layer and the electrode substrate, the second space portion being formed between the multiple second structures.

According to the input device, a relative distance between each of the operation member and the conductive layer and the electrode substrate changes when the input device is pressed from above the operation member. Based on the change in distance, an input operation such as a press can be electrostatically detected. Therefore, the amount of capacitance change based on the input operation can be increased, and detection sensitivity can be enhanced. This allows the input device to detect not only a conscious pressing operation but also a minute pressing force when a contact operation is made, and thus to be used as an input device including a touch sensor.

The operation member may further include a second conductive layer that is formed on the second surface.

The detection substrate may be capable of electrostatically detecting a change in distance from each of the first conductive layer and the second conductive layer.

This allows an input operation to be performed via a metal film, not by a configuration in which an operating element and each electrode wire of the electrode substrate is directly capacitively coupled, and thus even in the case of using a gloved finger or an operating element such as a fine-tipped stylus, an input operation can be detected with high accuracy.

Moreover, the operation member may include a display unit.

As described above, the input device does not have a configuration in which the operating element and each electrode wire of the electrode substrate are directly capacitively coupled, and thus even in the case where a display unit including a conductive material is disposed between the electrode substrate and the operating element, an input operation can be detected with high accuracy. In other words, a configuration in which a sensor device is disposed on the back surface of the display unit can be provided, and deterioration in display quality of the display unit can be suppressed.

The operation member may include multiple key regions.

This allows the input device to be applied as a keyboard device.

Further, the electrode substrate may further include multiple detection portions, each of the multiple detection portions being formed in each of intersection regions of the multiple first electrode wires and the multiple second electrode wires and having a capacitance variable in accordance with a relative distance from the conductive layer.

Moreover, the input device may further include a control unit that is electrically connected to the electrode substrate and is capable of generating information on an input operation with respect to each of the multiple key regions based on outputs of the multiple detection portions.

This allows the input device to perform, by the control unit, control corresponding to a key region on which an input operation is made.

The multiple first structures may be disposed along boundaries between the multiple key regions.

This can provide a configuration in which the key regions are opposed to the first space portion. Therefore, the input operation in the key region can easily change a distance between the operation member and the electrode substrate, and detection sensitivity of the input operation can be enhanced.

Further, the multiple first electrode wires may be flat-plate-shaped electrodes and may be disposed on the operation member side relative to the multiple second electrode wires, and each of the multiple second electrode wires may include multiple electrode groups.

With this, the first electrode wires are connected to the ground to function as an electromagnetic shield. Therefore, without a configuration of a metal film or the like formed on the operation member, it is possible to suppress intrusion of electromagnetic waves from the outside of the electrode substrate, for example, and to enhance the reliability of detection sensitivity.

Further, in the input device according to one embodiment of the present technology, the second structure is not limited to be disposed between the first structures adjacent to each other. For example, the first structures and the second structures may be disposed to be opposed to each other in the thickness direction of the input device.

Moreover, the electrode substrate is not limited to a configuration to electrostatically detect a change in distance from each of the first conductive layer and the second conductive layer. For example, a change in distance from each of the operating element made of a conductor and the second conductive layer may be electrostatically detected.

Further, the first support is not limited to a configuration including the first space portion. Gaps between the multiple first structures may be filled with an elastic material or the like. Alternatively, the second support is not limited to a configuration including the second space portion. Gaps between the multiple second structures may be filled with an elastic material or the like.

According to an embodiment of the present technology, there is provided an input device including an operation member, a back plate, an electrode substrate, a first support, and a second support.

The operation member is deformable sheet-shaped and includes a first surface, a second surface, and a conductive layer, the first surface receiving an operation by a user, the second surface being on the opposite side to the first surface, the conductive layer being formed on the second surface.

The back plate is disposed to be opposed to the second surface.

The electrode substrate includes multiple first electrode wires and multiple second electrode wires and is disposed to be deformable between the operation member and the back plate, the multiple second electrode wires being disposed to be opposed to the multiple first electrode wires and intersecting with the multiple first electrode wires.

The first support includes multiple first structures, the multiple first structures connecting the operation member and the electrode substrate.

The second support includes multiple second structures, the multiple second structures connecting the back plate and the electrode substrate.

Further, the multiple second electrode wires may be flat-plate-shaped electrodes and may be disposed on the back plate side relative to the multiple first electrode wires, and each of the multiple first electrode wires may include multiple electrode groups.

With this, the second electrode wires are connected to the ground to function as an electromagnetic shield. Therefore, if the back plate is not a conductor, it is possible to suppress intrusion of electromagnetic waves from the outside of the electrode substrate, for example, and to enhance the reliability of detection sensitivity.

According to an embodiment of the present technology, there is provided an electronic apparatus including an operation member, a conductive layer, an electrode substrate, a first support, a second support, and a controller.

The operation member is deformable sheet-shaped and includes a first surface and a second surface, the first surface receiving an operation by a user, the second surface being on the opposite side to the first surface.

The conductive layer is disposed to be opposed to the second surface.

The electrode substrate includes multiple first electrode wires and multiple second electrode wires, the multiple second electrode wires being disposed to be opposed to the multiple first electrode wires and intersecting with the multiple first electrode wires, the electrode substrate being disposed to be deformable between the operation member and the conductive layer and being capable of electrostatically detecting a change in distance from the conductive layer.

The first support includes multiple first structures and a first space portion, the multiple first structures connecting the operation member and the electrode substrate, the first space portion being formed between the multiple first structures.

The second support includes multiple second structures and a second space portion, the multiple second structures being each disposed between the first structures adjacent to each other and connecting the conductive layer and the electrode substrate, the second space portion being formed between the multiple second structures.

The controller includes a control unit that is electrically connected to the electrode substrate and is capable of generating information on an input operation with respect to each of the multiple operation members based on an output of the electrode substrate.

Effect of the Invention

As described above, according to the present technology, it is possible to highly accurately detect an operation position and a pressing force.

MODE(S) FOR CARRYING OUT THE INVENTION

Hereinafter, embodiments of the present technology will be described with reference to the drawings.

First Embodiment

Figure 1:
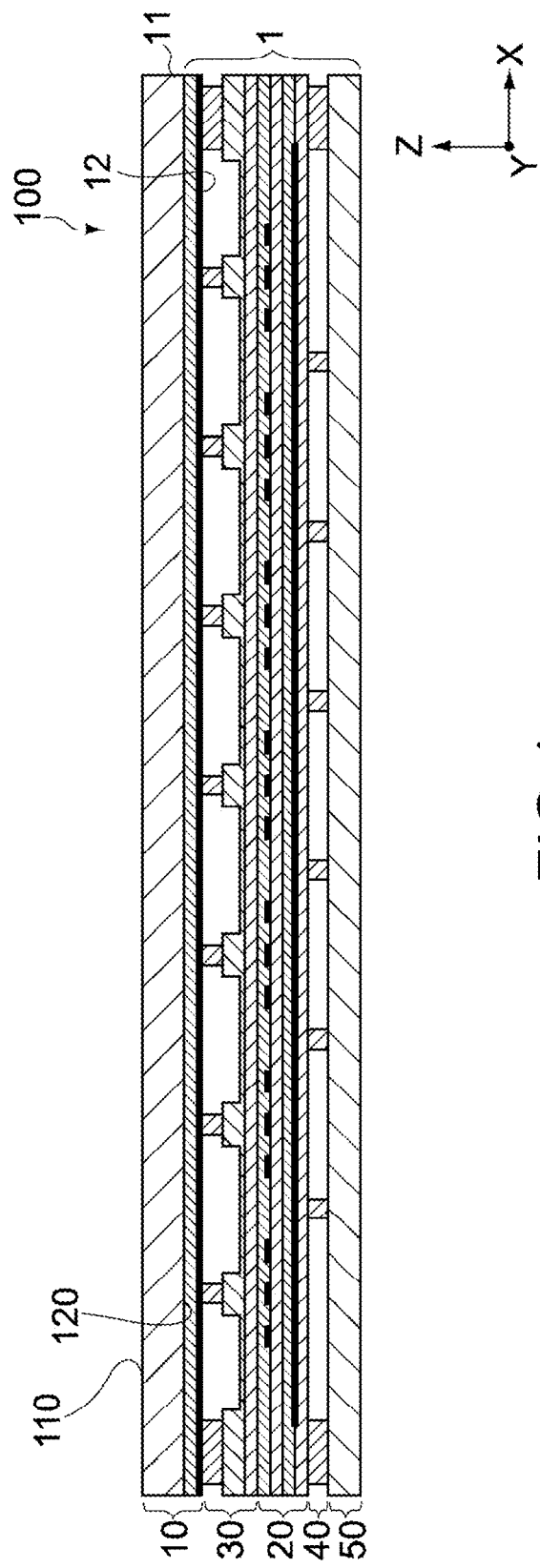
FIG. 1 A schematic cross-sectional view of an input device according to a first embodiment of the present technology.
Figure 2:
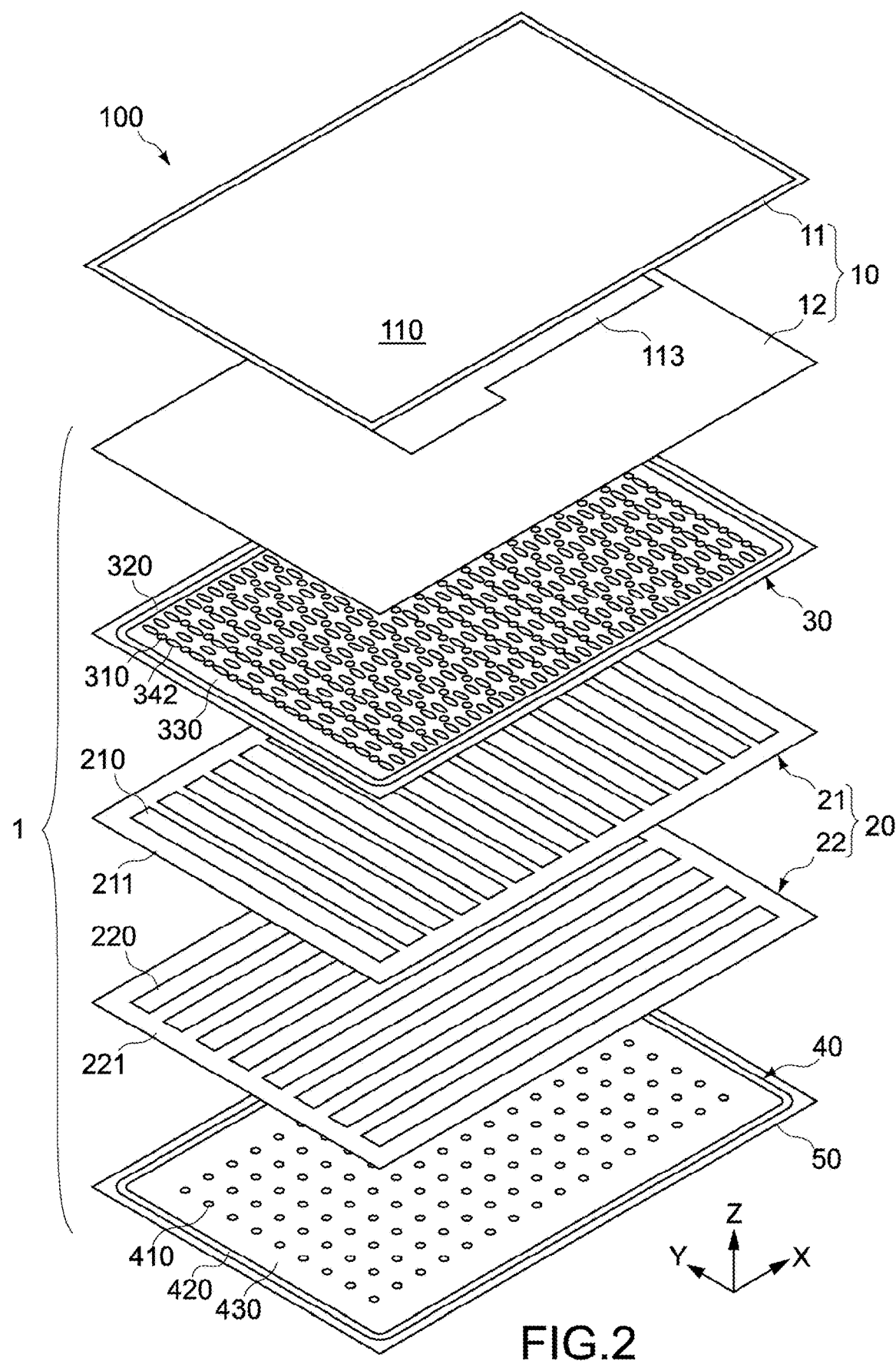
FIG. 2 An exploded perspective view of the input device.
Figure 3:
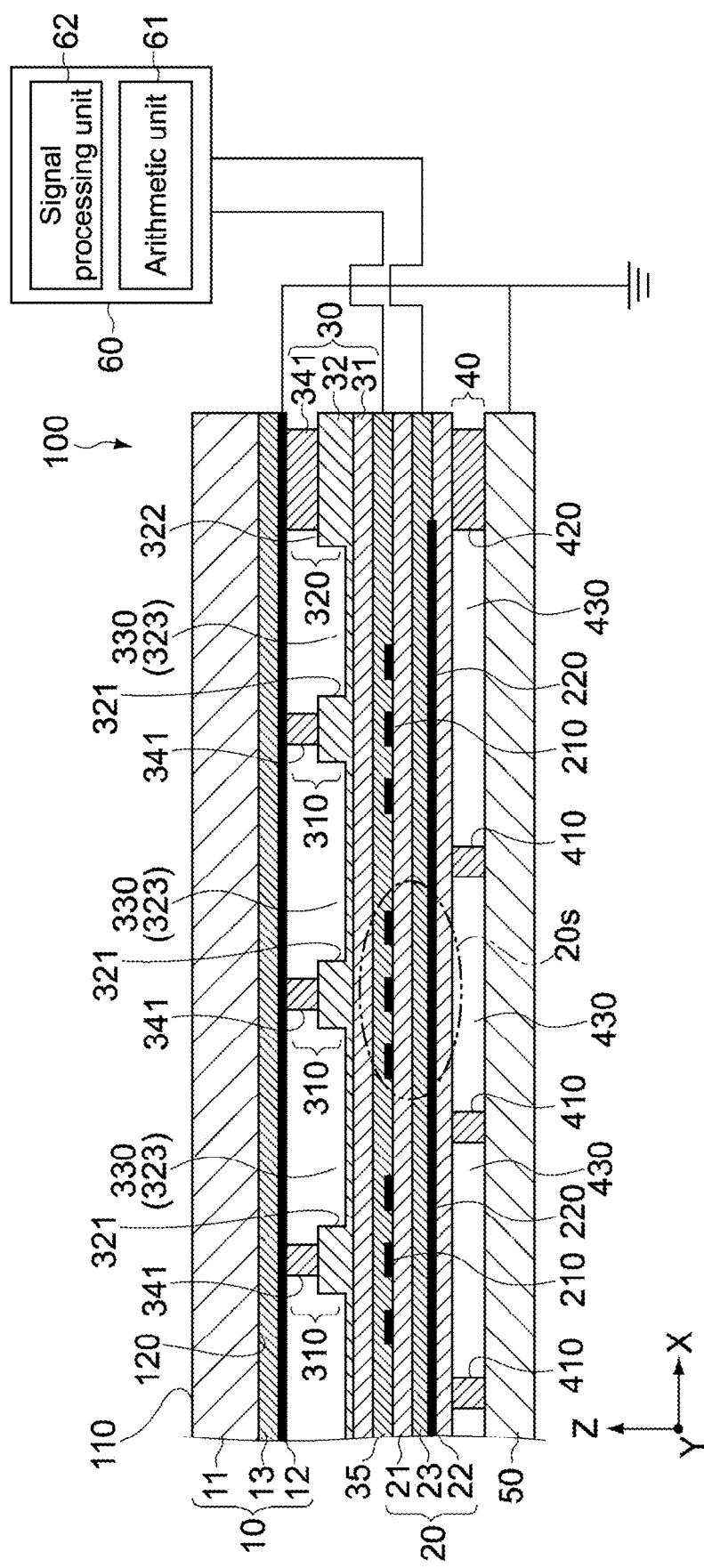
FIG. 3 A schematic cross-sectional view of a main part of the input device.
Figure 4:
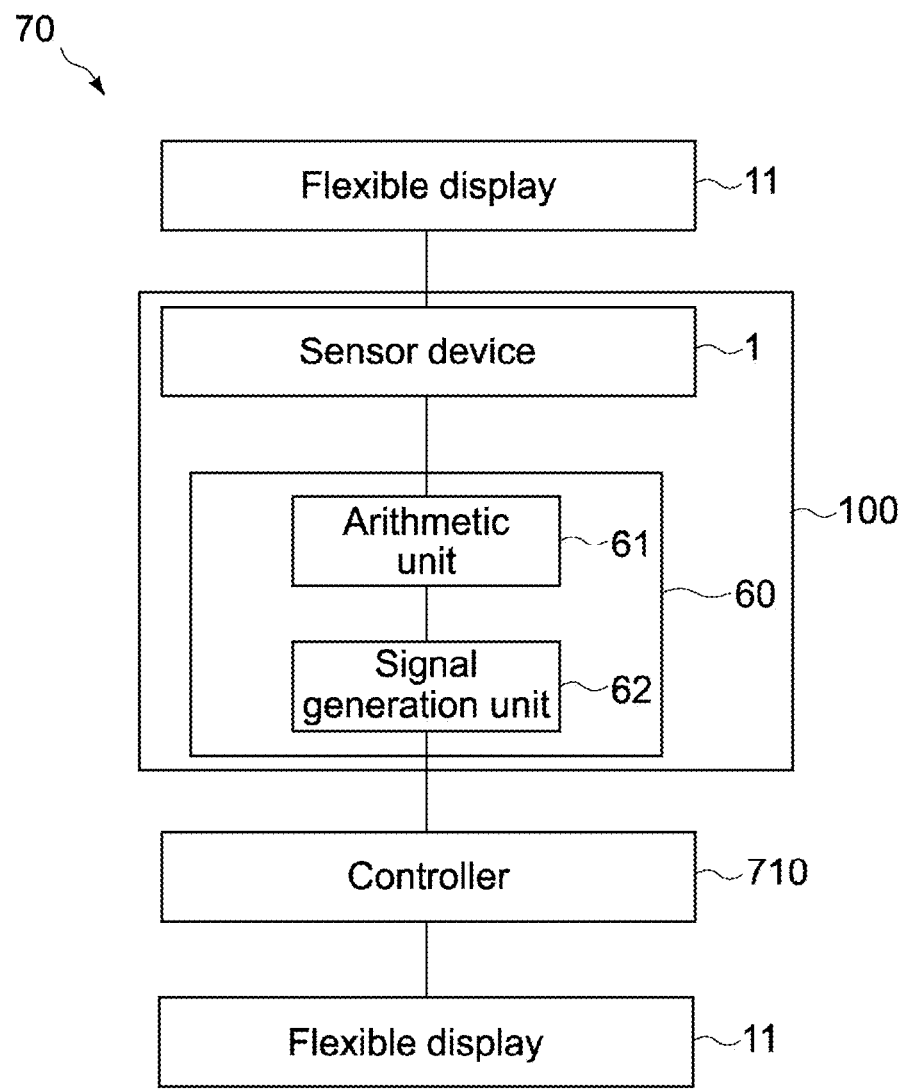
FIG. 4 A block diagram of an electronic apparatus using the input device.

FIG. 1 is a schematic cross-sectional view of an input device 100 according to a first embodiment of the present technology. FIG. 2 is an exploded perspective view of the input device 100. FIG. 3 is a schematic cross-sectional view of a main part of the input device 100. FIG. 4 is a block diagram of an electronic apparatus 70 using the input device 100. Hereinafter, a configuration of the input device 100 of this embodiment will be described. It should be noted that in the figures, an X axis and a Y axis represent directions orthogonal to each other (in-plane direction of the input device 100), and a Z axis represents a direction orthogonal to the X axis and the Y axis (thickness direction or vertical direction of the input device 100).

[Input Device]

The input device 100 includes a flexible display (display unit) 11 that receives an operation by a user and a sensor device 1 that detects the operation of the user. The input device 100 is formed as a flexible touch panel display, for example, and is incorporated into an electronic apparatus 70 that will be described later. The sensor device 1 and the flexible display 11 each have a flat-plate shape that extends in a direction perpendicular to the Z axis.

The flexible display 11 includes a first surface 110 and a second surface 120 on the opposite side to the first surface 110. The flexible display 11 has a function as an input operation unit and a function as a display unit in the input device 100. In other words, the flexible display 11 causes the first surface 110 to function as an input operation surface and a display surface and displays an image corresponding to an operation by the user from the first surface 110 upward in a Z-axis direction. On the first surface 110, an image corresponding to a keyboard, a GUI (Graphical User Interface), and the like are displayed. Examples of an operating element that performs an operation with respect to the flexible display 11 include a finger f shown in FIG. 16B and a stylus s shown in FIG. 16A.

A specific configuration of the flexible display 11 is not particularly limited. For example, as the flexible display 11, a so-called electronic paper, an organic EL (electroluminescence) panel, an inorganic EL panel, a liquid crystal panel, or the like can be adopted. Additionally, the thickness of the flexible display 11 is also not particularly limited, and is approximately 0.1 mm to 1 mm, for example.

The sensor device 1 includes a metal film (first conductive layer or second conductive layer) 12, a conductive layer (second conductive layer or first conductive layer) 50, an electrode substrate 20, a first support 30, and a second support 40. The sensor device 1 is disposed on the second surface 120 side of the flexible display 11.

The metal film 12 is formed to have a deformable sheet shape. The conductive layer 50 is disposed to be opposed to the metal film 12. The electrode substrate 20 includes multiple first electrode wires 210 and multiple second electrode wires 220. The multiple second electrode wires 220 are disposed to be opposed to the multiple first electrode wires 210 and intersect with the multiple first electrode wires 210. The electrode substrate 20 is disposed to be deformable between the metal film 12 and the conductive layer 50 and is capable of electrostatically detecting a change in distance from each of the metal film 12 and the conductive layer 50. The first support 30 includes multiple first structures 310 and a first space portion 330. The multiple first structures 310 connect the metal film 12 and the electrode substrate 20. The first space portion 330 is formed between the multiple first structures 310. The second support 40 includes multiple second structures 410 and a second space portion 430. The multiple second structures 410 are disposed between the multiple first structures 310 adjacent to each other and connect the conductive layer 50 and the electrode substrate 20. The second space portion 430 is formed between the multiple second structures 410.

The sensor device 1 (input device 100) according to this embodiment electrostatically detects changes in distance between the metal film 12 and the electrode substrate 20 and between the conductive layer 50 and the electrode substrate 20 due to an input operation on the first surface 110 of the flexible display 11, to detect the input operation. The input operation is not limited to a conscious press (push) operation on the first surface 110 and may be a contact (touch) operation thereon. In other words, as will be described later, the input device 100 is capable of detecting even a minute pressing force (for example, approximately several 10 g) that is applied by a general touch operation, and is thus configured so as to enable a touch operation similar to that of a normal touch sensor.

The input device 100 includes a control unit 60. The control unit 60 includes an arithmetic unit 61 and a signal generation unit 62. The arithmetic unit 61 detects an operation by a user based on a capacitance change of a detection portion 20s. The signal generation unit 62 generates an operation signal based on a result of the detection by the arithmetic unit 61.

The electronic apparatus 70 shown in FIG. 4 includes a controller 710. The controller 710 performs processing based on the operation signal generated by the signal generation unit 62 of the input device 100. The operation signal processed by the controller 710 is output, as an image signal, for example, to the flexible display 11. The flexible display 11 is connected to a drive circuit via a flexible wiring substrate 113 (see FIG. 2), the drive circuit being mounted in the controller 710. The drive circuit may be mounted on the wiring substrate 113.

The flexible display 11 is formed as a part of an operation member 10 of the input device 100 in this embodiment. In other words, the input device 100 includes the operation member 10, the electrode substrate 20, the first support 30, the second support 40, and the conductive layer 50. Hereinafter, those elements will be described.

(Operation Member)

The operation member 10 has a laminate structure of the flexible display 11 and the metal film 12, the flexible display 11 including the first surface 110 and the second surface 120. In other words, the operation member 10 includes the first surface 110 and the second surface 120 and is formed to have a deformable sheet shape. The first surface 110 receives an operation by a user. The second surface 120 is the opposite side to the first surface 110 and is provided with the metal film 12.

The metal film 12 is formed to have a sheet shape that is deformable following the deformation of the flexible display 11. The metal film 12 is formed of a mesh material or metal foil that is made of, for example, Cu (copper), Al (aluminum), or steel use stainless (SUS). The thickness of the metal film 12 is not particularly limited and is several 10 nm to several 10 μm, for example. The metal film 12 is connected to a ground potential, for example. The metal film only needs to function as a conductive layer, and is not limited to metal. For example, the metal film may be an oxide conductor such as ITO (indium tin oxide) or an organic conductor such as carbon nanotube. This allows the metal film 12 to exert a function as an electromagnetic shield layer when mounted in the electronic apparatus 70. In other words, it is possible to suppress intrusion of electromagnetic waves from other electronic components mounted in the electronic apparatus 70 and leakage of electromagnetic waves from the input device 100, for example, and contribute to operation stability as the electronic apparatus 70. It should be noted that the metal film 12 may include multiple layers each connected to the ground potential (see FIG. 7). This can strengthen the function as the electromagnetic shield layer.

For example, as shown in FIG. 3, a viscous adhesion layer 13 on which metal foil is formed is attached to the flexible display 11, thus forming the metal film 12. The material of the adhesion layer 13 is not particularly limited as long as it has viscosity, but may be a resin film to which a resin material is applied. Alternatively, the metal film 12 may be formed of a deposited film, a sputtering film, or the like that is directly formed on the flexible display 11, or may be a coating film of a conductive paste or the like that is printed on the surface of the flexible display 11. Further, a non-conductive film may be formed on the surface of the film metal film 12. Examples of the non-conductive film include a hardcoat layer resistant to scratches and an antioxidant film resistant to corrosion.

(Conductive Layer)

The conductive layer 50 forms the lowermost portion of the input device 100 and is disposed to be opposed to the metal film 12 in the Z-axis direction. The conductive layer 50 also functions as, for example, a support plate of the input device 100 and is formed so as to have a higher bending rigidity than that of the operation member 10 and the electrode substrate 20, for example. The conductive layer 50 may be formed of a metal plate including, for example, an Al alloy, an Mg (magnesium) alloy, or other metal materials or may be formed of a conductive plate made of a carbon-fiber-reinforced plastic or the like. Alternatively, the conductive layer 50 may have a laminate structure in which a conductive film such as a plating film, a deposited film, a sputtering film, and metal foil is formed on an insulating layer made of a plastic material or the like. Further, the thickness of the conductive layer 50 is not particularly limited and is approximately 0.3 mm, for example.

Figure 5:
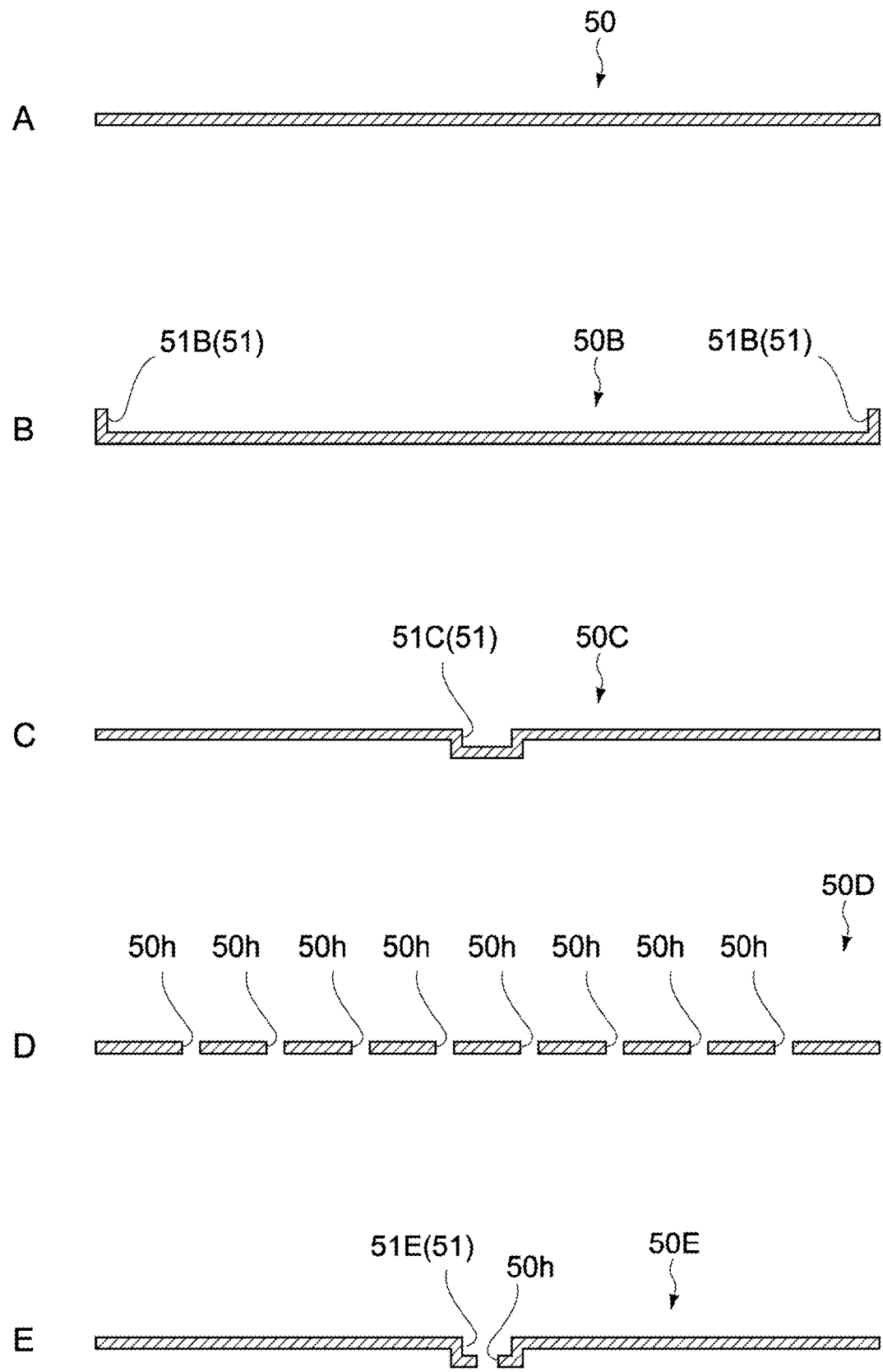
FIG. 5 A schematic cross-sectional view showing configuration examples of a conductive layer of the input device.

FIG. 5A to E is a schematic cross-sectional view showing configuration examples of the conductive layer 50. The conductive layer 50 is not limited to an example formed into a flat-plate shape as shown in FIG. 5A and may include step portions 51 shown in FIGS. 5B, C, and E. Alternatively, the conductive layer 50 may be formed into a mesh provided with openings 50h.

For example, a conductive layer 50B shown in FIG. 5B includes step portions 51B. The step portions 51B are each formed by bending a circumferential portion upward in the Z-axis direction. Conductive layers 50C shown in FIG. 5C, E include step portions 51C and 51E, respectively. The step portions 51C and 51E are formed at the center portion and recessed downward. Such step portions 51 can enhance bending rigidity of the conductive layer 50 in the Z-axis direction.

Further, conductive layers 50E shown in FIG. 5D, E are provided with one or multiple openings 50h. Providing the openings 50h to the conductive layer 50 in such a manner can enhance radiation performance while maintaining rigidity. Therefore, it is possible to suppress defects of the input device 100 and to enhance reliability. Further, the openings 50h can decrease the volume of the conductive layer 50 and reduce the weight of the input device 100. Furthermore, the openings 50h can facilitate air to flow when the volume of the second space portion 430 is changed by deformation, and thus a response time of the electrode substrate 20 is shortened. Here, the response time refers to time from time when a load applied to the operation member 10 is changed to time when the volume of the sensor device 1 is actually changed.

Examples of the shape of the opening 50h in plan view may include multi-angular shapes such as a triangle and a square, circular shapes, elliptical shapes, oval shapes, indeterminate shapes, and slit-like shapes. Those shapes may be used independently or in combination of two or more of them.

Further, in the case where the conductive layer 50 is provided with the multiple openings 50h, an arrangement pattern of the multiple openings 50h is not particularly limited, but may be a regular pattern, for example. This can make detection sensitivity more uniform. Further, the regular pattern describe above may be a one-dimensional array or a two-dimensional array, and may be mesh-like, for example, as shown in FIG. 5D. Alternatively, the multiple openings 50h may be formed into a stripe shape or may be formed to have a geometric pattern as a whole.

The openings 50h are provided at positions or in regions that are not opposed to any of the multiple second structures 410, for example. In other words, the openings 50h and the second structures 410 are provided to be displaced in an in-plane (in-XY plane) direction so as not to overlap in the Z-axis direction (in the thickness direction of the input device 100). This allows the electrode substrate 20 and the conductive layer 50 to be stably connected to each other via the second structures 410.

The conductive layer 50 is connected to the ground potential, for example. The conductive layer 50 thus exerts the function as an electromagnetic shield layer when mounted in the electronic apparatus 70. In other words, for example, it is possible to suppress intrusion of electromagnetic waves from other electronic components and the like that are mounted in the electronic apparatus 70 and leakage of electromagnetic waves from the input device 100, and contribute to operation stability as the electronic apparatus 70. Further, using the following connection method can enhance the electromagnetic shield function more.

(Method of Connecting Metal Film and Conductive Layer to Ground Potential)

Figure 6:
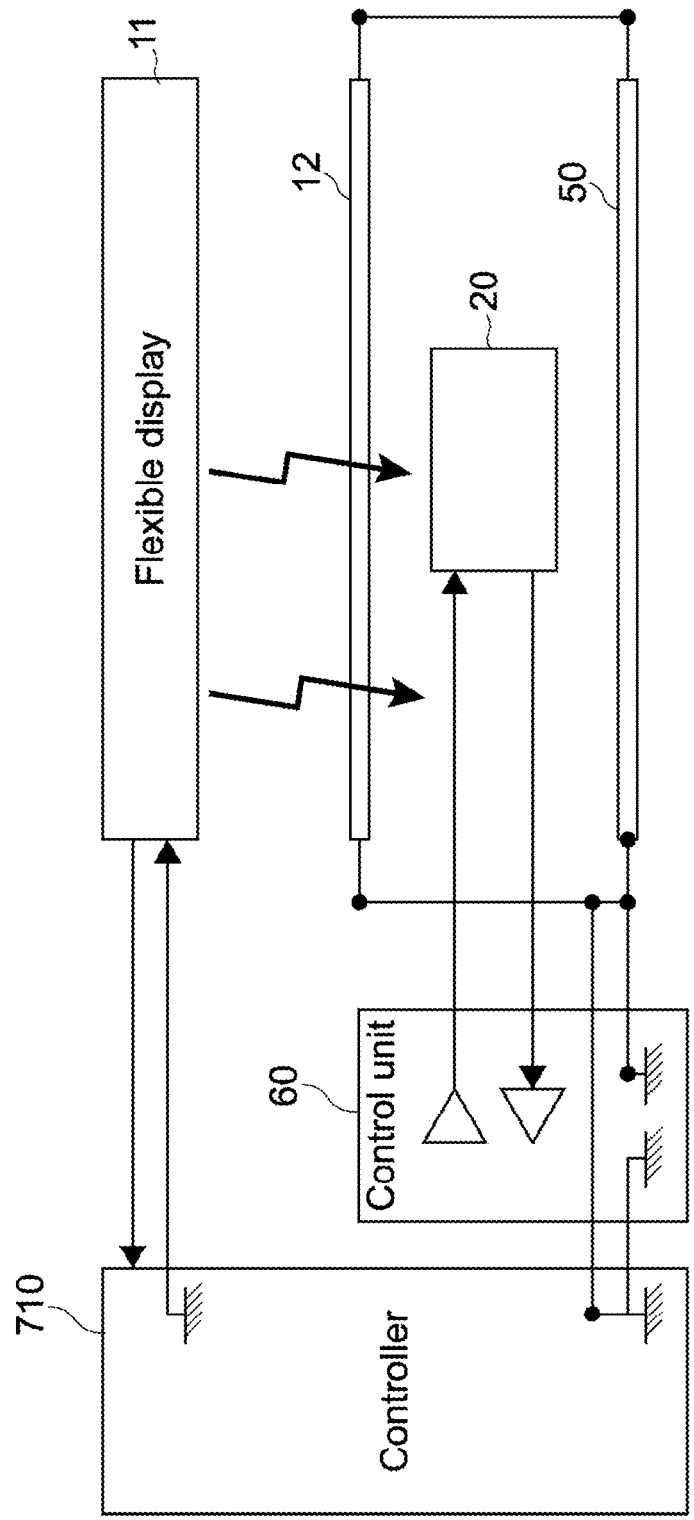
FIG. 6 A schematic view for describing a method of connecting a metal film of the input device and the conductive layer to a ground potential.

FIG. 6 is a schematic view for describing a method of connecting the metal film 12 and the conductive layer 50 to a ground potential. As shown in FIG. 6, the metal film 12 and the conductive layer 50 are connected to, for example, a ground of the control unit 60 of the input device 100 and a ground of the controller 710 of the electronic apparatus 70.

Here, the flexible display 11 is described as an example of a device that has an influence on the detection sensitivity of the sensor device 1. If the metal film 12 and the conductive layer 50 are connected to only the ground of the control unit 60, the flexible display 11 has a possibility of affecting the ground potential of the control unit 60 and inhibiting an electromagnetic shield effect from being sufficiently exerted. In this regard, the metal film 12 and the conductive layer 50 are connected to the ground of the controller 710 to which the flexible display 11 is connected, and thus it is possible to keep the ground potential more stable and enhance the electromagnetic shield effect. Further, as shown in the figure, connecting the metal film 12 and the conductive layer 50 at more contact points can also enhance the electromagnetic shield effect.

Figure 7:
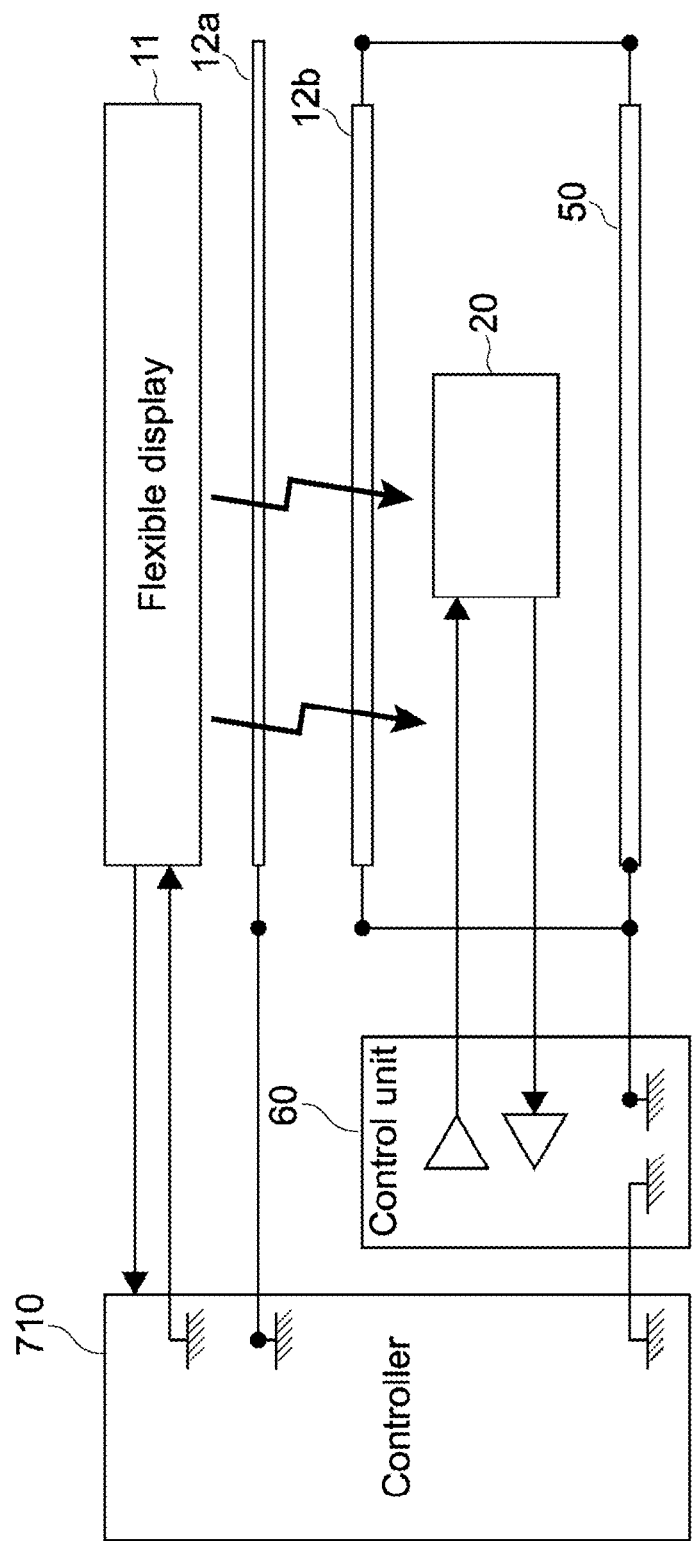
FIG. 7 A schematic view for describing a method of connecting a metal film according to a modified example and the conductive layer to a ground potential.

Alternatively, as shown in FIG. 7, the metal film 12 may be formed of multiple layers. In the example shown in the figure, the metal film 12 includes a first metal film 12a on the flexible display 11 side and a second metal film 12b on the electrode substrate 20 side. This allows the first metal film 12a to be connected to the ground of the controller 710 and the second metal film 12b to be connected to only the control unit 60, for example. Alternatively, the second metal film 12b may be connected to both the control unit 60 and the controller 710. This can also enhance the electromagnetic shield effect.

(Electrode Substrate)

The electrode substrate 20 is formed as a laminate of a first wiring substrate 21 and a second wiring substrate 22. The first wiring substrate 21 includes the first electrode wires 210. The second wiring substrate 22 includes the second electrode wires 220.

The first wiring substrate 21 includes a first base material 211 (see FIG. 2) and the multiple first electrode wires (X electrodes) 210. The first base material 211 is formed of a sheet material having flexibility, for example. Specifically, the first base material 211 is formed of a plastic sheet (film) having electrical insulation property, which is made of PET, PEN, PC, PMMA, polyimide, or the like. The thickness of the first base material 211 is not particularly limited and is several 10 μm to several 100 μm, for example.

The multiple first electrode wires 210 are integrally provided to one surface of the first base material 211. The multiple first electrode wires 210 are arrayed at predetermined intervals along an X-axis direction and formed substantially linearly along a Y-axis direction. The first electrode wires 210 are drawn out to an edge portion and the like of the first base material 211 and connected to respective different terminals. Additionally, the first electrode wires 210 are electrically connected to the control unit 60 via those terminals.

Figure 12:
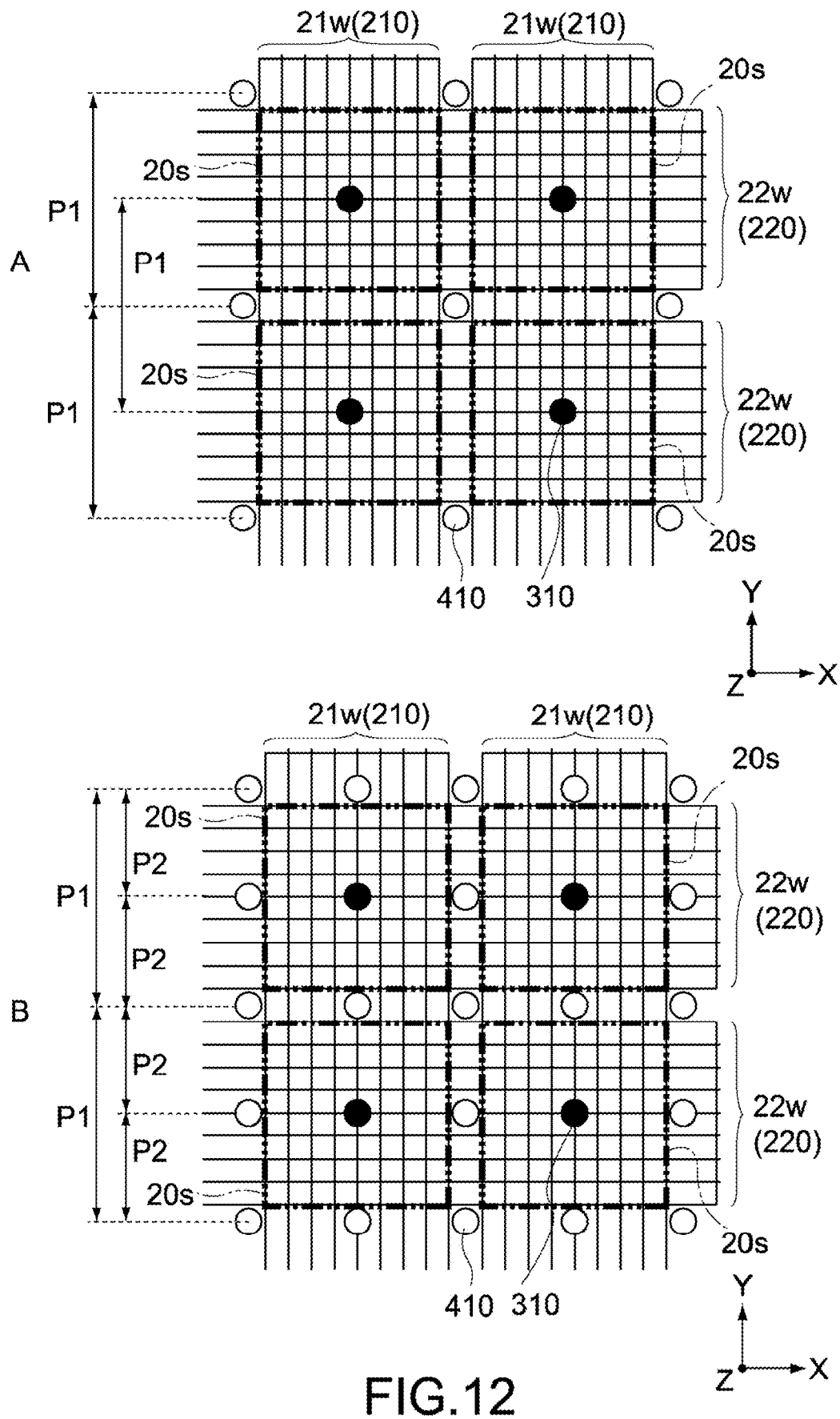
FIG. 12 A schematic plan view showing arrangement examples of first and second structures and first and second electrode wires of the input device.

It should be noted that the multiple first electrode wires 210 may be each formed of a single electrode wire or may be formed of multiple electrode groups 21w arrayed along the X-axis direction (see FIG. 12). Additionally, multiple electrode wires that form each of the electrode groups 21w may be connected to a common terminal or may be connected to two or more different terminals.

On the other hand, the second wiring substrate 22 includes a second base material 221 (see FIG. 2) and the multiple second electrode wires (Y electrodes) 220. The second base material 221 is formed of a sheet material having flexibility, for example, similarly to the first base material 211. Specifically, the second base material 221 is formed of a plastic sheet (film) having electrical insulation property, which is made of PET, PEN, PC, PMMA, polyimide, or the like. The thickness of the second base material 221 is not particularly limited and is several 10 μm to several 100 μm, for example. The second wiring substrate 22 is disposed to be opposed to the first wiring substrate 21.

The multiple second electrode wires 220 are formed similarly to the multiple first electrode wires 210. In other words, the multiple second electrode wires 220 are integrally provided to one surface of the second base material 221, arrayed at predetermined intervals along the Y-axis direction, and formed substantially linearly along the X-axis direction. Additionally, the multiple second electrode wires 220 may be each formed of a single electrode wire or may be formed of multiple electrode groups 22w arrayed along the Y-axis direction (see FIG. 12).

The second electrode wires 220 are drawn out to an edge portion and the like of the second base material 221 and connected to respective different terminals. Multiple electrode wires that form each of the electrode groups 22w may be connected to a common terminal or may be connected to two or more different terminals. Additionally, the second electrode wires 210 are electrically connected to the control unit 60 via those terminals.

The first electrode wires 210 and the second electrode wires 220 may be formed by a method of printing the conductive paste and the like, such as screen printing, gravure offset printing, and ink-jet printing, or may be formed by a patterning method using photolithography technology of metal foil or a metal layer. Additionally, the first and second base materials 211 and 221 are each formed of a sheet having flexibility, and thus the electrode substrate 20 can have flexibility as a whole.

As shown in FIG. 3, the electrode substrate 20 includes an adhesion layer 23 that bonds the first wiring substrate 21 and the second wiring substrate 22 to each other. The adhesion layer 23 has electrical insulation property and is formed of, for example, a hardened material of an adhesive, or a pressure-sensitive material such as a pressure-sensitive tape.

With such a configuration, the first electrode wires 210 are disposed to be opposed to the second electrode wires 220 in the thickness direction of the electrode substrate 20, that is, the Z-axis direction. Additionally, the electrode substrate 20 includes the multiple detection portions 20s that are formed in regions where the first electrode wires 210 and the second electrode wires 220 intersect.

Figure 8:
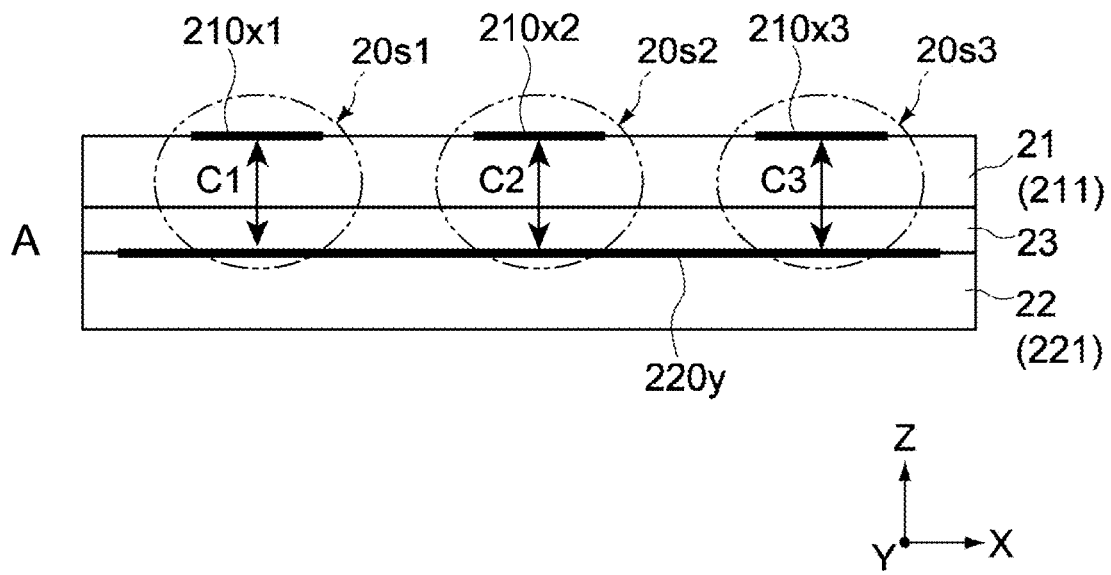
FIG. 8 A schematic cross-sectional view for describing a configuration of a detection portion of the input device.
Figure 8:
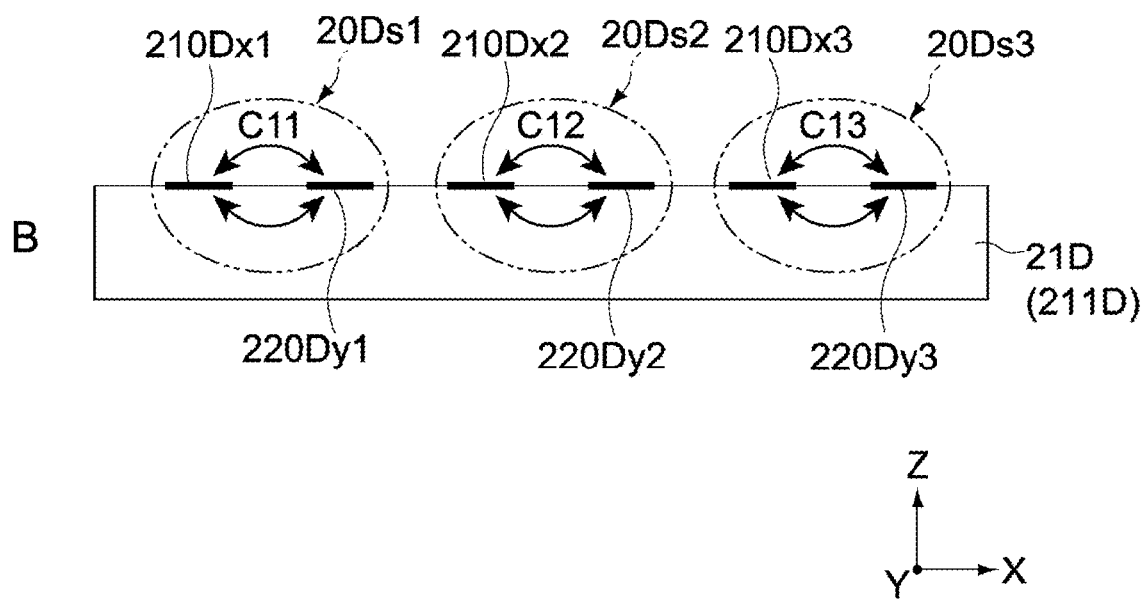

FIG. 8A is a schematic cross-sectional view for describing a configuration of the detection portion 20s. The detection portion 20s is formed of a capacitive element in a mutual capacitance system, the capacitive element including the first electrode wire 210, the second electrode wire 220 opposed to the first electrode wire 210 in the Z-axis direction, and a dielectric layer provided between the first and second electrode wires 210 and 220. It should be noted that in FIGS. 8A and B, the first and second electrode wires 210 and 220 are each assumed to be formed of a single electrode wire.

FIG. 8A shows an example in which the first electrode wires 210 (210x1, 210x2, 210x3) are disposed to be opposed to the second electrode wire 220 (220y) in the Z-axis direction. In the example shown in FIG. 8A, the first wiring substrate 21 and the second wiring substrate 22 are bonded to each other by the adhesion layer 23, and the first base material 211 of the first wiring substrate 21 and the adhesion layer 23 form the dielectric layer described above. In this case, detection portions 20s1, 20s2, and 20s3 are formed at intersection regions where the first electrode wires 210x1, 210x2, and 210x3 and the second electrode wire 220y are capacitively-coupled, respectively. Capacitances C1, C2, and C3 of the detection portions 20s1, 20s2, and 20s3, respectively, are changed in accordance with capacitive coupling between each of the metal film 12 and the conductive layer 50 and the first electrode wires 210x1, 210x2, and 210x3 and the second electrode wire 220y. It should be noted that an initial capacitance of the detection portion 20s is set by, for example, a facing area between the first and second electrode wires 210 and 220, a facing distance between the first and second electrode wires 210 and 220, and a dielectric constant of the adhesion layer 23.

Further, FIG. 8B shows a modified example of the configuration of the detection portions 20s, in which first electrode wires 210D (210Dx1, 210Dx2, and 210Dx3) and second electrode wires 220D (220Dy1, 220Dy2, and 220Dy3) are disposed in the same plane on a first base material 211D and are capacitively-coupled in the XY plane. In this case, the first electrode wires 210D and the second electrode wires 220D are disposed to be opposed to each other in the in-plane direction of the electrode substrate (for example, in the X-axis direction), and for example, the first base material 211D forms a dielectric layer of the detection portions 20Ds (20Ds1, 20Ds2, and 20Ds3). In such an arrangement, capacitances C11, C12, and C13 of the detection portions 20Ds1, 20Ds2, and 20Ds3, respectively, are formed to be variable according to the capacitive coupling between each of the metal film 12 and the conductive layer 50 and the first and second electrode wires 210Dx and 220Dy. Additionally, in the configuration described above, the second base material and the adhesion layer become unnecessary, which can contribute to a reduction in thickness of the input device 100.

In this embodiment, the multiple detection portions 20s are disposed to be opposed to the respective first structures 310, which will be described later, in the Z-axis direction. Alternatively, the multiple detection portions 20s may be disposed to be opposed to the respective second structures 410, which will be described later, in the Z-axis direction. Further, in this embodiment, the first wiring substrate 21 is laminated to be an upper surface of the second wiring substrate 22, but the first wiring substrate 21 is not limited thereto. The second wiring substrate 22 may be laminated to be an upper surface of the first wiring substrate 21.

(Control Unit)

The control unit 60 is electrically connected to the electrode substrate 20. More specifically, the control unit 60 is connected to the multiple first and second electrode wires 210 and 220 via terminals. The control unit 60 forms a signal processing circuit that is capable of generating information on an input operation with respect to the first surface 110 based on output of the multiple detection portions 20s. The control unit 60 acquires the amount of capacitance change of each of the detection portions 20s while scanning the detection portions 20s at predetermined cycles, and generates information on the input operation based on the amount of capacitance change.

The control unit 60 is typically formed of a computer including a CPU/MPU, a memory, and the like. The control unit 60 may be formed of a single chip component or may be formed of multiple circuit components. The control unit 60 may be mounted to the input device 100 or to the electronic apparatus 70 in which the input device 100 is incorporated. In the former case, for example, the control unit 60 is mounted on the flexible wiring substrate connected to the electrode substrate 20. In the latter case, the control unit 60 may be formed integrally with the controller 710 that controls the electronic apparatus 70.

The control unit 60 includes the arithmetic unit 61 and the signal generation unit 62 as described above and executes various functions according to a program stored in a storage unit (not shown). The arithmetic unit 61 calculates an operation position in an XY coordinate system on the first surface 110 based on an electrical signal (input signal) that is output from each of the first and second electrode wires 210 and 220 of the electrode substrate 20. The signal generation unit 62 generates an operation signal based on a result of the calculation. This allows an image, which is based on the input operation on the first surface 110, to be displayed on the flexible display 11.

The arithmetic unit 61 shown in FIGS. 3 and 4 calculates XY coordinates of the operation position on the first surface 110 by the operating element based on an output from each of the detection portions 20s to which unique XY coordinates are assigned. Specifically, the arithmetic unit 61 calculates the amount of capacitance change in each detection portion 20s based on the amount of capacitance change acquired from each of the X electrodes 210 and the Y electrodes 220, each detection portion 20s being formed in the intersection region of each X electrode 210 and each Y electrode 220. Using a ratio of the amount of capacitance change of each detection portion 20s, for example, the XY coordinates of the operation position by the operating element can be calculated.

Additionally, the arithmetic unit 61 can determine whether the first surface 110 is receiving an operation or not. Specifically, for example, in the case where the amount of capacitance change of the whole of the detection portions 20s, the amount of capacitance change of each detection portion 20s, or the like is a predetermined threshold value or more, the arithmetic unit 61 can determine that the first surface 110 is receiving an operation. Further, with two or more threshold values being provided, it is possible to distinguish between a touch operation and a (conscious) push operation for determination, for example. Moreover, a pressing force can also be calculated based on the amount of capacitance change of the detection portion 20s.

The arithmetic unit 61 can output those calculation results to the signal generation unit 62.

The signal generation unit 62 generates a predetermined operation signal based on the calculation results of the arithmetic unit 61. The operation signal may be, for example, an image control signal for generating a displayed image to be output to the flexible display 11, an operation signal corresponding to a key of a keyboard image displayed at the operation position on the flexible display 11, or an operation signal on an operation corresponding to a GUI (Graphical User Interface).

Here, the input device 100 includes the first and second supports 30 and 40 as a configuration to cause a change in distance between each of the metal film 12 and the conductive layer 50 and the electrode substrate 20 (detection portion 20s) by an operation on the first surface 110. Hereinafter, the first and second supports 30 and 40 will be described.

(Basic Configuration of First and Second Supports)

The first support 30 is disposed between the operation member 10 and the electrode substrate 20. The first support 30 includes the multiple first structures 310, a first frame 320, and the first space portion 330. In this embodiment, the first support 30 is bonded to the electrode substrate 20 via an adhesion layer 35 (see FIG. 3). The adhesion layer 35 may be an adhesive or may be formed of a pressure-sensitive material such as a pressure-sensitive adhesive and a pressure-sensitive tape.

As shown in FIG. 3, the first support 30 according to this embodiment includes a laminate structure including a base material 31, a structure layer 32 provided on the surface (upper surface) of the base material 31, and multiple bonding portions 341 formed at predetermined positions on the structure layer 32. The base material 31 is formed of a plastic sheet having electrical insulation property, which is made of PET, PEN, PC, or the like. The thickness of the base material 31 is not particularly limited and is several μm to several 100 μm, for example.

The structure layer 32 is formed of a resin material having electrical insulation property, which is made of a UV resin or the like. The structure layer 32 includes multiple first convex portions 321, a second convex portion 322, and a concave portion 323 on the base material 31. The first convex portions 321 each have a shape such as a columnar shape, a rectangular columnar shape, and a frustum shape protruding in the Z-axis direction, for example, and are arrayed at predetermined intervals on the base material 31. The second convex portion 322 is formed to have a predetermined width so as to surround the circumference of the base material 31.

Additionally, the structure layer 32 is made of a material that has relatively high rigidity and is capable of deforming the electrode substrate 20 by an input operation on the first surface 110, but may be made of an elastic material that is deformable together with the operation member 10 at the time of the input operation. In other words, an elastic modulus of the structure layer 32 is not particularly limited and can be selected as appropriate within a range capable of obtaining a target operational feeling or detection sensitivity.

The concave portion 323 is formed of a flat surface that is formed between the first and second convex portions 321 and 322. In other words, a spatial region above the concave portion 323 forms the first space portion 330. Additionally, above the concave portion 323, in this embodiment, an adhesion prevention layer 342 made of a UV resin or the like having low viscosity is formed (not shown in FIG. 3). The shape of the adhesion prevention layer 342 is not particularly limited and may be an island shape or may be formed in a flat film on the concave portion 323.

Further, the bonding portions 341 each made of a viscous resin material or the like are formed on the respective first and second convex portions 321 and 322. In other words, each of the first structures 310 is formed as a laminate of the first convex portion 321 and the bonding portion 341 formed thereon. Each first frame 320 is formed as a laminate of the second convex portion 322 and the bonding portion 341 formed thereon. This makes the thickness (height) of the first structures 310 and the first frame 320 substantially the same, and the thickness (height) falls within a range of, for example, several μm to several 100 μm in this embodiment. It should be noted that the height of the adhesion prevention layer 342 is not particularly limited as long as the height is lower than the first structures 310 and the first frame 320. For example, the height of the adhesion prevention layer 342 is formed to be lower than the first and second convex portions 321 and 322.

The multiple first structures 310 are disposed to correspond to the arrangement of the detection portions 20s. In this embodiment, the multiple first structures 310 are disposed to be opposed to the multiple detection portions 20s in the Z-axis direction, for example.

On the other hand, the first frame 320 is formed so as to surround the circumference of the first support 30 along the circumferential edge of the electrode substrate 20. The length in a short-side direction, that is, the width of the first frame 320 is not particularly limited as long as the strength of the first support 30 and the entire input device 100 can be sufficiently ensured.

On the other hand, the second support 40 is disposed between the electrode substrate 20 and the conductive layer 50. The second support 40 includes the multiple second structures 410, a second frame 420, and the second space portion 430.

As shown in FIG. 3, the second support 40 according to this embodiment includes the second structures 410 and the second frame 420 that are formed directly on the conductive layer 50. The second structures 410 and the second frame 420 are each made of an insulating resin material having viscosity, for example, and also have function of bonding portions that bond the conductive layer 50 and the electrode substrate 20. The thickness of the second structures 410 and the second frame 420 is not particularly limited and is several μm to several 100 μm, for example.

The second structures 410 are each disposed between the first structures 310 adjacent to each other. In other words, the second structures 410 are disposed to correspond to the arrangement of the detection portions 20s, and in this embodiment, disposed between the detection portions 20s adjacent to each other. On the other hand, the second frame 420 is formed so as to surround the circumference of the second support 40 along the circumferential edge of the conductive layer 50. The width of the second frame 420 is not particularly limited as long as the strength of the second support 40 and the entire input device 100 can be sufficiently ensured. For example, the width is formed to have a width substantially the same as that of the first frame 320.

Additionally, in the second structures 410, the elastic modulus is not particularly limited as in the structure layer 32 that forms the first structures 310. In other words, the elastic modulus can be selected as appropriate within a range capable of obtaining a target operational feeling or detection sensitivity, and the second structures 410 may be made of an elastic material that is deformable together with the electrode substrate 20 at the time of the input operation.

Further, the second space portion 430 is formed between the second structures 410 and form a spatial region around the second structures 410 and the second frame 420. In this embodiment, the second space portion 430 houses the detection portions 20s and the first structures 310 when viewed in the Z-axis direction.

The first and second supports 30 and 40 configured as described above are formed as follows.

(Method of Forming First and Second Supports)

Figure 9:
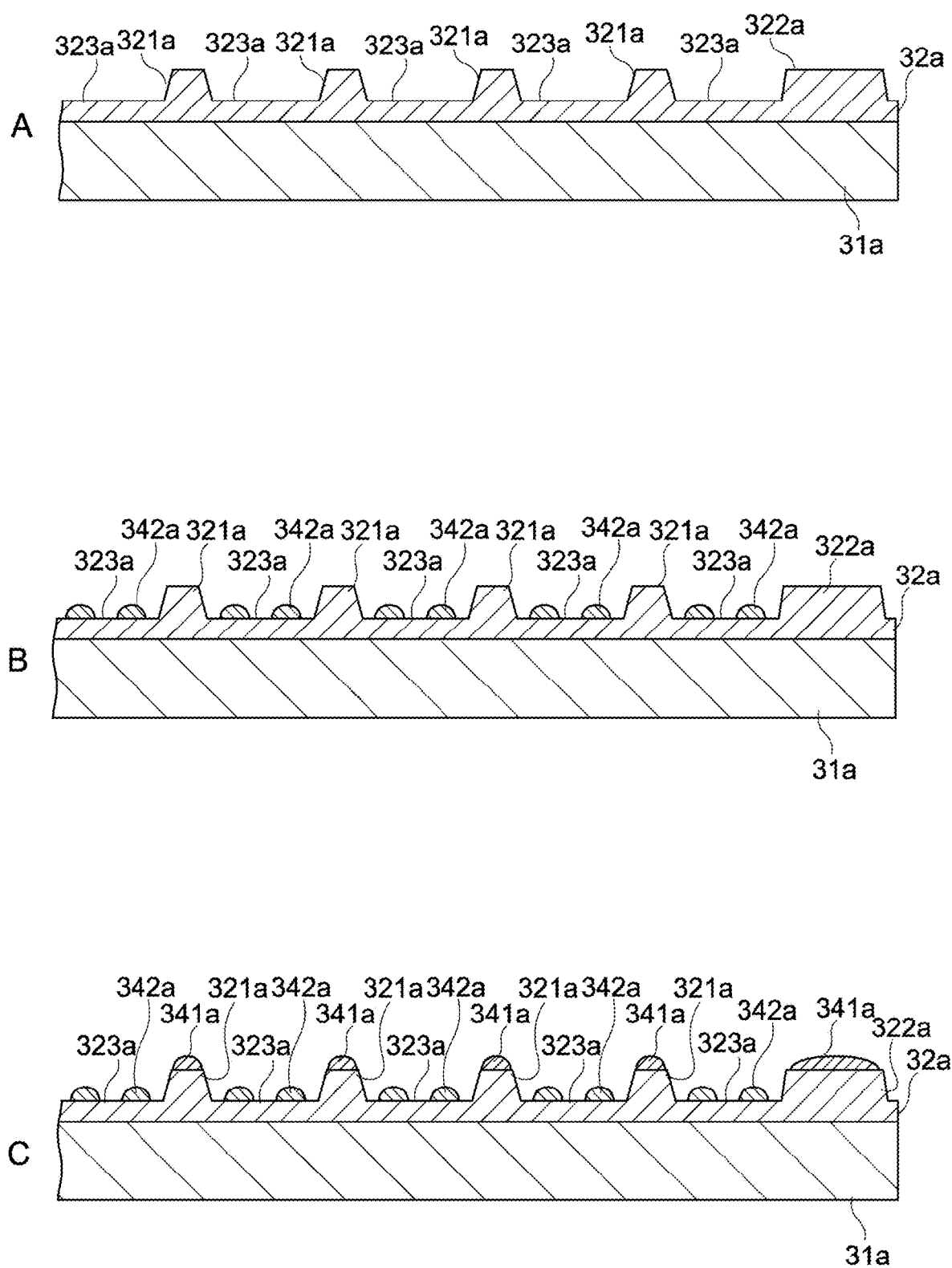
FIG. 9 A schematic cross-sectional view showing examples of a method of forming a first support of the input device.

FIG. 9A, B, C is a schematic cross-sectional view showing examples of a method of forming the first support 30. First, a UV resin is disposed on a base material 31a, and a predetermined pattern is formed on the resin. With this pattern, as shown in FIG. 9A, a structure layer 32a including multiple first and second convex portions 321a and 322a and concave portions 323a is formed. As the UV resin described above, a solid sheet material or a liquid UV curable material may be used. Further, a method of forming a pattern is not particularly limited. For example, using a roll-shaped die having a predetermined concavo-convex pattern, a method of transferring the concavo-convex pattern of the die to the UV resin and curing the UV resin with UV application from the side of the base material 31a can be applied. Further, in addition to the shaping using the UV resin, for example, general thermoforming (for example, press forming or injection molding) or discharge of a resin material using a dispenser or the like may be adopted.

Next, with reference to FIG. 9B, a UV resin or the like having low adhesiveness is applied to the concave portions 323a in a predetermined pattern by a screen printing method, for example, to form an adhesion prevention layer 342a. This can prevent the metal film 12 disposed on the first support 30 and the concave portion 323 from adhering to each other, in the case where the resin material that forms the structure layer 32a has high adhesiveness, for example. It should be noted that the adhesion prevention layer 342a may not be formed in the case where the resin material that forms the structure layer 32a has low adhesiveness.

Further, with reference to FIG. 9C, bonding portions 341a made of a UV resin or the like having high adhesiveness are formed on the convex portions 321a by a screen printing method, for example. The bonding portions 341a bond the first support 30 and the metal film 12. By the forming method described above, the first structures 310 and the first frame 320 having predetermined shapes can be formed.

Figure 10:
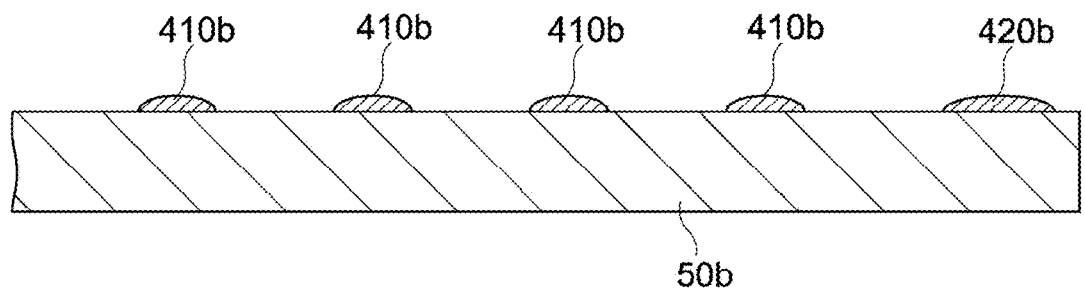
FIG. 10 A schematic cross-sectional view showing an example of a method of forming a second support of the input device.

On the other hand, FIG. 10 is a schematic cross-sectional view showing an example of a method of forming the second support 40. In FIG. 10, a UV resin or the like having high adhesiveness is directly applied onto a conductive layer 50b in a predetermined pattern by a screen printing method, for example, to form second structures 410b and a second frame 420b. This can reduce the number of processes to a large degree and enhance productivity.

The forming method described above is an example. For example, the first support 30 may be formed by the method shown in FIG. 10, or the second support 40 may be formed by the method shown in FIG. 9. Further, the first and second supports 30 and 40 can be formed by the following method shown in FIG. 11.

Figure 11:
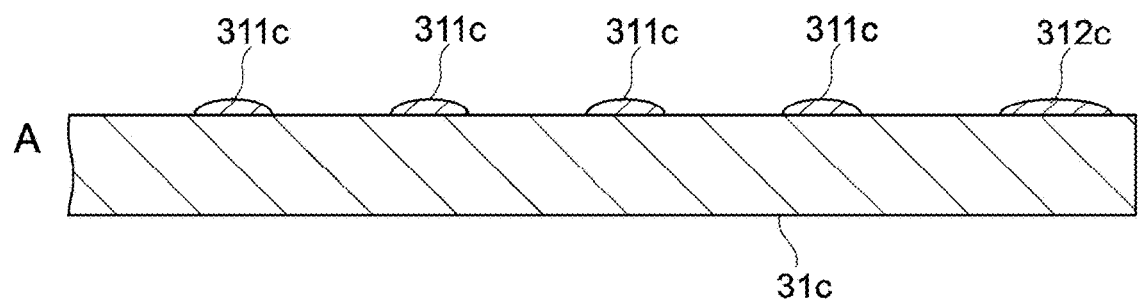
FIG. 11 A schematic cross-sectional view showing a modified example of a method of forming the first or second support.
Figure 11:
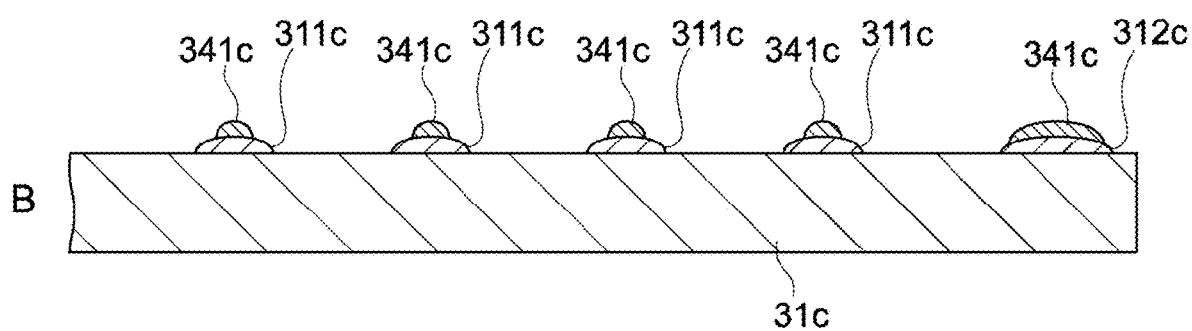

FIG. 11A, B is a schematic cross-sectional view showing a modified example of the method of forming the first and second supports 30 and 40. It should be noted that in FIG. 11, description will be given using reference symbols corresponding to the first support 30. In FIG. 11A, a UV resin or the like is applied onto a base material 31C or the like in a predetermined pattern by a screen printing method, for example, to form first and second convex portions 311c and 312c. Further, on the first and second convex portions 311c and 312c, bonding portions 341c made of a UV resin or the like having high adhesiveness are formed by a screen printing method, for example. Thus, the first structures 310 (second structures 410) formed of the first convex portions 311c and the bonding portions 341c, and the first frame 320 (or the second frame 420) formed of the second convex portion 312c and the bonding portion 341c can be formed.

Next, a planar arrangement of the first and second structures 310 and 410 will be described while touching on a relationship between the first and second electrode wires (X electrodes, Y electrodes) 210 and 220.

(Arrangement Example of First and Second Structures)

FIG. 12A, B is a schematic plan view showing arrangement examples of the first and second structures 310 and 410 and the first electrode wires (X electrodes) 210 and the second electrode wires (Y electrodes) 220. FIG. 12A, B shows an example in which each X electrode 210 and each Y electrode 220 have electrode groups 21w and 22w, respectively. Further, since each of the detection portions 20s is formed in the intersection region of the X electrode 210 and the Y electrode 220 as described above, for example, four detection portions 20s surrounded by thick broken lines are disposed in FIG. 12A, B. It should be noted that black circles shown in FIG. 12A, B represent the first structures 310, and white circles represent the second structures 410.

FIG. 12A shows an example in which the number of first structures 310 and the number of second structures 410 are substantially the same. In other words, the first structure 310 is disposed at substantially the center of the detection portion 20s. A pitch of the first structures 310 in the X-axis direction and the Y-axis direction is the same as a pitch of the detection portion 20s in the X-axis direction and the Y-axis direction. The pitch is P1. Further, the second structures 410 are disposed in the pitch P1, which is the same in the first structures 310, at regular intervals between the first structures 310 and between the detection portions 20s that are adjacent in an oblique direction forming approximately 45° with each of the X-axis and Y-axis directions.

Further, FIG. 12B shows an example in which the number of first structures 310 and the number of second structures 410 are different from each other. In other words, the first structures 310 are disposed in the pitch P1 at substantially the center of each detection portion 20s, as in the example shown in FIG. 12A. On the other hand, the second structures 410 are different from FIG. 12A in arrangement and number and disposed in a pitch P2, which is ½ times of the pitch P1 of the first structures 310. When viewed in the Z-axis direction, the second structures 410 are disposed so as to surround the circumferences of the first structures 310 and the detection portions 20s. The second structures 410 are disposed in a larger number than the first structures 310, and thus the strength of the entire input device 100 can be enhanced.

Further, the number and arrangement (pitch) of the first and second structures 310 and 410 are adjusted, and thus the amount of a change in distance between each of the metal film 12 and the conductive layer 50 and the detection portion 20s with respect to a pressing force can be adjusted so as to obtain a target operational feeling or detection sensitivity.

Further, in the case where the conductive layer 50 includes the openings 50h, the openings 50h, the first and second structures 310 and 410, and the first and second electrode wires 210 and 220 are disposed as follows.

(Arrangement Example of Openings of Conductive Layer)

Figure 13:
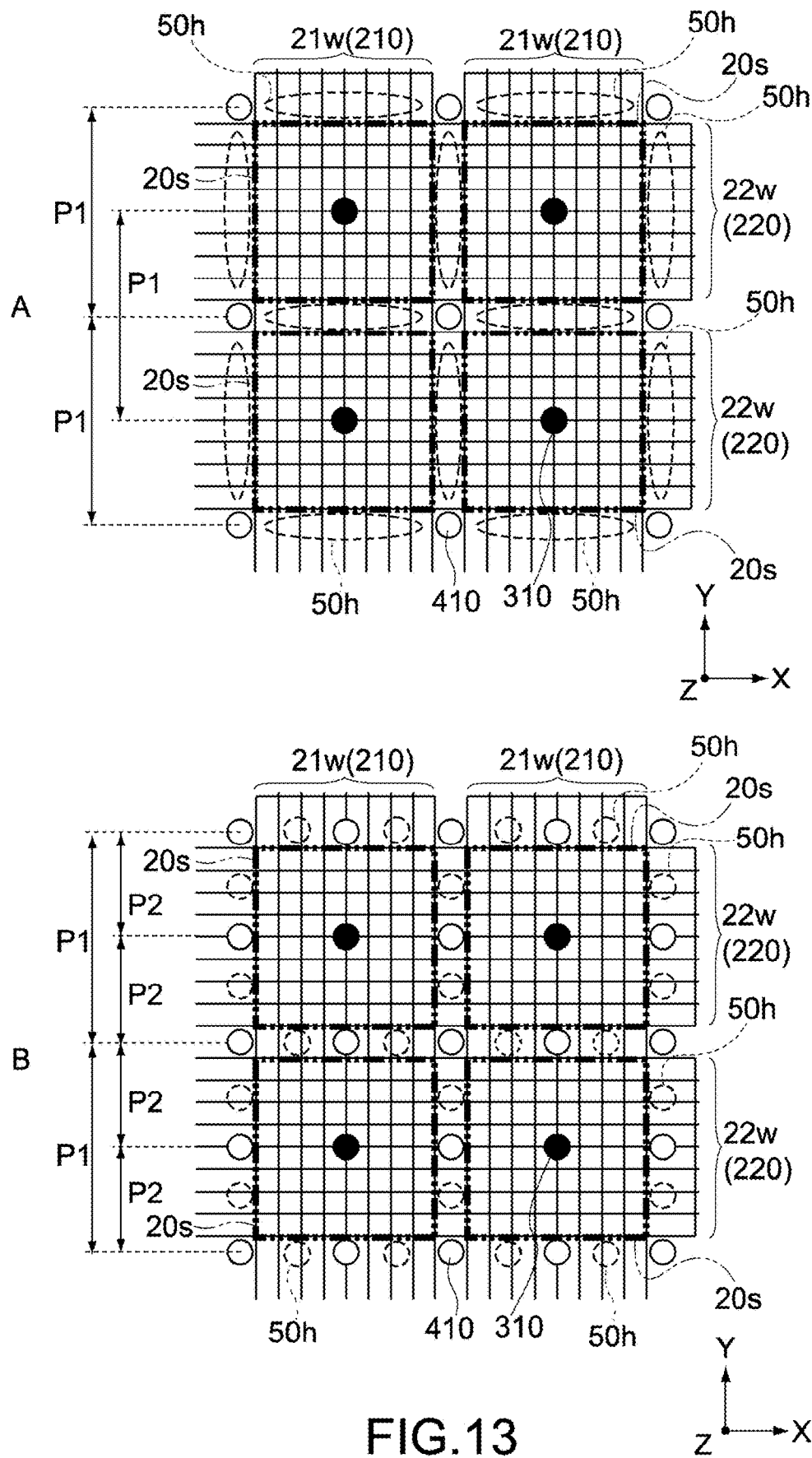
FIG. 13 A schematic plan view showing arrangement examples of openings of the conductive layer, the first and second structures, the first and second electrode wires.

FIG. 13A, B is a schematic plan view showing arrangement examples of the openings 50h of the conductive layer 50, the first and second structures 310 and 410, and the first and second electrode wires 210 and 220. Additionally, FIG. 13A shows an example of the openings 50*h* each having an oval shape, and FIG. 13B shows an example of the openings 50*h* each having a circular shape. The multiple openings 50*h* shown in FIG. 13A, B are disposed so as to surround the circumferences of the detection portions 20*s* when viewed in the Z-axis direction. Further, the multiple openings 50*h* are provided to be displaced with respect to the second structures 410 in the in-plane (in-XY plane) direction, so as not to overlap any of the first and second structures 310 and 410 and the detection portions 20*s* in the Z-axis direction.

As shown in the figure, the openings 50*h* are disposed at positions that are not opposed to the detection portions 20*s*, for example. In other words, the openings 50*h* and the detection portions 20*s* are provided to be displaced in an in-plane (in-XY plane) direction so as not to overlap in the Z-axis direction. This can suppress an initial capacitance or a change ratio of capacitance of the detection portions 20*s* from being changed and keep detection sensitivity in the input device 100 more uniform, as compared with the case where the openings 50*h* of the conductive layer 50 are disposed at positions opposed to the detection portions 20*s*.

The openings 50*h* are disposed at cycles substantially the same as the detection portions 20*s*. For example, the openings 50*h* are disposed symmetrically with respect to the center of the detection portion 20*s*. More specifically, the openings 50*h* are disposed linearly symmetrically with respect to the center line of each of the first and second electrode wires 210 and 220. This can also prevent the detection sensitivity from being ununiform in the input device 100.

As described above, the first and second supports 30 and 40 according to this embodiment have features: (1) including the first and second structures 310 and 410 and the first and second space portions 330 and 430; and (2) the first structures 310 and the second structures 410 do not overlap each other when viewed in the Z-axis direction, and the first structures 310 are disposed above the second space portion 430. Therefore, as described later, the metal film 12 and the conductive layer 50 can be deformed by a minute pressing force of approximately several 10 g at the time of operation.

(Operation of First and Second Supports)

Figure 14:
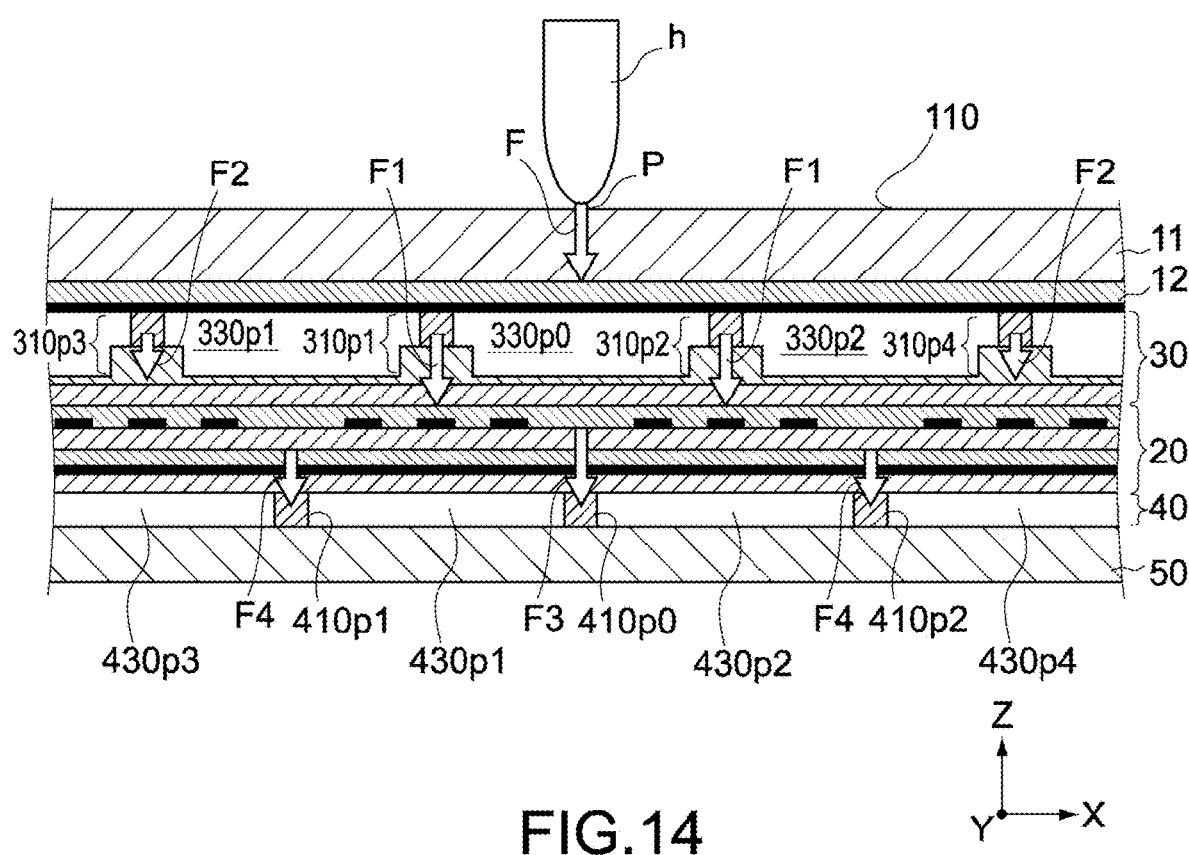
FIG. 14 A schematic cross-sectional view showing a state of a force applied to the first and second structures when a point on the first surface of the input device is pressed downward in a Z-axis direction with an operating element.

FIG. 14 is a schematic cross-sectional view showing a state of a force applied to the first and second structures 310 and 410 when a point P on the first surface 110 is pressed downward in the Z-axis direction with an operating element h. White arrows in the figure each schematically show the magnitude of a force applied downward in the Z-axis direction (hereinafter, simply referred to as "downward"). In FIG. 14, aspects such as the deflection of the metal film 12, the electrode substrate 20, and the like and the elastic deformation of the first and second structures 310 and 410 are not shown. It should be noted that in the following description, even in the case where a user makes a touch operation without being conscious of a press, a minute pressing force is actually applied, and thus those input operations will be collectively described as "press".

For example, in the case where a point P above a first space portion 330*p*0 is pressed downward by a force F, the metal film 12 immediately below the point P is deflected downward. Along with the deflection, first structures 310*p*1 and 310*p*2 adjacent to the first space portion 330*p*0 receive a force F1 and are elastically deformed in the Z-axis direction, and the thickness is slightly reduced. Further, due to the deflection of the metal film 12, first structures 310*p*3 and 310*p*4 adjacent to the first structures 310*p*1 and 310*p*2 also receive a force F2 that is smaller than F1. Moreover, by the forces F1 and F2, a force is applied to the electrode substrate 20 as well, and the electrode substrate 20 is deflected downward centering on a region immediately blow the first structures 310*p*1 and 310*p*2. With this deflection, a second structure 410*p*0 disposed between the first structures 310*p*1 and 310*p*2 receives a force F3 and is elastically deformed in the Z-axis direction, and the thickness is slightly reduced. Further, a second structure 410*p*1 disposed between the first structures 310*p*1 and 310*p*3 and a second structure 410*p*2 disposed between the first structures 310*p*2 and 310*p*4 also each receive F4 that is smaller than F3.

In such a manner, a force can be transmitted by the first and second structures 310 and 410 in the thickness direction, and the electrode substrate 20 can be easily deformed. Further, when the metal film 12 and the electrode substrate 20 are deflected, and a pressing force has an influence in the in-plane direction (in a direction parallel to the X-axis direction and the Y-axis direction), the force can thus reach not only the region immediately below the operating element h but also the first and second structures 310 and 410 adjacent to that region.

Further, regarding the feature (1) described above, the metal film 12 and the electrode substrate 20 can be easily deformed by the first and second space portions 330 and 430. Further, with respect to the pressing force of the operating element h, a high pressure can be applied to the electrode substrate 20 by the first and second structures 310 and 410 each formed of a prism or the like, and the electrode substrate 20 can be efficiently deflected.

Further, regarding the feature (2) described above, since the first and second structures 310 and 410 are disposed so as not to overlap each other when viewed in the Z-axis direction, the first structures 310 can easily deflect the electrode substrate 20 via the second space portion 430 provided below the first structures 310.

Hereinafter, description will be given on an example of the amount of capacitance change of the detection portion 20*s* in a specific operation.

(Output Example of Detection Unit)

Figure 15:
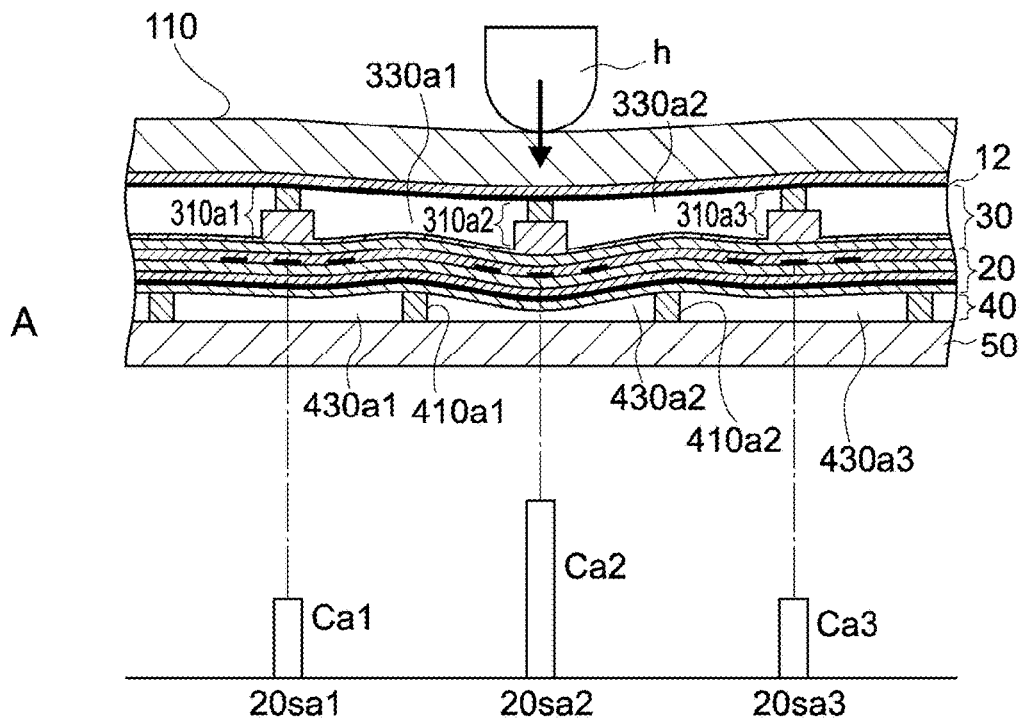
FIG. 15 A schematic cross-sectional view of a main part, showing an aspect of the input device when a point of the first surface above the first structure receives an operation by an operating element and showing an example of output signals output from the detection portions at that time.
Figure 15:
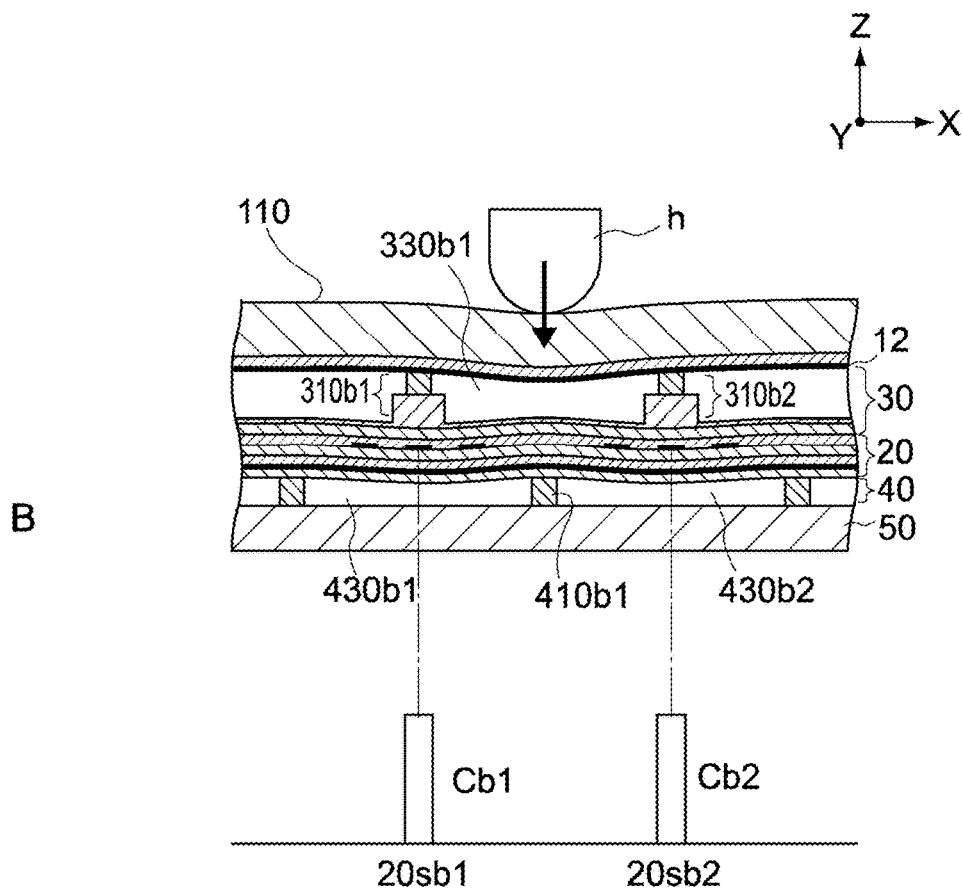

FIG. 15A, B is a schematic cross-sectional view of a main part, showing an aspect of the input device 100 when the first surface 110 receives an operation by the operating element h and showing an example of output signals output from the detection portions 20*s* at that time. Bar graphs shown along the X axis in FIG. 15A, B each schematically show the amount of capacitance change from a reference value in each detection portion 20*s*. Further, FIG. 15A shows an aspect when the operating element h presses above a first structure 310 (310*a*2), and FIG. 15B shows an aspect when the operating element h presses above a first space portion 330 (330*b*1).

In FIG. 15A, the first structure 310*a*2 immediately below the operation position receives the largest force and is displaced downward while elastically deforming the first structure 310*a*2 itself. Due to the displacement, a detection portion 20*sa*2 immediately below the first structure 310*a*2 is displaced downward. This allows the detection portion 20*sa*2 and the conductive layer 50 come close to each other via a second space portion 430*a*2. In other words, the detection portion 20*sa*2 obtains the amount of capacitance change $Ca2$ by a slight change in distance from the metal film 12 and a large change in distance from the conductive layer 50. On the other hand, due to the influence of the deflection of the metal film 12, first structures 310*a*1 and 310*a*3 are also slightly displaced downward, and the amounts of capacitance change in detection portions 20*sa*1 and 20*sa*3 are $Ca1$ and $Ca3$.

In the example shown in FIG. 15A, Ca2 is the largest, and Ca1 and Ca3 are substantially the same as each other and smaller than Ca2. In other words, as shown in FIG. 15A, the amounts of capacitance change Ca1, Ca2, and Ca3 show a distribution in chevron with a vertex of Ca2. In this case, the arithmetic unit 61 can calculate the center of gravity or the like based on the ratio of Ca1, Ca2, and Ca3, to calculate XY coordinates on the detection portion 20$sa$2 as an operation position.

On the other hand, in FIG. 15B, first structures 310$b$1 and 310$b$2 in the vicinity of the operation position are slightly elastically deformed and displaced downward due to the deflection of the metal film 12. Due to the displacement, the electrode substrate 20 is deflected, and detection portions 20$sb$1 and 20$sb$2 immediately below the first structures 310$b$1 and 310$b$2 are displaced downward. This allows the detection portions 20$sb$1 and 20$sb$2 and the conductive layer 50 come close to each other via second space portions 430$b$1 and 430$b$2. In other words, the detection portions 20$sb$1 and 20$sb$2 obtain the amounts of capacitance change Cb1 and Cb2, respectively, by a slight change in distance from the metal film 12 and a large change in distance from the conductive layer 50.

In the example shown in FIG. 15B, Cb1 and Cb2 are substantially the same as each other. The arithmetic unit 61 can thus calculate XY coordinates between the detection portions 20$sb$1 and 20$sb$2 as an operation position.

As described above, according to this embodiment, both of the thickness between the detection portion 20$s$ and the metal film 12 and the thickness between the detection portion 20$s$ and the conductive layer 50 are variable by the pressing force, and thus the amount of capacitance change in the detection portion 20$s$ can be made larger. This can enhance the detection sensitivity of the input operation.

Further, even when the operation position on the flexible display 11 is any point on the first structure 310 or above the first space portion 330, the XY coordinates of the operation position can be calculated. In other words, the influence of the pressing force is spread in the in-plane direction by the metal film 12, and thus a capacitance change can be generated in not only the detection portion 20$s$ immediately below the operation position but also the detection portions 20$s$ in the vicinity of the operation position when viewed in the Z-axis direction. Thus, it is possible to suppress variations in detection accuracy in the first surface 110 and keep high detection accuracy on the entire first surface 110.

Here, a finger or a stylus is exemplified as an operating element frequently used. The feature of them is as follows: since the finger has a larger contact area than the stylus, in the case where the same load (pressing force) is applied, the finger receives a smaller pressure (hereinafter, operation pressure) with respect to the pressing force. On the other hand, the stylus has a smaller contact area, and for example, in a capacitance sensor of a general mutual capacitance system, there arise problems that the amount of capacitive coupling to a sensor element is small and the detection sensitivity is low. According to this embodiment, the input operation can be detected with high accuracy with use of any of the operating elements. Hereinafter, description will be given with reference to FIG. 16A, B.

Figure 16:
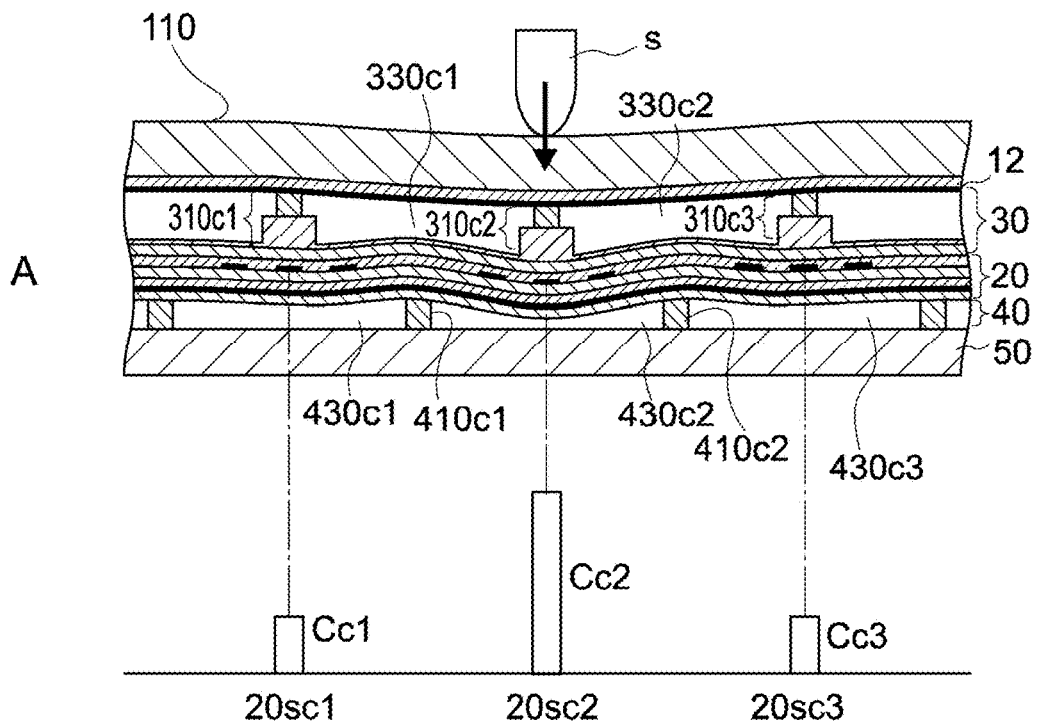
FIG. 16 A schematic cross-sectional view of a main part, showing an aspect of the input device when the first surface receives an operation by the operating element and showing an example of output signals output from the detection portions at that time, in which A shows a case where the operating element is a stylus, and B shows a case where the operating element is a finger.
Figure 16:
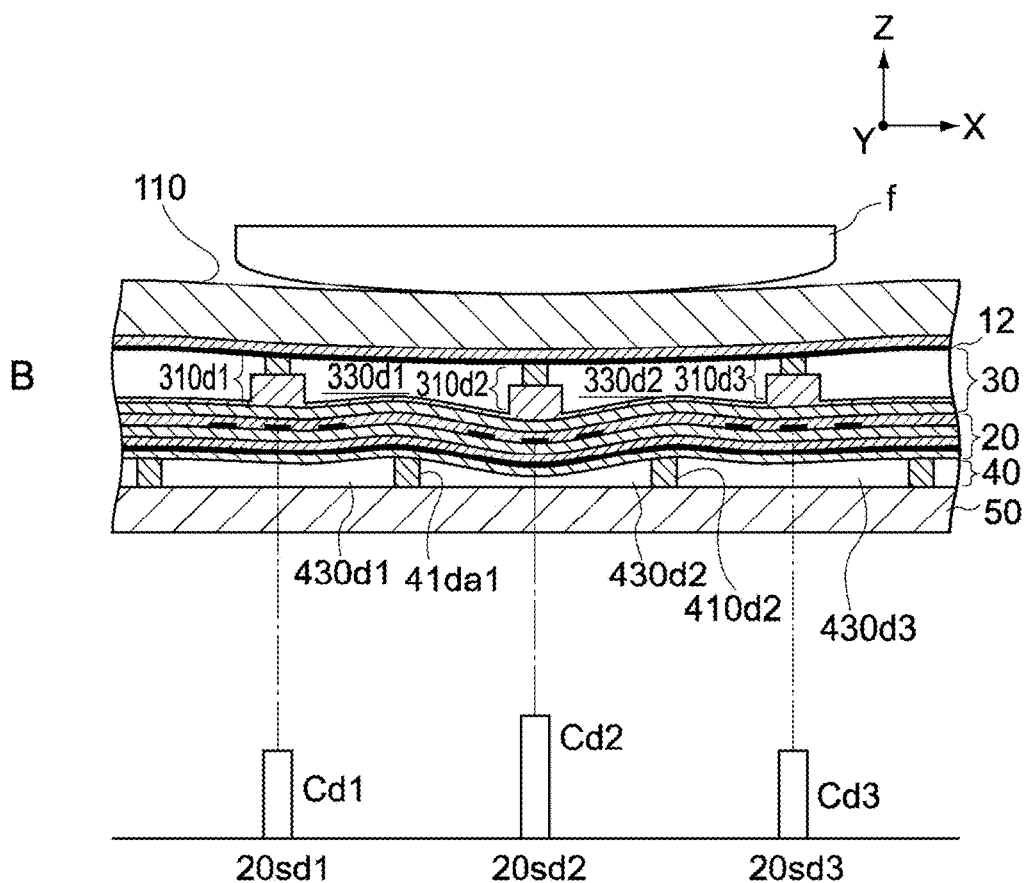

FIG. 16A, B is a schematic cross-sectional view of a main part, showing an aspect of the input device 100 when the first surface 110 receives an operation by a stylus or a finger and showing an example of output signals output from the detection portions 20$s$ at that time. FIG. 16A shows the case where the operating element is a stylus s, and FIG. 16B shows the case where the operating element is a finger f.

Additionally, bar graphs shown along the X axis in FIG. 16A, B each schematically show the amount of capacitance change from a reference value in each detection portion 20$s$, as in FIG. 15A, B.

As shown in FIG. 16A, the stylus s deforms the metal film 12 and also applies a pressing force to a first structure 310$c$2 immediately below the operation position. Here, the stylus s has a small contact area, and thus can apply a large operation pressure to the metal film 12 and the first structure 310$c$2. For that reason, the metal film 12 can be largely deformed. As a result, a large capacitance change can be generated as shown by the amount of capacitance change Cc2 of a detection portion 20$sc$2. Thus, the amounts of capacitance change Cc1, Cc2, and Cc3 of detection portions 20$sc$1, 20$sc$2, and 20$sc$3, respectively, have a distribution in chevron with a vertex of Cc2.

As described above, the input device 100 according to this embodiment can detect the amount of capacitance change based on an in-plane distribution of the operation pressure. This is because the input device 100 does not detect the amount of capacitance change by direct capacitive coupling to the operating element, but detects the amount of capacitance change via the deformable metal film 12 and electrode substrate 20. Therefore, even for the operating element such as the stylus s having a small contact area, the operation position and the pressing force can be detected with high accuracy.

On the other hand, as shown in FIG. 16B, since the finger f has a large contact area, the operation pressure becomes small, but can directly deform the metal film 12 in a wider range than the stylus s. This can displace first structures 310$d$1, 310$d$2, and 310$d$3 downward and generate the amounts of capacitance change Cd1, Cd2, and Cd3 of detection portions 20$sd$1, 20$sd$2, and 20$sd$3, respectively. Cd1, Cd2, and Cd3 show a distribution in gradual chevron, as compared with Cc1, Cc2, and Cc3 according to FIG. 16A.

The input device 100 according to this embodiment detects the amount of capacitance change based on both capacitive coupling between each of the metal film 12 and the conductive layer 50 and the detection portion 20$s$ as described above, and thus a sufficient capacitance change can be generated even with an operating element such as the finger f having a large contact area. Further, in the determination on whether an operation has been performed or not, using a value obtained by adding the amounts of capacitance change of all the detection portions 20$sd$1, 20$sd$2, and 20$sd$3, in each of which a capacitance change is generated, for example, can lead to a highly accurate determination of a contact based on the pressing force of the entire first surface 110, even if the operation pressure is small. Moreover, since the capacitance is changed based on an operation pressure distribution in the first surface 110, an operation position conforming to an intuition of the user can be calculated based on a ratio of those change amounts or the like.

Moreover, in the case of a general capacitance sensor, the operation position and the like are detected using capacitive coupling between the operating element and the X and Y electrodes. In other words, in the case where a conductor is disposed between the operating element and the X and Y electrodes, it has been difficult to detect an input operation due to capacitive coupling between the conductor and the X and Y electrodes. Further, in a configuration in which a gap between the operating element and the X and Y electrodes is thick, there has been a problem that the amount of capacitive coupling therebetween is made small and the detection sensitivity is reduced. In view of those circumstances, it has been necessary to dispose a sensor device on a display surface of a display, and there has been a problem of deterioration of a display quality of the display.

Since the input device 100 (sensor device 1) according to this embodiment uses the capacitive coupling between each of the metal film 12 and the conductive layer 50 and the X and Y electrodes 210 and 220, even in the case where a conductor is disposed between the operating element and the sensor device, there is no influence on the detection sensitivity. Further, the metal film 12 only needs to be deformable by the pressing force of the operating element, and there are less limits on the thickness of the gap between the operating element and the X and Y electrodes. Therefore, even in the case where the sensor device 1 is disposed on the back surface of the flexible display 11, the operation position and the pressing force can be detected with high accuracy, and the deterioration in display characteristics of the flexible display 11 can be suppressed.

Moreover, there are less limits on the thickness of an insulator (dielectrics) that exists between the operating element and the X and Y electrodes, and thus even in the case where the user operates while wearing gloves as an insulator, for example, the detection sensitivity is not reduced. Therefore, this can contribute to the improvement of convenience for the user.

[Electronic Apparatus]

Figure 17:
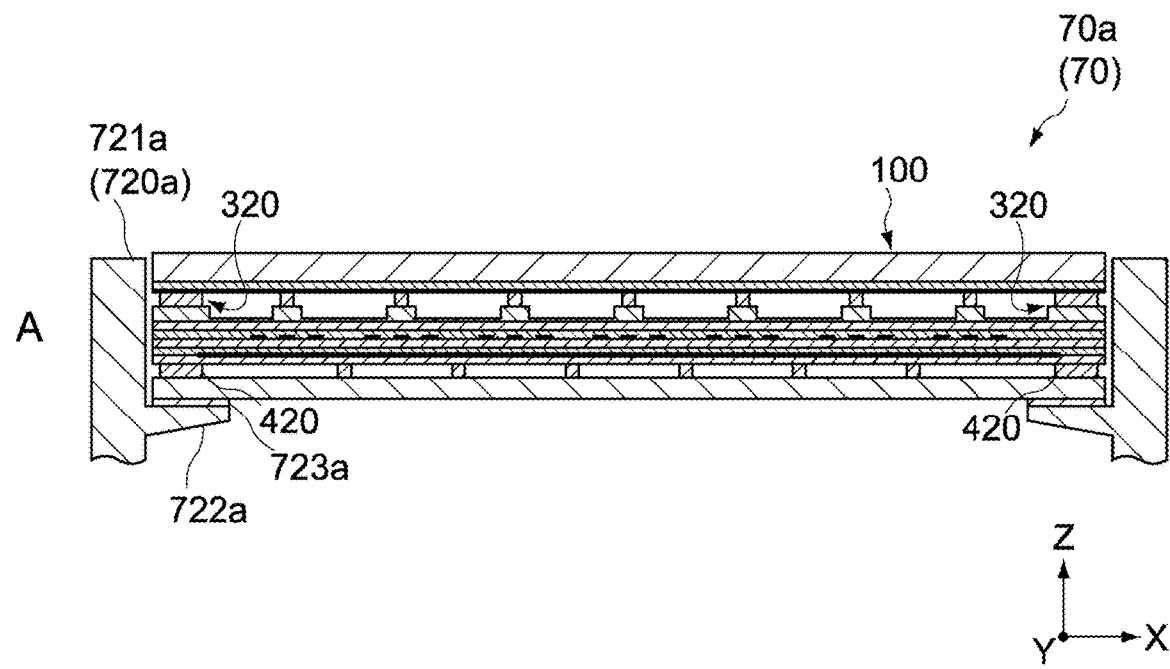
FIG. 17 A schematic cross-sectional view showing an example of mounting the input device to an electronic apparatus.
Figure 17:
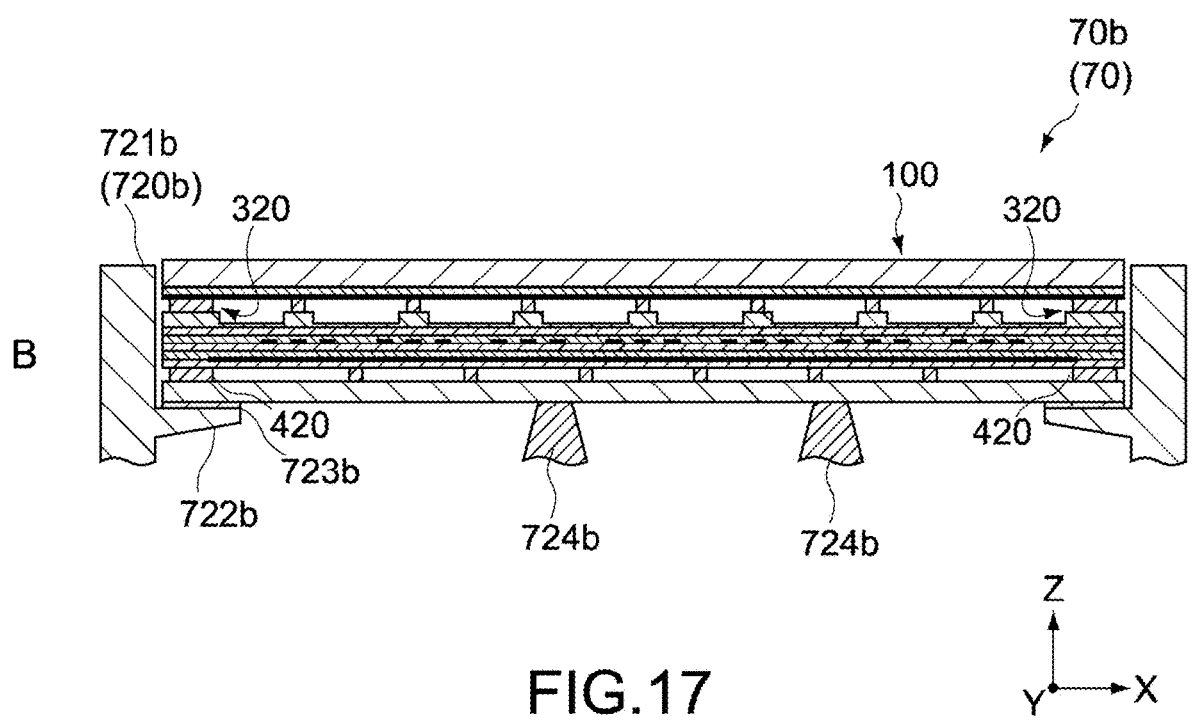

FIG. 17A, B is a view showing an example of mounting the input device 100 according to this embodiment to the electronic apparatus 70. An electronic apparatus 70a according to FIG. 17A includes a casing 720a including an opening portion 721a in which the input device 100 is disposed. Further, the opening portion 721a is provided with a support portion 722a, and the support portion 722a supports a circumferential portion of the conductive layer 50 via a bonding portion 723a such as a pressure-sensitive tape. Further, a method of bonding the conductive layer 50 and the support portion 722a is not limited to the above method, and the conductive layer 50 and the support portion 722a may be fixed with screws, for example.

Further, in the input device 100 according to this embodiment, the first and second frames 320 and 420 are formed along the circumferential edge thereof, and thus a stable strength can be kept at the time of mounting.

An electronic apparatus 70b according to FIG. 17B also has a configuration that is substantially the same as that of the electronic apparatus 70a. The electronic apparatus 70b includes a casing 720b including an opening portion 721a and a support portion 722a. The difference is in that the electronic apparatus 70b includes at least one auxiliary support portion 724b that supports the back surface of the conductive layer 50. The auxiliary support portion 724b may be bonded to the conductive layer 50 with a pressure-sensitive tape or the like or may not be connected. The configuration described above can support the input device 100 more stably.

Modified Example 1

In the first embodiment described above, the metal film 12 is formed by attaching the adhesion layer 13 to the flexible display 11, the adhesion layer 13 being a viscous resin film and including the metal foil formed thereon, but the metal film 12 is not limited thereto. For example, in the case where the metal film 12 is metal foil without a resin film, for example, the adhesion layer 13 may be a pressure-sensitive adhesive, an adhesive, or the like capable of attaching the metal film 12 to the flexible display 11.

In this case, the adhesion layer 13 may be provided to the entire surface of the flexible display 11 as shown in FIG. 3. This allows the metal film 12 and the flexible display 11 to be tightly bonded to each other in the entire plane, to obtain a uniform sensitivity.

Figure 18:
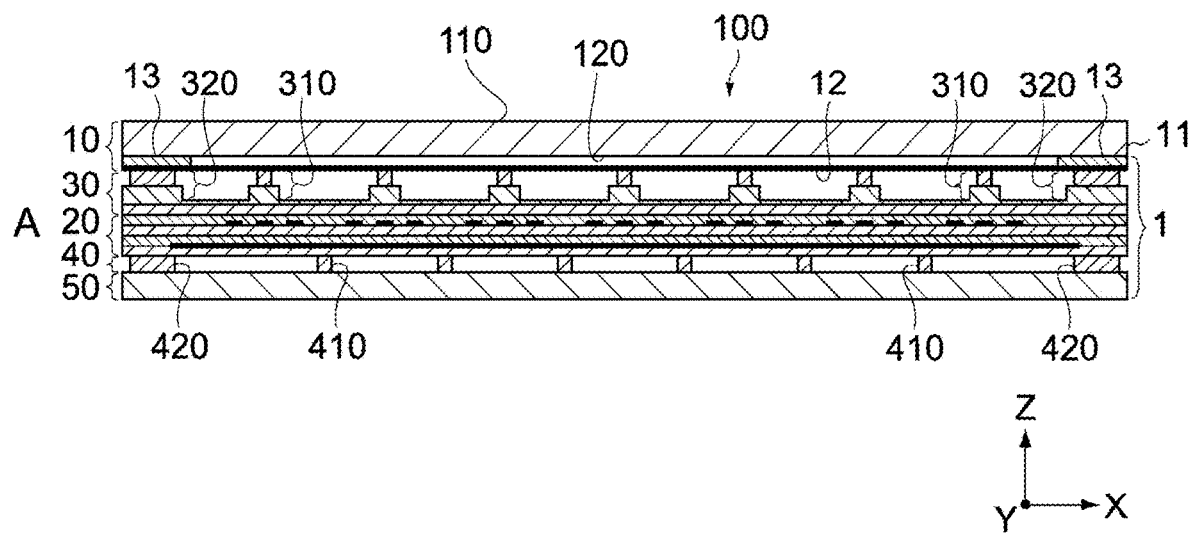
FIG. 18 A schematic cross-sectional view showing a configuration of a modified example 1 of the input device shown in FIG. 1, in which an adhesion layer is partially formed.
Figure 18:
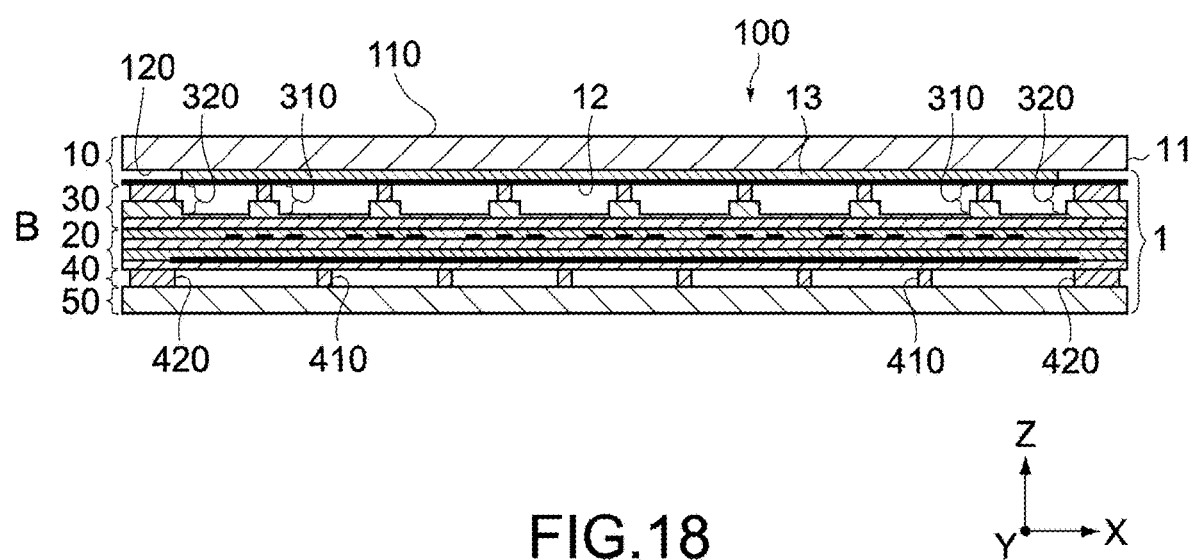

On the other hand, FIG. 18A, B is a schematic cross-sectional view showing a modified example in which the adhesion layer 13 is partially formed. As shown in FIG. 18A, the adhesion layer 13 may be formed in only an outer circumferential portion of each of the flexible display 11 and the metal film 12, and for example, may be formed in a region above the first frame 320 and the second frame 420. This allows the metal film 12 and the flexible display 11 to be bonded to each other above the first frame 320 and the second frame 420, the first frame 320 and the second frame 420 each having a larger bond area in the Z-axis direction than each of the first structures 310 and the second structures 410 and being disposed by lamination in the Z-axis direction. Therefore, even if such a force as to tear the operation member 10 off upward is applied, it is possible to prevent the breakage of the first and second structures 310 and 410, peel-off between the electrode substrate 20 and each of the structures 310 and 410, and the like.

Alternatively, as shown in FIG. 18B, the adhesion layer 13 may be formed in a display region of the flexible display 11, that is, in a region including the center portion but excluding the outer circumferential portion. As shown below, this allows the breakage of the flexible display 11 or abnormal detection sensitivity to be suppressed.

Figure 19:
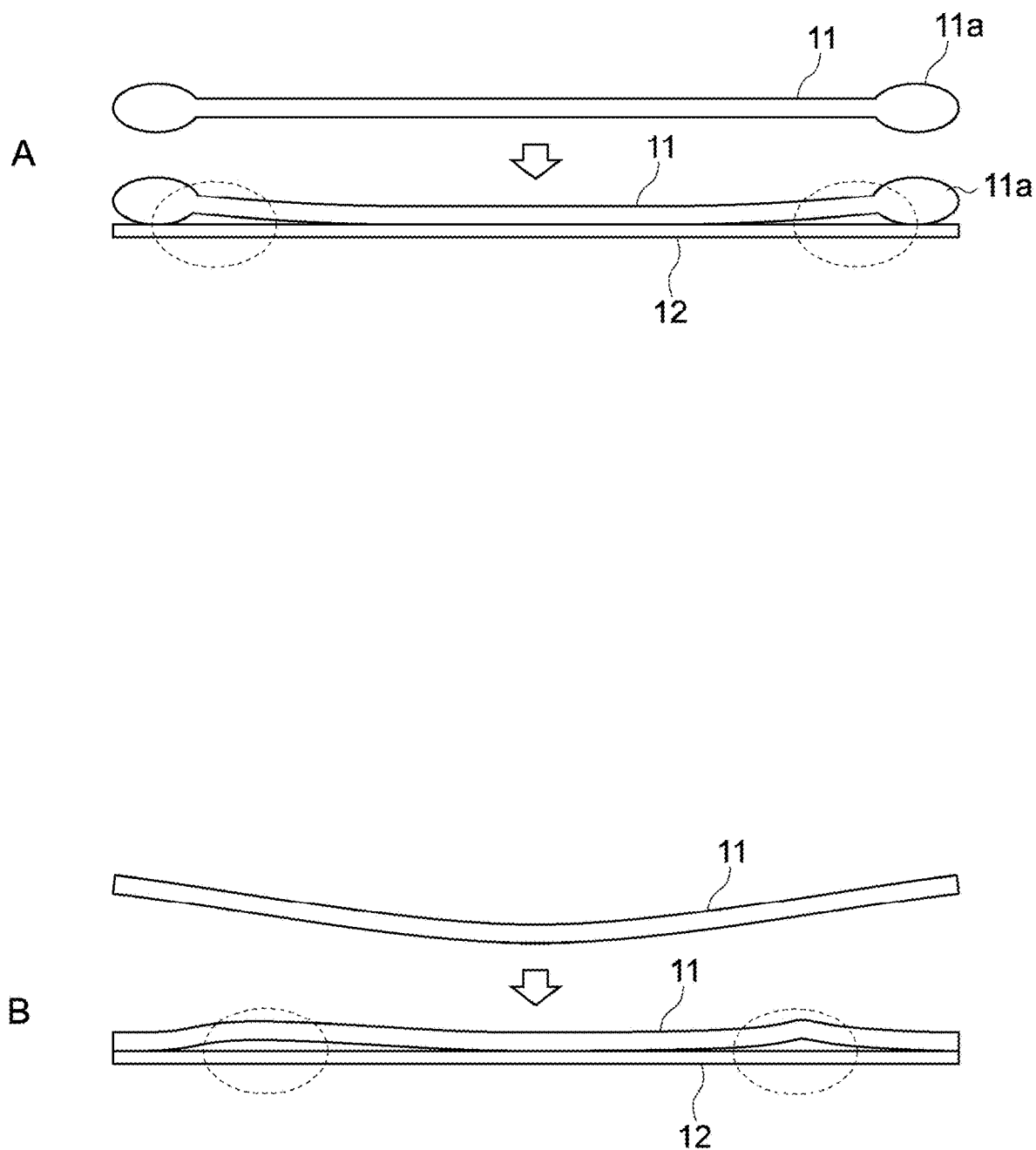
FIG. 19 A view schematically showing a state where a flexible display (display unit) shown in FIG. 18 is attached to the entire surface of a metal film shown in the figure, the entire surface including the outer circumferential portion.

FIG. 19A, B is a schematic view showing a state where the flexible display 11 is attached to the entire surface of the metal film 12, including the outer circumferential portion. It should be noted that in FIG. 19A, B, the adhesion layer 13 is not illustrated.

For example, as schematically shown in FIG. 19A, a wire, a driver, and the like are temporarily provided to an outer circumferential portion 11a of the flexible display 11. In the case where there is a bulge or a step, if the outer circumferential portion 11a is forcedly bonded, a breakage may be caused particularly in the outer circumferential portion 11a. Further, as in regions circled by broken lines in the figure, gaps are generated in boundary portions between the outer circumferential portion 11a and other regions, and abnormal detection sensitivity may be caused.

Additionally, as schematically shown in FIG. 19B, also in the case where a seal material or the like (not shown) is provided to the surface of the flexible display 11 and warpage or the like occurs, if the outer circumferential portion 11a is forcedly bonded, the flexible display 11 may be broken. Further, as in regions circled by broken lines in the figure, abnormal detection sensitivity may be caused due to floating of the flexible display 11. In other words, if the outer circumferential portion 11a of the flexible display 11 is not forcedly bonded, the failures described above can be suppressed.

Figure 20:
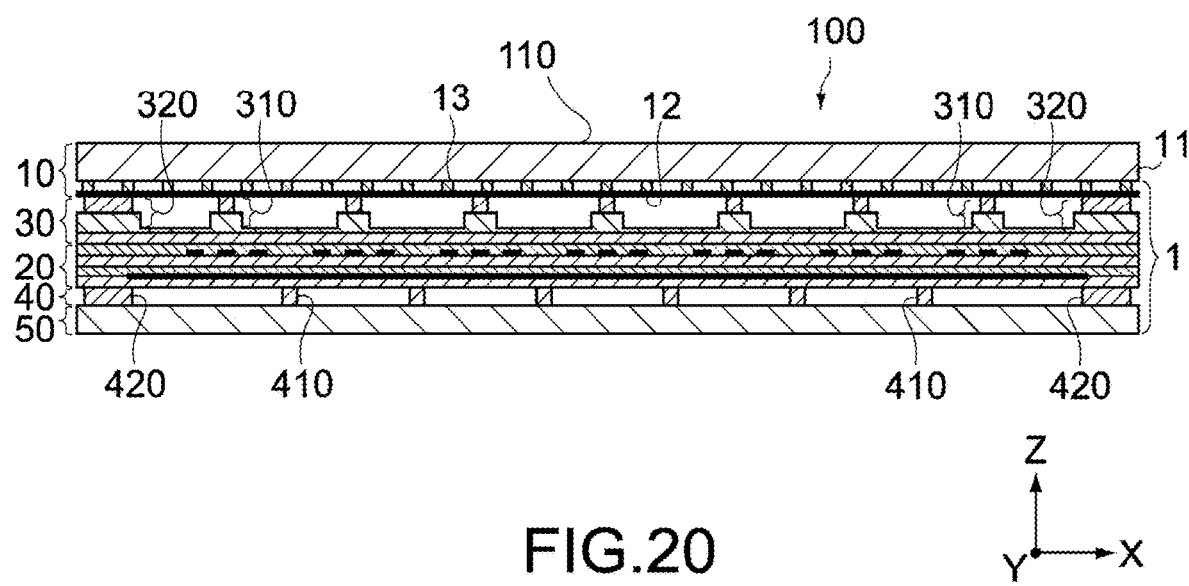
FIG. 20 A schematic cross-sectional view showing another configuration of a modified example 1 of the input device shown in FIG. 1, showing an example in which an adhesion layer is formed in a predetermined plane pattern.
Figure 21:
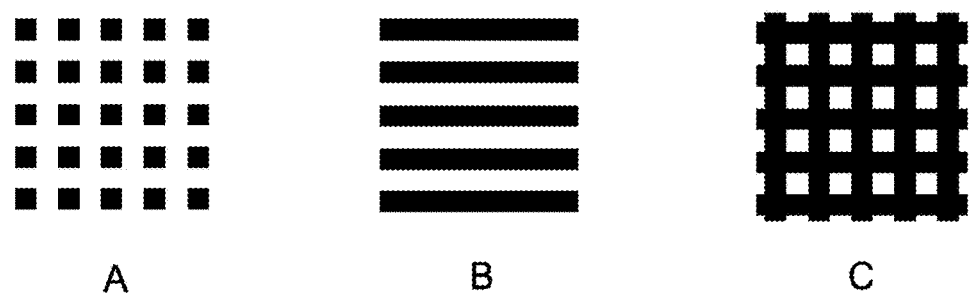
FIG. 21 A schematic view showing examples of the plane pattern of the adhesion layer shown in FIG. 20.

Moreover, FIG. 20 is a schematic cross-sectional view showing another modified example of the adhesion layer 13. As shown in the figure, the adhesion layer 13 may be formed in a predetermined plane pattern. FIG. 21 is a view showing examples of a plane pattern of the adhesion layer 13. The adhesion layer 13 may have a column pattern as shown in FIG. 21A, a stripe pattern as shown in FIG. 21B, or a lattice pattern shown in FIG. 21C. With the adhesion layer 13 having such a pattern, air bubbles can be prevented from being mixed into the adhesion layer 13 when the flexible display 11 and the metal film 12 are bonded to each other, and a yield ratio can be improved.

Additionally, in the case where the adhesion layer 13 has a predetermined plane pattern, the thickness of the adhesion layer 13 along the Z-axis direction can be formed to be thinner than the thickness of the metal film 12. This allows the reliability of bonding of the flexible display 11 and the metal film 12 to be enhanced. Moreover, the predetermined pattern described above can be formed to be finer than the arrangement pattern of the first structures 310. Specifically, the length of each column in the case of the column pattern or the length of each adjacent line in the case of the stripe pattern may be formed to be shorter than the size of the adjacent first structures 310, for example, to be one-tenth of the length or shorter. This can prevent the pattern of the adhesion layer 13 and the size of the first structures 310 from interfering and ununiformity or periodicity in detection sensitivity from occurring.

Modified Example 2

In the first embodiment described above, the multiple first electrode wires 210 and the multiple second electrode wires 220 may be each formed of a single electrode wire or may be each formed of the multiple electrode groups 21w and 22w, but the following configuration can also be provided.

Figure 22:
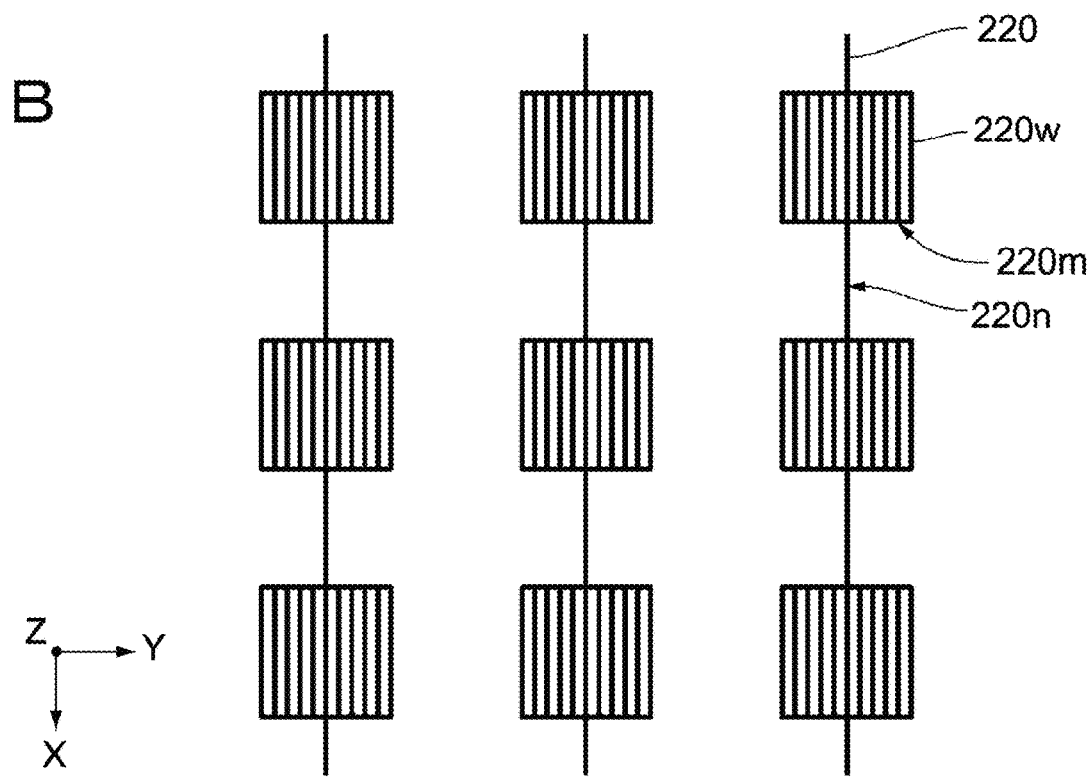
FIG. 22 A schematic plan view showing a configuration example of the first and second electrode wires according to a modified example 2 of the input device shown in FIG. 1, in which A shows the first electrode wires, and B shows the second electrode wires.

FIG. 22A is a schematic plan view showing a configuration example of the first electrode wires 210. For example, each of the first electrode wires 210 include multiple unit electrode bodies 210m and multiple coupling portions 210n that couple the multiple unit electrode bodies 210m to one another. Each of the unit electrode bodies 210m includes multiple sub-electrodes (electrode elements) 210w. The multiple sub-electrodes 210w are electrodes formed of multiple electrode elements that are branched electrode wires, and have a regular or irregular pattern. FIG. 22A shows an example in which the multiple sub-electrodes 210w have a regular pattern. In this example, the multiple sub-electrodes 210w are linear conductive members extending in the Y-axis direction and those conductive members are arrayed in a stripe pattern. The coupling portions 210n extend in the Y-axis direction and couple the adjacent unit electrode bodies 210m to each other.

FIG. 22B is a schematic plan view showing a configuration example of the second electrode wires 220. For example, each of the second electrode wires 220 include multiple unit electrode bodies 220m and multiple coupling portions 220n that couple the multiple unit electrode bodies 220m to one another. Each of the unit electrode bodies 220m includes multiple sub-electrodes (electrode elements) 220w. The multiple sub-electrodes 220w have a regular or irregular pattern. FIG. 22B shows an example in which the multiple sub-electrodes 220w have a regular pattern. In this example, the multiple sub-electrodes 220w are linear conductive members extending in the X-axis direction and those conductive members are arrayed in a stripe pattern. The coupling portions 220n extend in the X-axis direction and couple the adjacent unit electrode bodies 220m to each other.

The first and second electrode wires 210 and 220 are disposed to intersect such that the unit electrode bodies 210m and the unit electrode bodies 220m are opposed to each other in the Z-axis direction and overlap when viewed in the Z-axis direction, and thus the intersection regions form the detection portions 20s. It should be noted that the unit electrode bodies 210m and 220m are not limited to the configurations described above, and unit electrode bodies having various configurations can be adopted.

Figure 23:
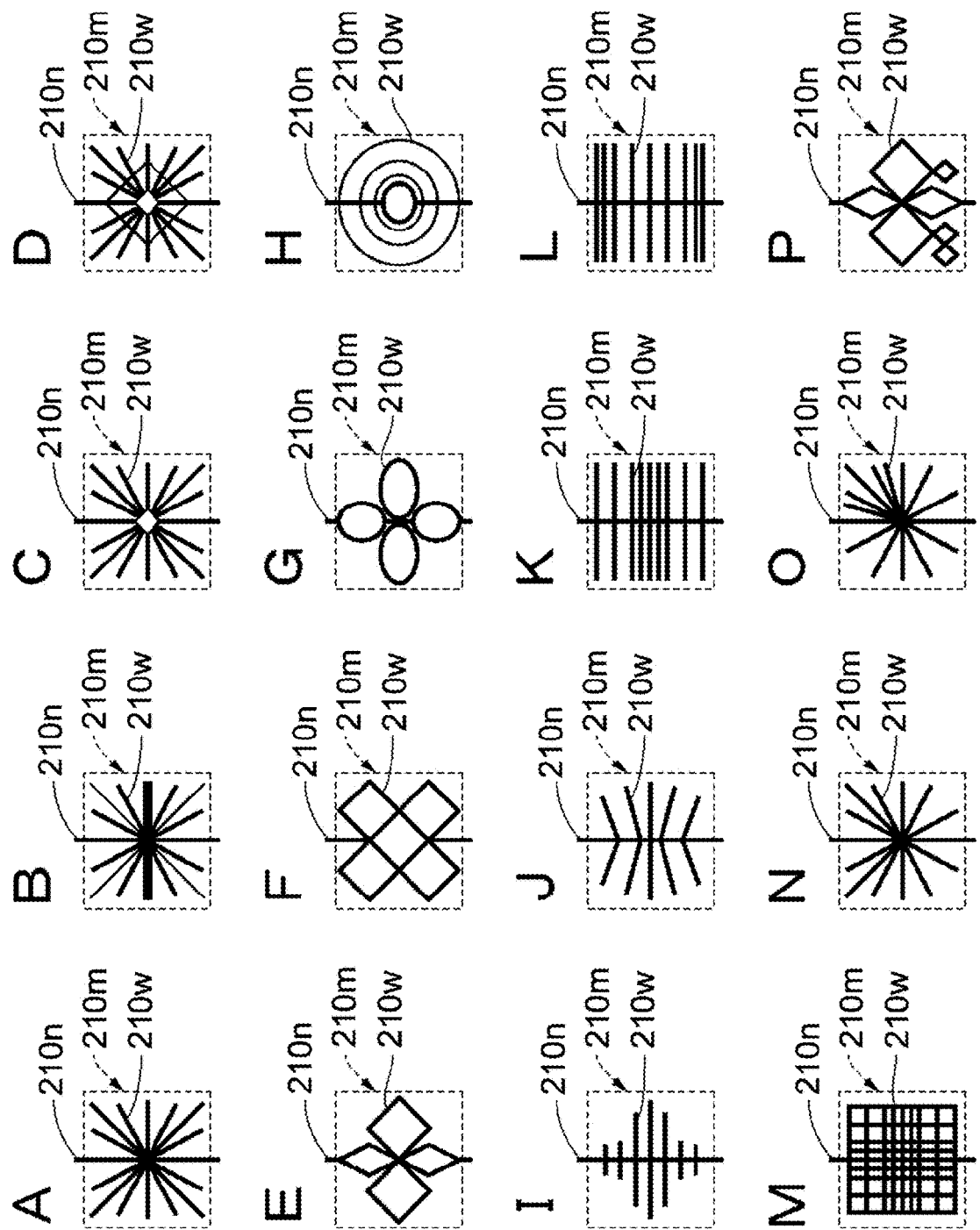
FIG. 23 A schematic view showing shape examples of unit electrode bodies of the first and second electrode wires shown in FIG. 22.

FIG. 23A to 23P is a schematic view showing shape examples of the unit electrode bodies 210m and 220m. FIG. 23A to 23P shows examples of the unit electrode body 210m, but the unit electrode body 220m may have those shapes.

FIG. 23A shows an example in which the unit electrode body 210m is formed by an aggregate of multiple linear electrode patterns radially extending from the center portion. FIG. 23B shows an example in which one of the radial linear electrodes shown in FIG. 23A is formed to be thicker than the other linear electrodes. This allows the amount of capacitance change on the thick linear electrode to be increased more than that on the other linear electrodes. Further, FIGS. 23C and 23D shows examples in which an annular linear electrode is disposed at substantially the center and linear electrodes are radially formed from the center. This allows the concentration of the linear electrodes at the center portion to be suppressed and the generation of a reduced-sensitivity region to be prevented.

FIG. 23E to 23H shows examples in which multiple linear electrodes each formed into an annular or rectangular annular shape are combined to form an aggregate. This allows the electrode density to be adjusted and the formation of a reduced-sensitivity region to be suppressed. Further, FIGS. 23I to 23L shows examples in which multiple linear electrodes each arrayed in the X-axis direction or the Y-axis direction are combined to form an aggregate. The adjustment of the shape, length, pitch, or the like of the linear electrodes allows a desired electrode density to be obtained. Further, FIG. 23M to 23P shows examples in which linear electrodes are disposed asymmetrically in the X-axis direction or the Y-axis direction.

The shapes of the unit electrode bodies 210m and 220m of the first and second electrode wires 210 and 220 may be combined in two sets of the same type or in two sets of different types out of the shapes shown in FIGS. 22A, 22B, and 23A to 23P. It should be noted that the shape of a portion other than the unit electrode bodies 210m and 220m, such as the coupling portions 210n and 220n, is not particularly limited and may be linear, for example.

Modified Example 3

In the first embodiment described above, the first structure 310 is disposed at substantially the center of the detection portion 20s, but the first structure 310 is not limited thereto. For example, the detection portion 20s may be disposed to be opposed to the second structure 410, and the second structure 410 may be disposed at substantially the center of the detection portion 20s.

Figure 24:
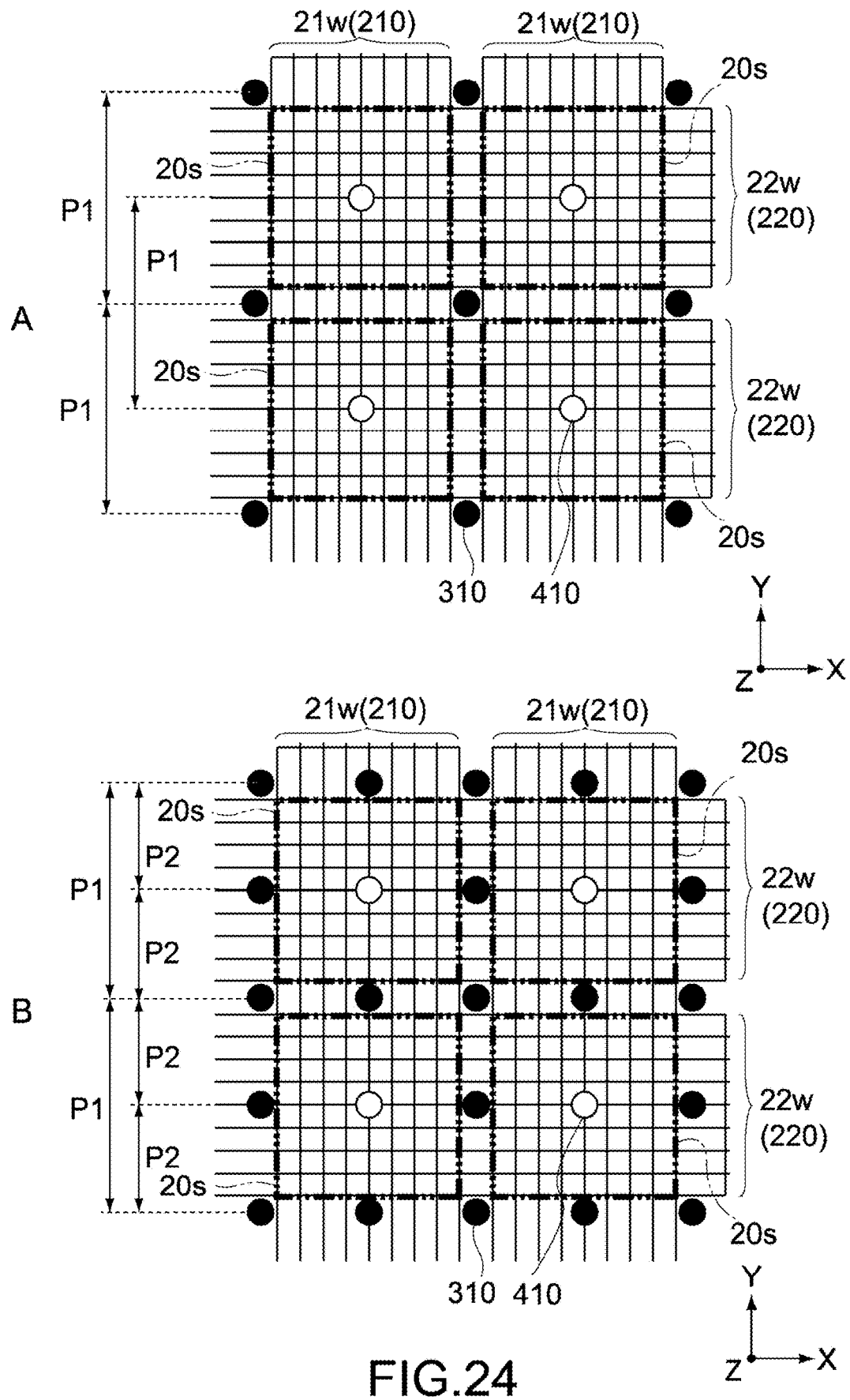
FIG. 24 A schematic plan view showing arrangement examples of the first and second structures and the first and second electrode wires according to a modified example 3 of the input device shown in FIG. 1.

FIG. 24A, B is a schematic plan view showing arrangement examples of the first and second structures 310 and 410 according to this modified example and the first electrode wires (X electrodes) 210 and the second electrode wires (Y electrodes) 220, and corresponding to FIG. 12A, B.

FIG. 24A corresponds to FIG. 12A and shows an example in which the number of first structures 310 and the number of second structures 410 are substantially the same. Further, in this modified example, the second structure 410 is disposed at substantially the center of the detection portion 20s. A pitch of the second structures 410 in the X-axis direction and the Y-axis direction is the same as a pitch of the detection portion 20s in the X-axis direction and the Y-axis direction. The pitch is P1. Further, the first structures 310 are disposed in the pitch P1, which is the same in the second structures 410, at regular intervals between the second structures 410 and between the detection portions 20s that are adjacent in an oblique direction forming approximately 45° with the X-axis and Y-axis directions.

Further, FIG. 24B corresponds to FIG. 12B and shows an example in which the number of first structures 310 and the number of second structures 410 are different from each other. In other words, the second structures 410 are disposed in the pitch P1 at substantially the center of each detection portion 20s, as in the example shown in FIG. 24A. On the other hand, the first structures 310 are different from FIG. 24A in arrangement and number and disposed in a pitch P2, which is ½ times of the pitch P1 of the second structures 410. When viewed in the Z-axis direction, the first structures 310 are disposed so as to surround the circumferences of the second structures 410 and the detection portions 20s. The first structures 310 are disposed in a larger number than the second structures 410, and thus the strength of the entire input device 100 can be enhanced.

Further, FIG. 25A, B is a schematic cross-sectional view showing a state of the modified example described above before and after the point P on the first surface 110 is pressed downward in the Z-axis direction with the operating element h. FIG. 25A shows a state before a press is actually performed and corresponds to FIG. 14. FIG. 25B shows a pressed state and corresponds to FIG. 15.

For example, in the case where the point P above a first space portion 330p0 is pressed downward, a region of the metal film 12 above the first space portion 330p0 is deflected downward, the first space portion 330p is crushed in the Z-axis direction, and the metal film 12 and the detection portion 20s come close to each other. Moreover, first structures 310p1 and 310p2 that are adjacent to the first space portion 330p0 also receive a force. With this force, regions connected to the first structures 310p1 and 310p2 in the electrode substrate 20 are also deflected downward, and the thickness of a second structure 410p0 is also slightly reduced by elastic deformation in the Z-axis direction. In other words, the detection portion 20s located below the operating element h and the conductive layer 50 come close to each other.

As described above, also in this modified example in which the second structures 410 are opposed to the detection portions 20s, a force can be transmitted in the thickness direction by the first and second structures 310 and 410, and the electrode substrate 20 can be easily deformed. Thus, as in the first embodiment, the input device 100 according to this modified example can efficiently change a capacitance of the detection portion 20s and highly accurately detect a pressing force and a pressing position.

Further, as shown in FIG. 25A, B, the second support 40 may include a laminate structure including a base material 41, a structure layer 42 provided on the surface (upper surface) of the base material 41, and multiple bonding portions 441 formed at predetermined positions on the structure layer 42. On the other hand, the first support 30 may not include such a laminate structure. This can enhance operability while keeping the strength of the input device 100 also in this modified example.

Modified Example 4

Figure 26:
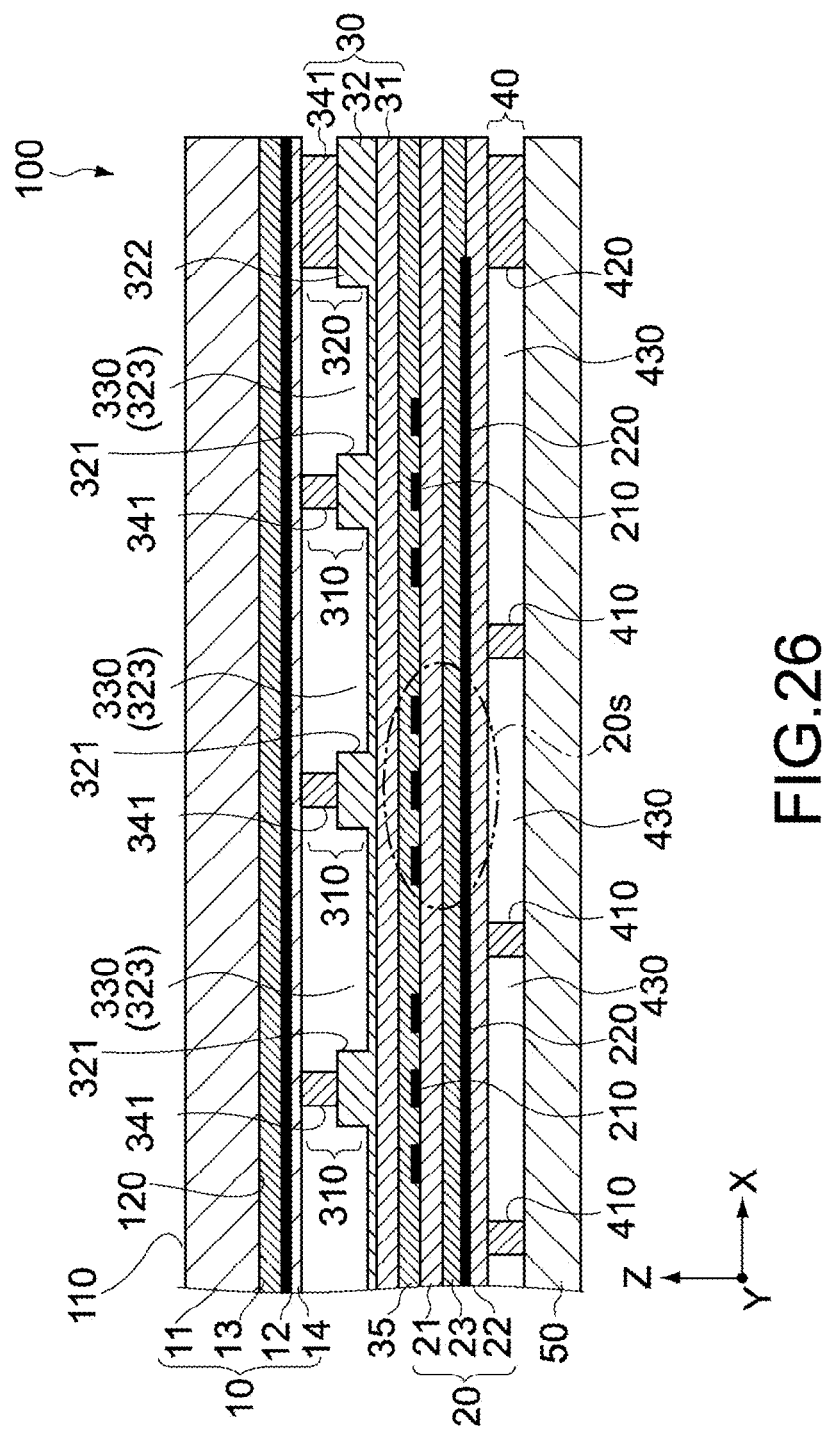
FIG. 26 A schematic cross-sectional view showing a configuration of a modified example 4 of the input device shown in FIG. 1.

FIG. 26 is a schematic cross-sectional view showing another modified example of this embodiment. As shown in the figure, the operation member 10 may include a protective film 14 that is disposed on the metal film 12 to face the first support 30. In other words, the protective film 14 is disposed to be opposed to the electrode substrate 20. The protective film 14 may be an antioxidant resin film or the like, and formed on the metal film 12 by coating, for example. Providing such a protective film 14 can prevent the metal film 12 from being corroded or broken. Therefore, the reliability of the metal film 12 can be enhanced, and favorable detection sensitivity can be kept.

Modified Example 5

The electrode substrate 20 is formed as a laminate of the first wiring substrate 21, the second wiring substrate 22, and the adhesion layer 23 therebetween, and the base material 31 of the first support 30 is disposed on the first wiring substrate 21 via the adhesion layer 35, but the configuration is not limited thereto. For example, the following configurations may be provided.

Configuration Example 1

The input device 100 (sensor device 1) may include an insulating cover layer instead of the base material 31 and the adhesion layer 35. Such a cover layer is made of, for example, an insulating UV curable resin or a thermoset resin, and the thickness may be several μm to several 100 μm. The cover layer may be a single layer or may include multiple layers. Further, the first structures 310 of the first support 30, the first frame 320, and the first space portion 330 are disposed on the cover layer. The first structures 310 and the first frame 320 can be formed by a screen printing method or a UV molding method, for example. Such a configuration can make the thickness of the electrode substrate 20 and the first support 30 thinner and contribute to a reduction in thickness of the input device 100.

Configuration Example 2

Figure 27:
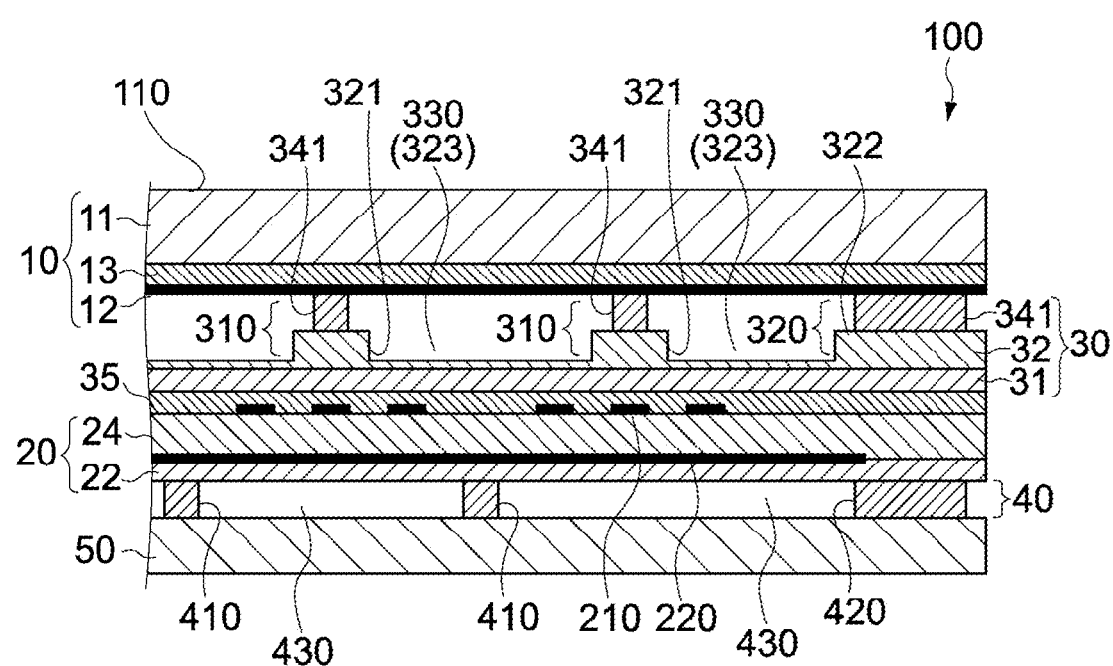
FIG. 27 A schematic cross-sectional view of a main part, showing a configuration example 2 of a modified example 5 of the input device shown in FIG. 1.
Figure 27:
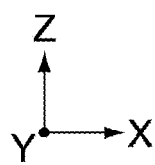

FIG. 27 is a schematic cross-sectional view of a main part, showing a configuration example 2 according to this modified example. As shown in the figure, this configuration example includes an insulating layer 24 instead of the first base material 211 and the adhesion layer 23. In other words, the insulating layer 24 is formed on the second wiring substrate 22 including the second electrode wires 220, and the first electrode wires 210 are formed thereon. The insulating layer 24 may be made of, for example, an insulating UV curable resin or a thermoset resin, and the thickness may be several μm to several 100 μm. Such a configuration can make the electrode substrate 20 thinner and contribute to a reduction in thickness of the entire input device 100. It should be noted that the input device 100 according to this configuration example may include a cover layer instead of the base material 31 and the adhesion layer 35, as described in the configuration example 1.

Configuration Example 3

Figure 28:
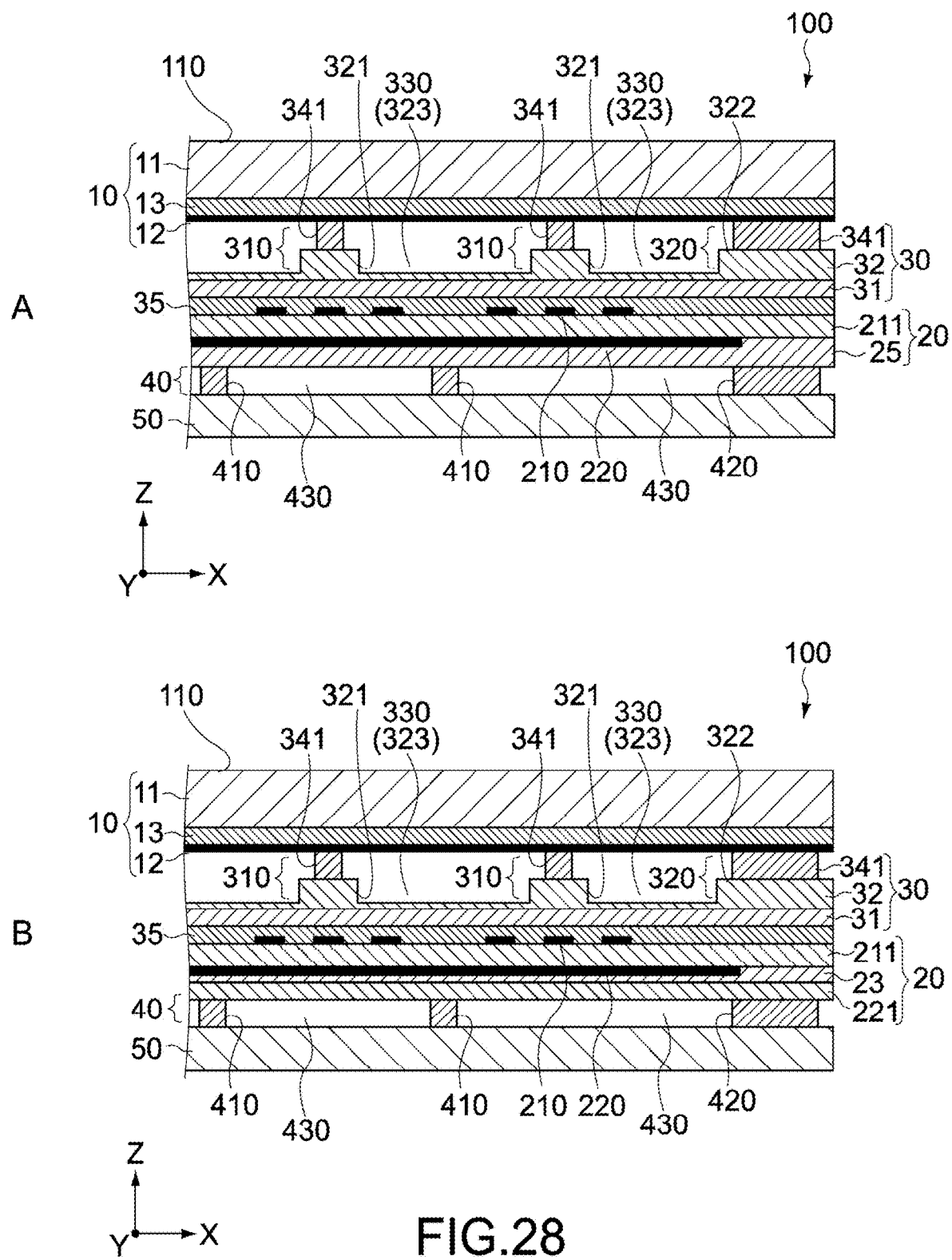
FIG. 28 A schematic cross-sectional view of a main part, showing a configuration example 3 of the modified example 5 of the input device shown in FIG. 1.

FIG. 28A, B is a schematic cross-sectional view of a main part, showing a configuration example 3 according to this modified example. As shown in FIG. 28A, an electrode substrate 20 according to this configuration example includes one base material 211, and first electrode wires 210 and second electrode wires 220 are formed on both surfaces of the base material 211. In other words, the base material 211 has a configuration in which two-layer electrodes are formed by both-side printing. In this case, as shown in FIG. 28A, a cover layer 25 may be formed on the surface (lower surface) of the base material 211 on which the second electrode wires 220 are formed. The cover layer 25 may be made of, for example, an insulating UV curable resin or a thermoset resin, and the thickness may be several μm to several 100 μm. Alternatively, as shown in FIG. 28B, an adhesion layer 23 and a second base material 221 may be formed on the lower surface of the first base material 211, both the surfaces of which includes the first and second electrode wires 210 and 220. Further, though not shown in the figure, a configuration in which the second support 40 is directly formed on the lower surface of the base material 211 may be provided. It should be noted that the input device 100 according to this configuration example may include a cover layer instead of the base material 31 and the adhesion layer 35, as described in the configuration example 1.

Configuration Example 4

Figure 29:
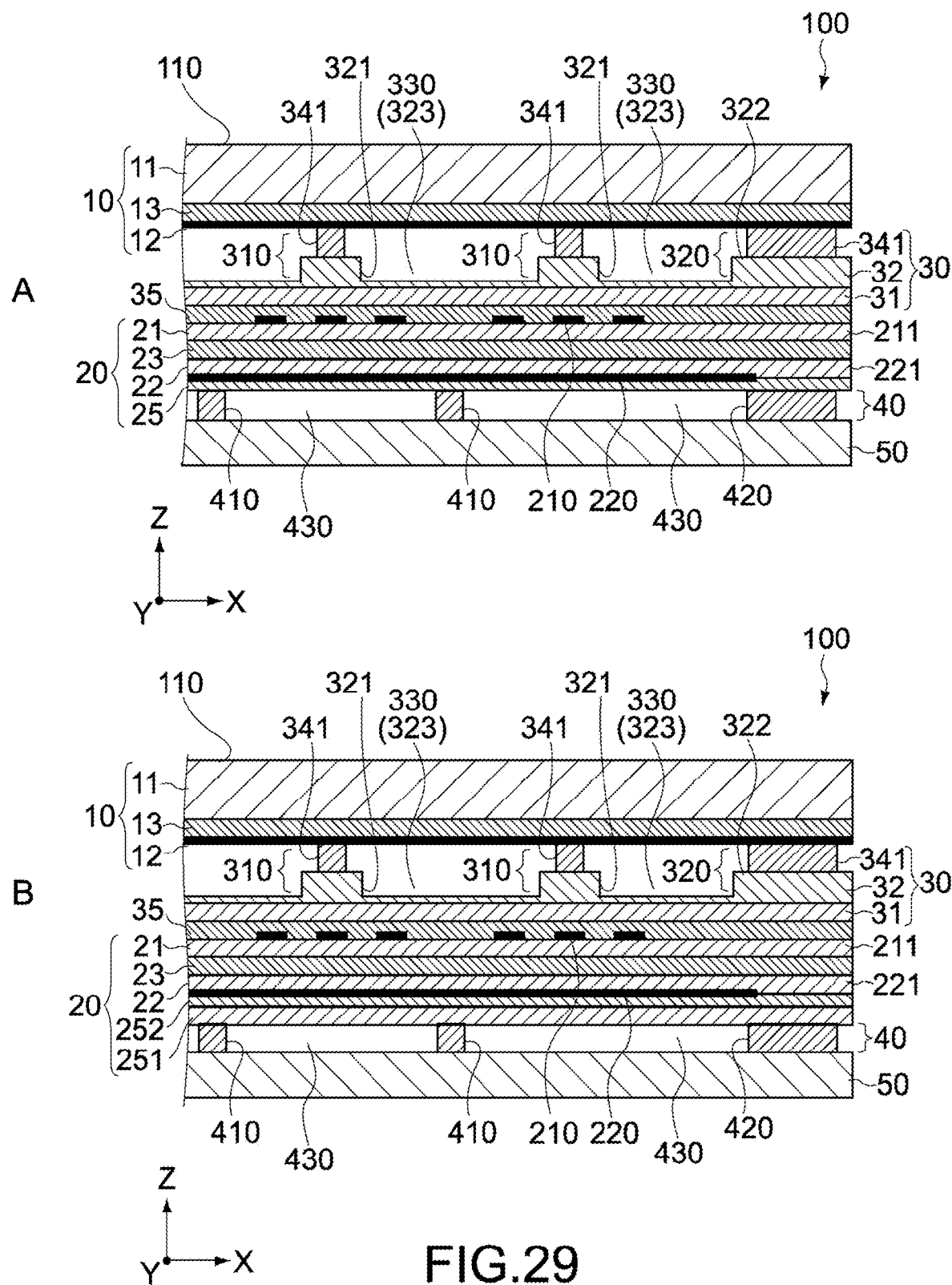
FIG. 29 A schematic cross-sectional view of a main part, showing a configuration example 4 of the modified example 5 of the input device shown in FIG. 1.

FIG. 29A, B is a schematic cross-sectional view of a main part, showing a configuration example 4 according to this modified example. As shown in the figure, an electrode substrate 20 according to this configuration example includes a first wiring substrate 21 including first electrode wires 210 and a first base material 211, a second wiring substrate 22 including second electrode wires 220 and a second base material 221, and an adhesion layer 23, but the orientation of the second wiring substrate 22 with respect to the first wiring substrate 21 is different from that of the configuration shown in FIG. 3 or the like. In other words, the second electrode wires 220 are not formed on the side facing the adhesion layer 23 but formed to face the second support 40. In this case, as shown in FIG. 29A, an insulating cover layer 25 may be formed on the lower surface of the second base material 221. Alternatively, as shown in FIG. 29B, an adhesion layer 252 and a third base material 251 may be formed on the lower surface of the second base material 221. Further, though not shown in the figure, a configuration in which the second support 40 is directly formed on the lower surface of the second base material 221 may be provided. It should be noted that the input device 100 according to this configuration example may include an insulating cover layer instead of the base material 31 and the adhesion layer 35, as described in the configuration example 1.

Configuration Example 5

Figure 30:
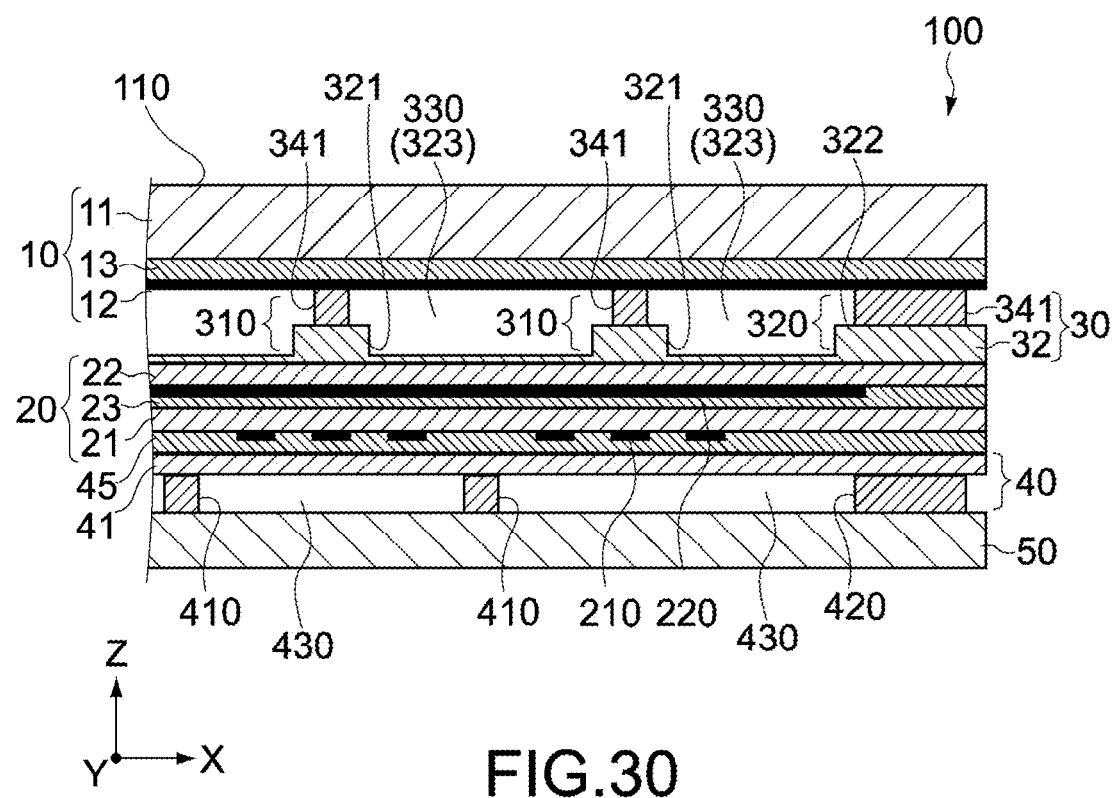
FIG. 30 A schematic cross-sectional view of a main part, showing a configuration example 5 of the modified example 5 of the input device shown in FIG. 1.

FIG. 30 is a schematic cross-sectional view of a main part, showing a configuration example 5 according to this modified example. As shown in the figure, an electrode substrate 20 is disposed such that the configuration described with reference to FIG. 3 or the like is turned upside down. Further, the first support 30 does not include the base material 31, and the second support 40 includes the base material 41 formed on the electrode substrate 20 side. In this case, as shown in FIG. 30, an adhesion layer 45 may be provided between the base material 41 of the second support 40 and the first wiring substrate 21 of the electrode substrate 20, and an adhesion layer may not be provided between the electrode substrate 20 and the first support 30. It should be noted that this configuration example may be combined with the configurations described as the configuration examples 1 to 4 as appropriate. For example, the base material 41 and the adhesion layer 45 can be the cover layer as described above.

Second Embodiment

Figure 31:
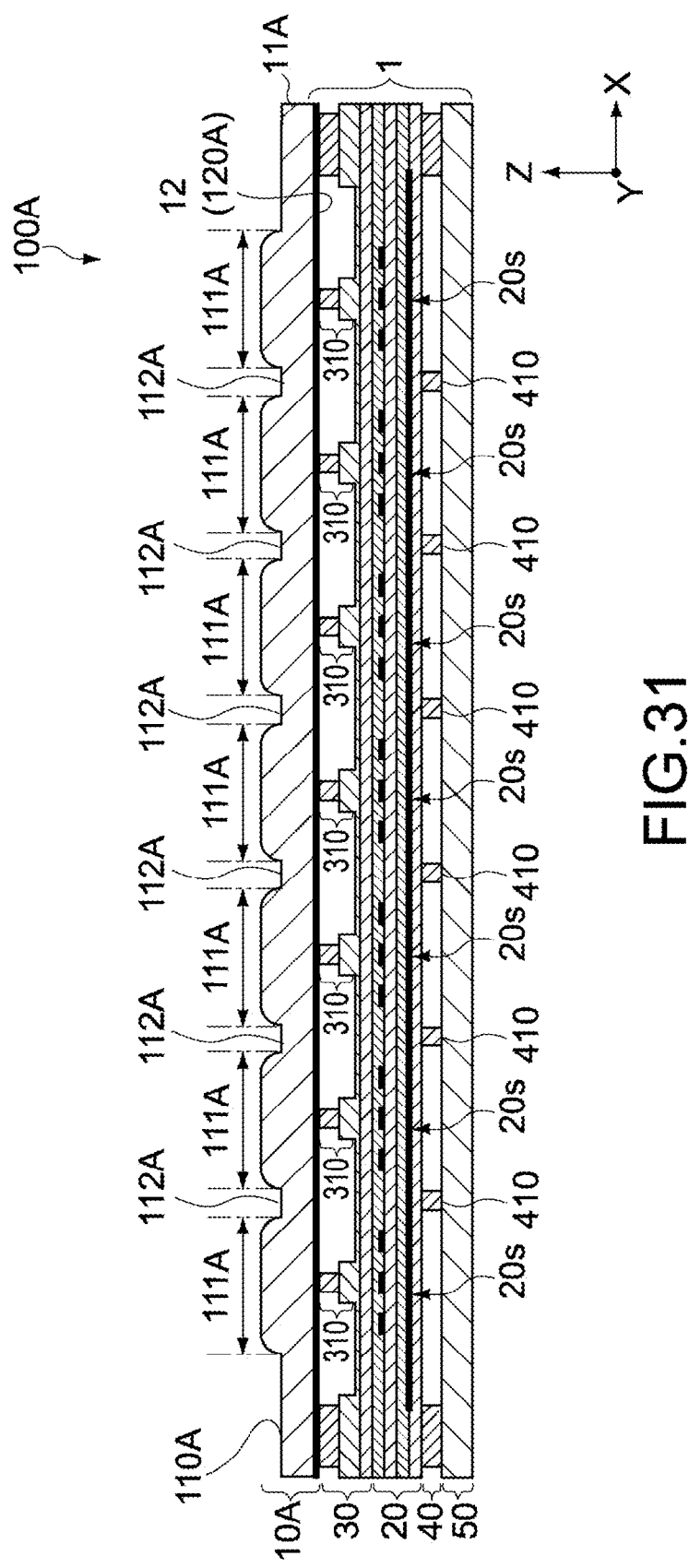
FIG. 31 A schematic cross-sectional view of an input device according to a second embodiment of the present technology.

FIG. 31 is a schematic cross-sectional view of an input device 100A according to a second embodiment of the present technology. A configuration other than an operation member 10A of the input device 100A according to this embodiment is similar to that of the first embodiment, and description thereof will be omitted as appropriate. FIG. 31 is a view corresponding to FIG. 1 according to the first embodiment.

(Overall Configuration)

The input device 100A according to this embodiment includes a flexible sheet 11A instead of the flexible display, and a sensor device 1 similar to that of the first embodiment. As will be described later, multiple key regions 111A are disposed on the flexible sheet 11A, and the input device 100A is used as a keyboard device as a whole.

(Input Device)

The flexible sheet 11A is formed of an insulating plastic sheet having flexibility, which is made of PET (polyethylene terephthalate), PEN (polyethylene naphthalate), PMMA (polymethylmethacrylate), PC (polycarbonate), PI (polyimide), or the like. The thickness of the flexible sheet 11A is not particularly limited and is approximately several 10 μm to several 100 μm, for example.

It should be noted that the flexible sheet 11A is not limited to a single-layer structure and may have a configuration of a laminate of two or more sheets. In this case, in addition to the plastic sheet described above, an insulating plastic sheet having flexibility made of PET, PEN, PMMA, PC, PI, or the like may be laminated as a base material, for example.

The flexible sheet 11A includes a first surface 110A as an operation surface and a second surface 120A as a back surface of the first surface 110A. On the first surface 110A, the multiple key regions 111A are arrayed. On the second surface 120A, a metal film 12 is laminated.

The flexible sheet 11A and the metal film 12 may be formed of a composite sheet or the like in which metal foil is previously attached to the surface of a resin sheet, or may be formed of a deposited film, a sputtering film, or the like formed on the second surface 120A. Alternatively, the flexible sheet 11A and the metal film 12 may be a coating film of a conductive paste or the like that is printed on the second surface 120A.

Each of the key regions 111A corresponds to a keycap that is subjected to a pressing operation by the user, and has a shape and size corresponding to the type of a key. Each of the key regions 111A may be provided with an appropriate key indication. The key indication may indicate the type of a key, a position (outline) of an individual key, or both of them. For the indication, an appropriate printing method such as screen printing, flexographic printing, and gravure offset printing can be adopted.

The first surface 110A has a form in which a groove portion 112A is formed around each of the key regions 111A. For formation of a concave-convex surface corresponding to the key regions 111A, an appropriate processing technology such as press forming, etching, and laser processing can be adopted. Alternatively, a flexible sheet 11A including a concave-convex surface may be formed by a molding technology such as injection molding.

Figure 32:
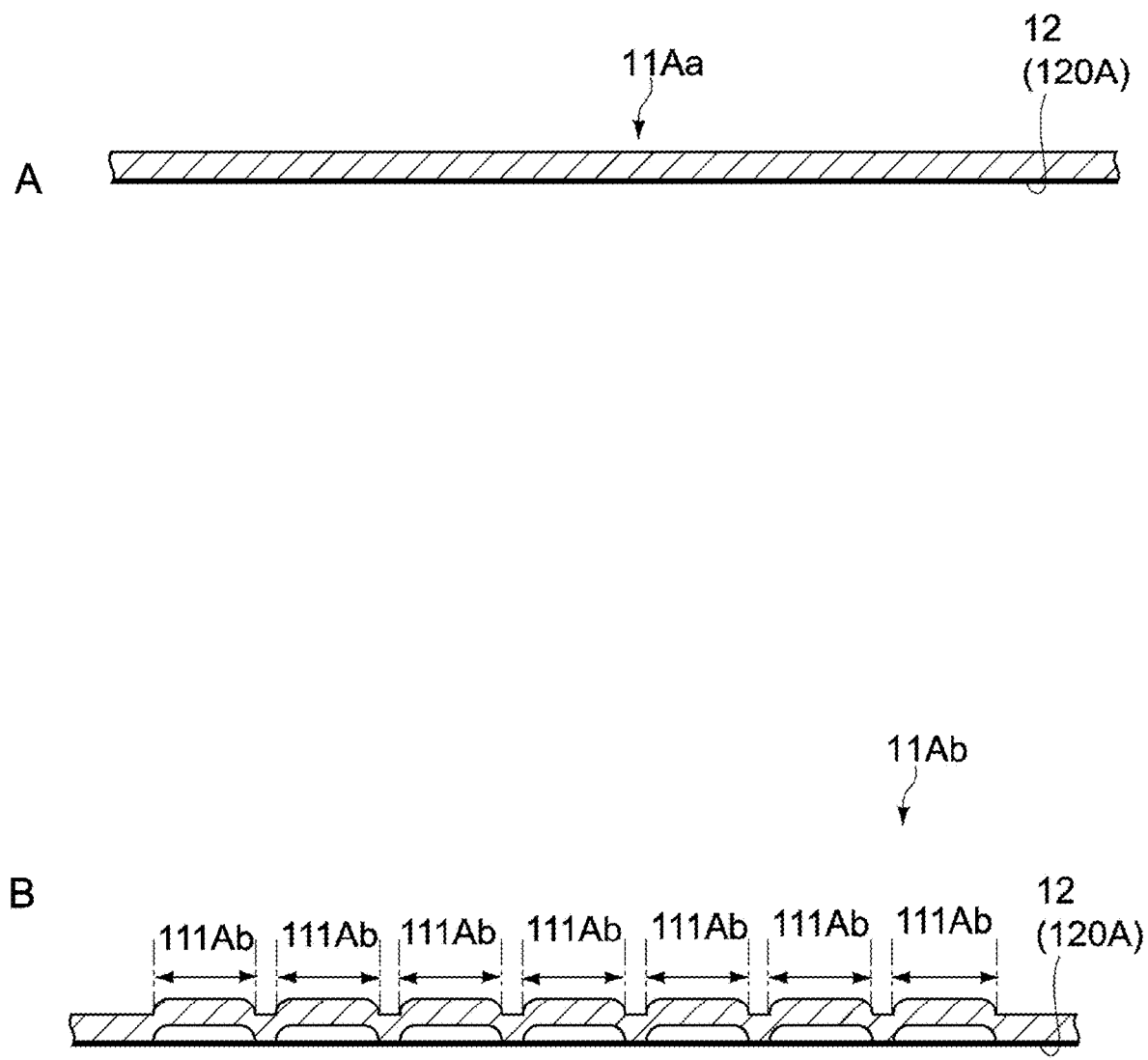
FIG. 32 A schematic cross-sectional view showing a configuration example of an operation member of the input device.

Further, the configuration of the flexible sheet 11A is not limited to the example described above. For example, FIG. 32A, B is a schematic view showing a modified example of the flexible sheet 11A. A flexible sheet 11Aa shown in FIG. 32A shows an example in which a first surface 110A is formed of a flat surface. In this case, each key region (not shown) may be described by printing or the like, or the flexible sheet 11Aa may not include key regions and may be used as a touch sensor. Further, a flexible sheet 11Ab shown in FIG. 32B is formed by performing press forming on the flexible sheet 11A, for example, and each of key regions 111Ab is formed to be independently deformable in the vertical direction (sheet thickness direction).

Further, the flexible sheet 11A may be made of a material having conductivity, such as metal. This can make the metal film 12 unnecessary and the operation member 10A thinner. In this case, the flexible sheet 11A has a function of the metal film 12 as well and is connected to a ground potential, for example.

In this embodiment, when a user performs a key input operation, the user presses the center portion of the key region 111A. In this regard, first and second structures 310 and 410 and detection portions 20s can be disposed as follows.

Arrangement Example 1

For example, as shown in FIG. 31, the first structure 310 of the first support 30 may be disposed below the key region 111A. In this case, the detection portion 20s is disposed at a position overlapping with the first structure 310 when viewed in the Z-axis direction, and the second structure 410 is disposed below the groove portion 112A between the first structures 310 adjacent to each other.

In the arrangement example 1, the position above the first structure 310 is pressed at the time of a key input operation. As described with reference to FIG. 15A, this allows each of the metal film 12 and the conductive layer 50 and the detection portion 20s to come close to each other and a capacitance change of the detection portion 20s to be obtained.

Further, the shape of the first structure 310 is not limited to a columnar body or the like as shown in FIG. 12, and may be disposed to be wall-like along the groove portion 112A, for example. In this case, each second structure 410 is disposed along a boundary between the multiple key regions 111A.

Arrangement Example 2

Alternatively, the first structure 310 may be disposed below the groove portion 112A. In this case, the second structure 410 is disposed below the key region 111A between the first structures 310 adjacent to each other. Further, the detection portion 20s is disposed at a position overlapping with the first structure 310 when viewed in the Z-axis direction.

In the arrangement example 2, as described with reference to FIG. 15B, a position above the first space portion 330 is pressed at the time of a key input operation, and thus the metal film 12 and the detection portion 20s come close to each other. Further, the first structures 310, which are adjacent to the first space portion 330 immediately below the operation position, are displaced downward and the electrode substrate 20 is deflected, and thus the second structure 410 is also slightly elastically deformed. Therefore, each of the metal film 12 and the conductive layer 50 and the detection portion 20s come close to each other, and a capacitance change of the detection portion 20s can be obtained.

It should be noted that the arrangement of the detection portions 20s is not limited to the above, and the detection portions 20s may be disposed to overlap with the second structures 410.

As described above, the control unit 60 includes the arithmetic unit 61 and the signal generation unit 62 and is electrically connected to the electrode substrate 20. Additionally, in this embodiment, the control unit 60 is configured to be capable of generating information on an input operation made on each of the multiple key regions 111A based on the outputs of the multiple detection portions 20s. In other words, the arithmetic unit 61 calculates an operation position in the XY coordinate system on the first surface 110 based on electrical signals (input signals) output from the first and second electrode wires 210 and 220 of the electrode substrate 20 and determines a key region 111A that is assigned to the operation position. The signal generation unit 62 generates an operation signal corresponding to the key region 111A on which the press is detected.

The input device 100A is incorporated into an electronic apparatus such as a laptop personal computer and a mobile phone and can thus be applied as a keyboard device as described above. Additionally, the input device 100A includes a communication unit (not shown), and may thus be electrically connected to another electronic apparatus such as a personal computer in a wired or wireless manner and capable of performing an input operation for controlling the electronic apparatus.

Further, the input device 100A can also be used as a pointing device as described in the first embodiment. In other words, two or more threshold values are set for an output of each detection portion 20s, and the arithmetic unit 61 determines a touch operation or a push operation, thus achieving an input device that doubles as a pointing device and a keyboard.

Modified Example

Figure 33:
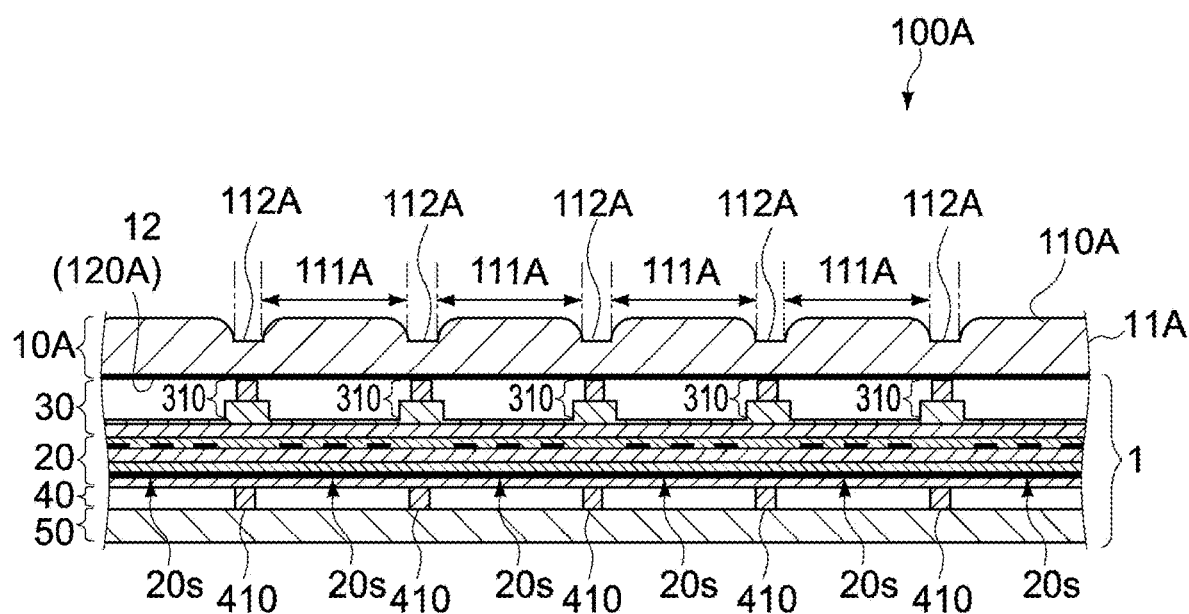
FIG. 33 An enlarged cross-sectional view showing a configuration of a modified example of the input device shown in FIG. 31.

FIG. 33 is an enlarged cross-sectional view showing an input device 100A of a modified example according to this embodiment. The input device 100A shown in the figure does not have a configuration in which multiple second structures 410 are each disposed between multiple first structures 310 adjacent to each other, but has a configuration in which at least part of the multiple first structures 310 is disposed to be opposed to at least part of the multiple second structures 410 in the Z-axis direction. Moreover, the first structures 310 and the second structures 410 that are disposed to be opposed to each other in the Z-axis direction are disposed to be opposed to the groove portions 112A in the Z-axis direction and are disposed at boundaries between the multiple key regions 111A.

Figure 34:
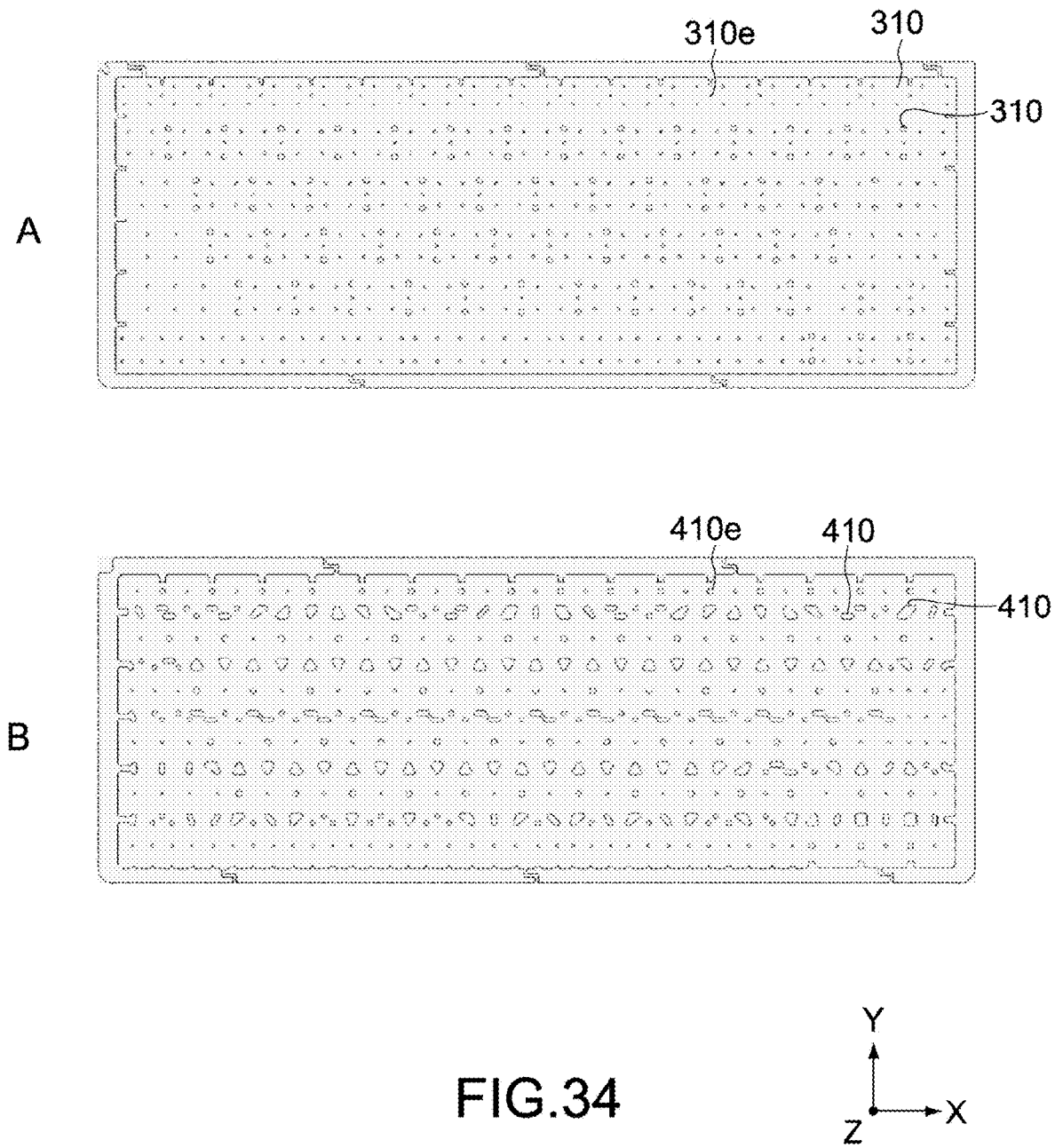
FIG. 34 A plan view showing an arrangement example of first and second structures of the input device shown in FIG. 33, in which A shows the first structures and B shows the second structures.

FIG. 34A is a plan view showing an arrangement example of the first structures 310. FIG. 34B is a plan view showing an arrangement example of the second structures 410. In this modified example, as will be described later, the multiple first structures 310 and the multiple second structures 410 are disposed to correspond to the arrangement of the multiple key regions 111A. Additionally, the multiple first structures 310 have various types of shapes corresponding to the arrangement thereof, and the multiple second structures 410 also have various types of shapes corresponding to the arrangement thereof. Further, when viewed in the Z-axis direction, the multiple first structures 310 and the multiple second structures 410 are configured such that a first structure 310e in the first structures 310 shown in FIG. 34A and a second structure 410e in the second structures 410 shown in FIG. 34B overlap each other.

Figure 35:
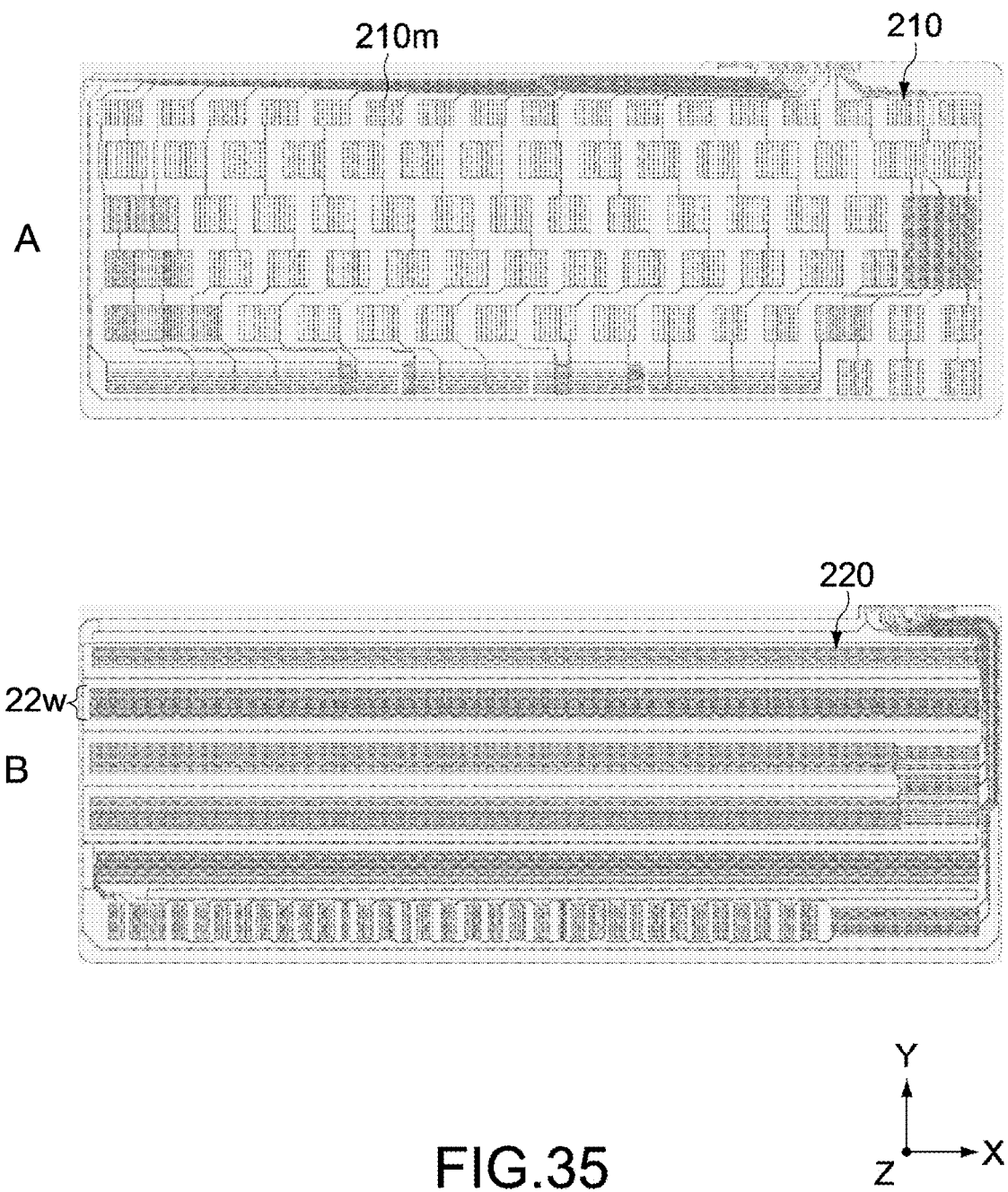
FIG. 35 A plan view showing a configuration example of multiple first and second electrode wires of the input device shown in FIG. 33, in which A shows the first electrode wires and B shows the second electrode wires.

FIG. 35A is a plan view showing a configuration example of multiple X electrodes 210. FIG. 35B is a plan view showing a configuration example of multiple Y electrodes 220. As shown in FIG. 35A, each of the X electrodes 210 includes multiple unit electrode bodies 210m, and the unit electrode bodies 210m are connected to each other in the Y-axis direction by electrode wires. Each of the unit electrode bodies 210m includes multiple sub-electrodes and is disposed to correspond to each of the key regions 111A. On the other hand, as shown in FIG. 35B, the Y electrodes 220 are formed of electrode groups 22w each including multiple electrode wires extending in the X-axis direction. An intersection region of each unit electrode body 210m of the X electrode 210 and each electrode group 22w of the Y electrode forms a detection portion 20s, and the detection portion 20s is formed to correspond to each key region 111A. It should be noted that the configuration is not limited to the configuration described above, and a configuration in which the X electrode 210 includes multiple electrode groups and the Y electrode 220 includes multiple unit electrode bodies may be provided.

In this modified example, intersection points of the sub-electrodes in the unit electrode bodies 210m and electrode wires in the electrode group 22w are densely disposed at the center portion of each of the key regions 111A. This allows detection sensitivity when the key region 111A is pressed to be improved.

Figure 36:
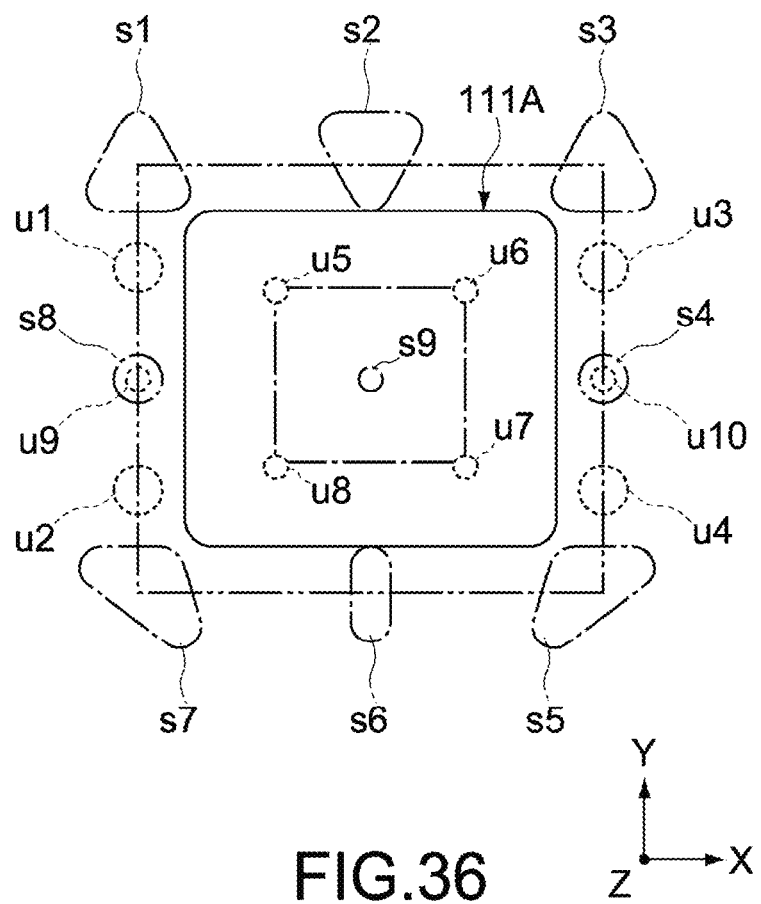
FIG. 36 An enlarged plan view showing an arrangement example of first and second structures shown in FIG. 34.

FIG. 36 is an enlarged plan view showing an arrangement example of the first structures 310 and the second structures 410 and is a view showing one key region 111A. In the figure, the first structures 310 are denoted by reference symbols u1 to u10 and the second structures 410 are denoted by reference symbols s1 to s9, for convenience sake.

As shown in the figure, a first structure u9 and a second structure s8 are disposed to be opposed to each other, and a first structure u10 and a second structure s4 are disposed to be opposed to each other, in the Z-axis direction on the sides indicated by chain double-dashed lines around the key region 111A along the Y-axis direction. In such a manner, in a region in which the first structure 310 and the second structure 410 are disposed to overlap each other in the Z-axis direction, a distance between each of the metal film 12 and the conductive layer 50 and the electrode substrate 20 is hard to change, and detection sensitivity as a sensor is low. Further, in the region, when a certain key region 111A is pressed, the deformation of the flexible sheet 11A (metal film 12) and the electrode substrate 20 is hard to propagate to another key region 111A. Therefore, the first structures u9 and u10 and the second structures s8 and s4, which are opposed to each other in the Z-axis direction, respectively, are disposed around the key region 111A, and thus malfunctions between key regions 111A that are adjacent particularly in the X-axis direction can be prevented.

It should be noted that first structures and second structures that are opposed to each other in the Z-axis direction may be disposed on a side along the X-axis direction around the key region 111A. Specifically, the first structures may be disposed above the second supports s1 to s3 and s5 to s7. In this case, malfunctions between key regions 111A that are adjacent in the Y-axis direction can be prevented.

Moreover, as shown in the figure, the multiple first structures u5 to u8 are disposed within the key region 111A. The first structures u5 to u8 disposed without overlapping with the second structures efficiently deform the flexible sheet 11A (key region 111A) and the electrode substrate 20 as described above, and thus detection sensitivity within the key region 111A can be improved.

If only one first structure is disposed within the key region 111A, in the case where a region distant from the first structure is pressed, the flexible sheet 11A and the electrode substrate 20A cannot be efficiently deformed. In particular, in the case where a pressing operation is made with an operating element having a small contact area, such as a claw and a stylus, there is a possibility that sensitivity varies depending on the position in the key region 111A. In contrast to this, in this modified example, the multiple first structures u5 to u8 are symmetrically disposed in the key region 111A, and thus high detection sensitivity can be kept irrespective of the pressing position in the key region 111A or the contact area of the operating element.

Moreover, intersection points of the sub-electrodes in the unit electrode bodies 210m and electrode wires in the electrode groups 22w may be densely disposed inside and in the vicinity of a region defined by the first structures u5 to u8 (region indicated by a dashed-dotted line of FIG. 36). This allows detection sensitivity when the key region 111A is pressed to be improved more.

The second structure s9 is disposed at substantially the center of the key region 111A. If no structure is disposed at the center portion of the key region 111A, the center portion tends to have a large deformation amount in the flexible sheet 11A and the electrode substrate 20, as compared to the circumferential portion. This has caused a difference in detection sensitivity between the center potion of the key region 111A and the circumferential portion. In this regard, the second structure s9 is disposed at substantially the center of the key region 111A, and thus the detection sensitivity in the center portion of the key region 111A and the circumferential portion can be uniformly kept.

On the other hand, around the key region 111A, the first structures u1 to u4 and the second structures s1 to s3 and s5 to s7 are disposed without overlapping each other. Those first and second structures u1 to u4, s1 to s3, and s5 to s7 are formed to be larger than the first and second structures u5 to u8 and s9, which are disposed within the key region 111A. This can enhance the adhesiveness between the first and second structures, and the electrode substrate 20, the flexible sheet 11A, and the like and enhance the strength as the input device 100A. Further, this can suppress the deformation around the key region 111A and prevent malfunctions.

Further, as shown in FIG. 36, the first and second structures disposed around each of the key regions 111A are desirably spaced away from each other. If the first and second structures surround the key region 111A without gaps, an internal pressure rises in the first space portion 330 and the second space portion 430 in the key region 111A. This may cause a slow restoration of the flexible sheet 11A and the electrode substrate 20 from deformation and a reduction in detection sensitivity. In this regard, disposing the first and second structures to be spaced away from each other can prevent the detection sensitivity from being reduced, without hindering air from moving in the first space portion 330 and the second space portion 430.

Third Embodiment

Figure 37:
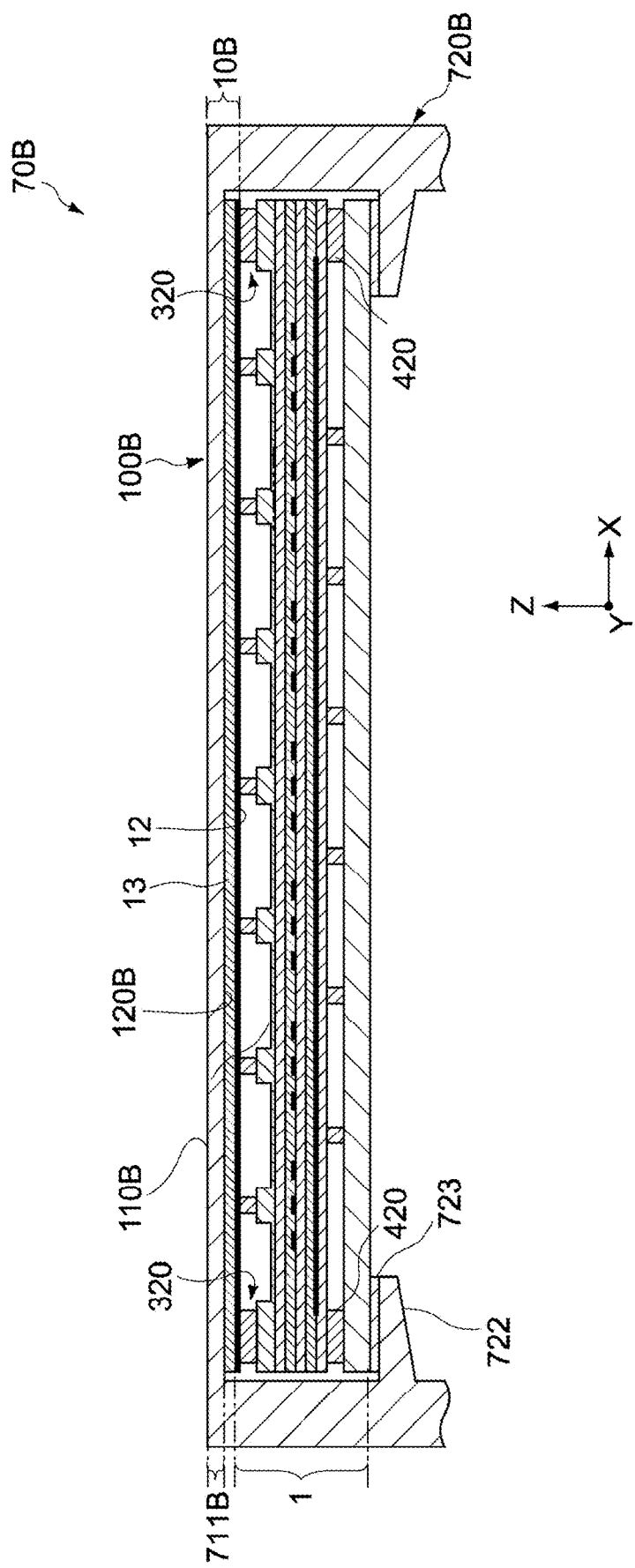
FIG. 37 A schematic cross-sectional view of an electronic apparatus in which an input device according to a third embodiment of the present technology is incorporated.

FIG. 37 is a schematic cross-sectional view of an electronic apparatus 70B in which an input device 100B according to a third embodiment of the present technology is incorporated. A configuration other than an operation member 10B of the input device 100B according to this embodiment is similar to that of the first embodiment, and description thereof will be omitted as appropriate.

In the input device 100B according to this embodiment, a part of a casing 720B of the electronic apparatus 70B forms a part of the operation member 10B. In other words, the input device 100B includes an operation region 721B that forms a part of the casing 720B, and a sensor device 1 similar to that of the first embodiment. As the electronic apparatus 70B, for example, a personal computer or the like equipped with a touch sensor can be applied.

The operation member 10B has a laminate structure of an operation region 721B and a metal film 12. The operation region 721B includes a first surface 110B and a second surface 120B and is deformable. In other words, the first surface 110B is one surface of the casing 720B, and the second surface 120B is a back surface (inner surface) of the one surface.

The operation region 721B may be made of the same material as other regions of the casing 720B, for example, a conductive material such as an aluminum alloy and a magnesium alloy or a plastic material. In this case, the operation region 721B is formed to have a thickness in which the operation region 721B is deformable when a user makes a touch operation or a push operation. Alternatively, the operation region 721B may be made of a material different from other regions of the casing 720B. In this case, a material having small rigidity than the other regions can be adopted.

Further, on the second surface 120B, the metal film 12 such as metal foil, which is formed on a viscous adhesion layer 13, is formed. In the case where the operation region 721B is made of a conductive material, the metal film 12 is unnecessary and the operation member 10B can be made thinner. In this case, the operation region 721B also has a function as the metal film 12 and is connected to a ground potential, for example.

As described above, the input device 100B according to this embodiment can be formed using a part of the casing 720B made of a conductive material or the like. This is because, as described above, the input device 100B does not detect an input operation using capacitive coupling between the operating element and the X and Y electrodes, but uses capacitive coupling between each of the metal film 12 and the conductive layer 50 and the detection portion 20s, the metal film 12 being pressed with the operating element, the conductive layer 50 being opposed to the metal film 12. Therefore, according to the input device 100B, the number of components of the electronic apparatus 70B can be reduced, and productivity can be enhanced more.

Further, the input device 100B according to this embodiment includes the sensor device 1 similar to that of the first embodiment described above and can thus highly accurately detect an operation position and a pressing force even for a minute pressing force. Therefore, according to this embodiment, there are less limits on the material of the operation region 721B, and the input device 100B having high detection sensitivity can be provided.

Fourth Embodiment

Figure 38:
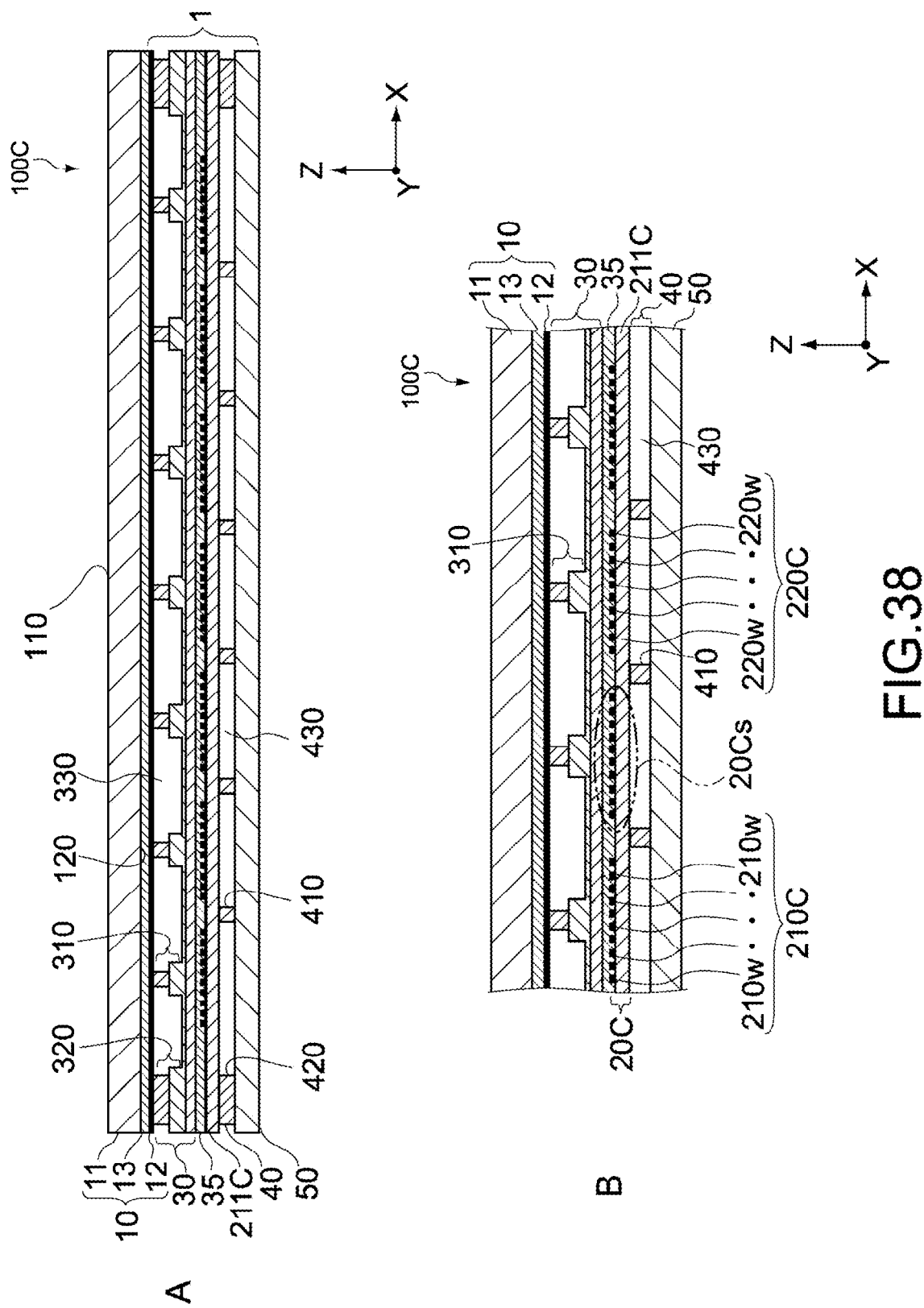
FIG. 38 A view showing a configuration of an input device according to a fourth embodiment of the present technology, in which A is a schematic cross-sectional view and B is an enlarged cross-sectional view showing the main part of A.

FIG. 38A is a schematic cross-sectional view of an input device 100C according to a fourth embodiment of the present technology. FIG. 38B is a cross-sectional view showing a main part of the input device 100C in an enlarged manner. This embodiment is different from the first embodiment in that the electrode substrate 20 electrostatically detects a change in distance from each of the metal film 12 and the conductive layer 50 based on the amount of capacitive coupling change in the XY plane. In other words, a Y electrode 220C includes an opposed portion that is opposed to an X electrode 210C in an in-plane direction of an electrode substrate 20C, and the opposed portion forms a detection portion 20Cs.

The electrode substrate 20 includes a base material 211C on which multiple first electrode wires (X electrodes) 210C and multiple second electrode wires (Y electrodes) 220C are disposed, the multiple X electrodes 210C and Y electrodes 220C being disposed on the same plane.

Figure 39:
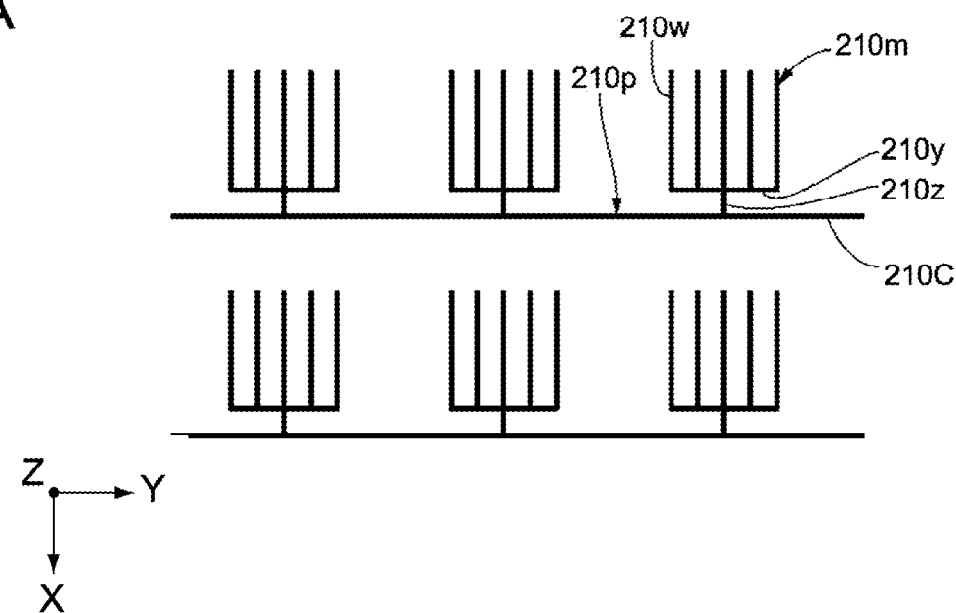
FIG. 39 A schematic plan view showing a configuration example of first and second electrode wires of the input device shown in FIG. 38, in which A shows the first electrode wires and B shows the second electrode wires.
Figure 39:
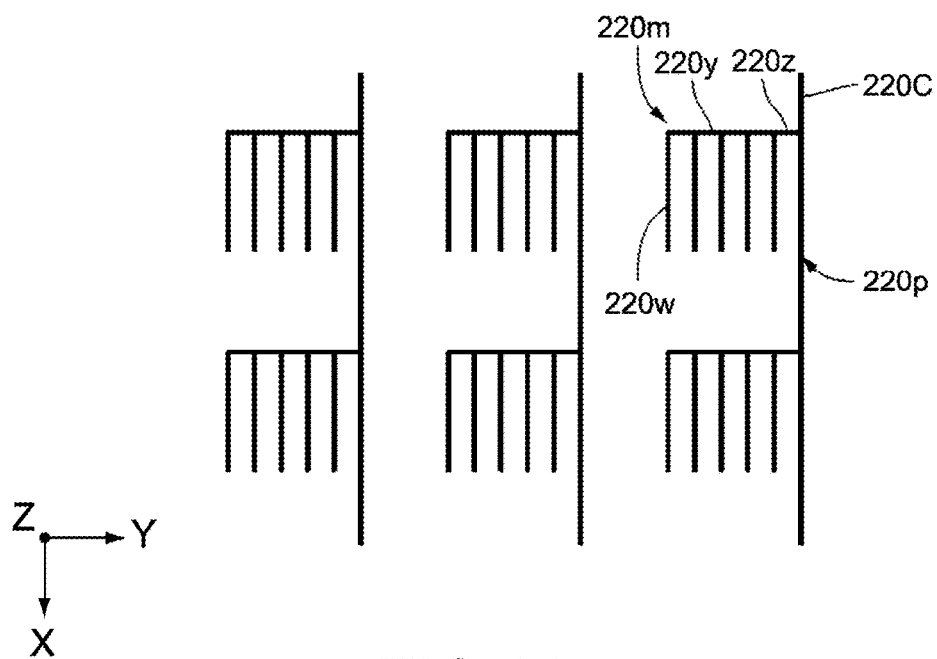

With reference to FIG. 39A, B, description will be given on an example of a configuration of the X electrodes 210C and the Y electrodes 220C. Here, an example is shown in which each of the X electrodes 210C includes multiple unit electrode bodies (first unit electrode bodies) 210m each having a pectinate shape and each of the Y electrodes 220C includes multiple unit electrode bodies (second unit electrode bodies) 220m each having a pectinate shape, and one unit electrode body 210m and one unit electrode body 220m form each detection portion 20Cs.

As shown in FIG. 39A, the X electrode 210C includes the multiple unit electrode bodies 210m, an electrode wire portion 210p, and multiple connection portions 210z. The electrode wire portion 210p is extended in the Y-axis direction. The multiple unit electrode bodies 210m are disposed at constant intervals in the Y-axis direction. The electrode wire portion 210p and the unit electrode bodies 210m are disposed to be spaced away from each other at predetermined intervals and are connected by the connection portions 210z.

As described above, the unit electrode bodies 210m each have a pectinate shape as a whole. Specifically, the unit electrode bodies 210m each include multiple sub-electrodes 210w and a coupling portion 210y. The multiple sub-electrodes 210w are extended in the X-axis direction. Adjacent sub-electrodes 210w are spaced away from each other at predetermined intervals. One end of each sub-electrode 210w is connected to the coupling portion 210y extended in the X-axis direction.

As shown in FIG. 39B, the Y electrode 220C includes the multiple unit electrode bodies 220m, an electrode wire portion 220p, and multiple connection portions 220z. The electrode wire portion 220p is extended in the X-axis direction. The multiple unit electrode bodies 220m are disposed at constant intervals in the X-axis direction. The electrode wire portion 220p and the unit electrode bodies 220m are disposed to be spaced away from each other at predetermined intervals and are connected by the connection portions 220z. It should be noted that a configuration in which the connection portions 220z are omitted and the unit electrode bodies 220m are directly provided on the electrode wire portion 220p may be adopted.

As described above, the unit electrode bodies 220m each have a pectinate shape as a whole. Specifically, the unit electrode bodies 220m each include multiple sub-electrodes 220w and a coupling portion 220y. The multiple sub-electrodes 220w are extended in the X-axis direction. Adjacent sub-electrodes 220w are spaced away from each other at predetermined intervals. One end of each sub-electrode 220w is connected to the coupling portion 220y extended in the Y-axis direction.

Figure 40:
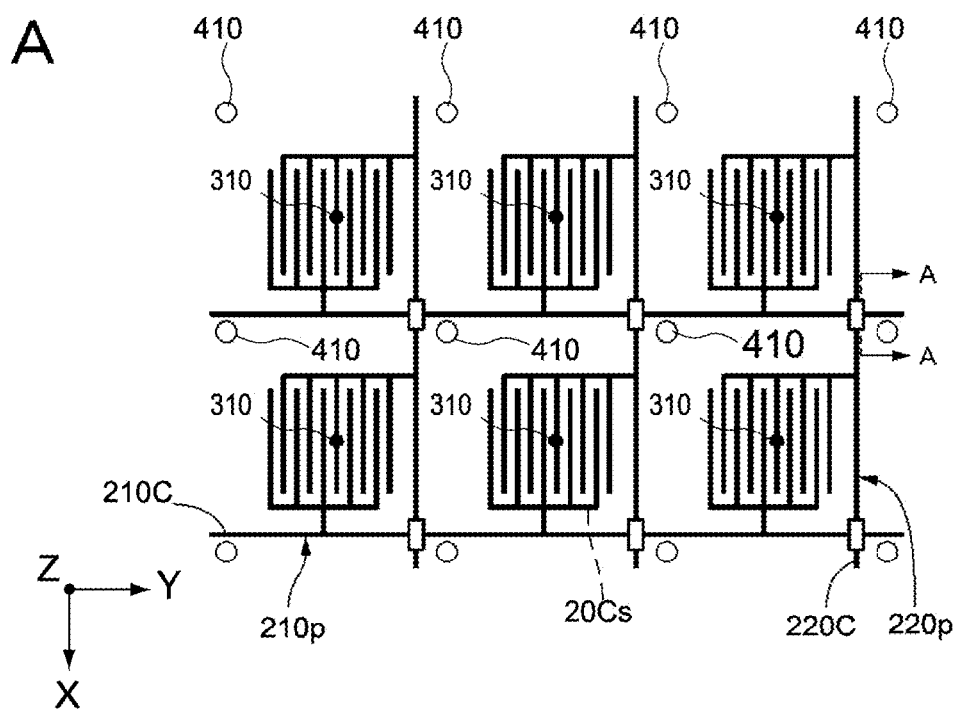
FIG. 40 A is a plan view showing an array of the first and second electrode wires of the input device shown in FIG. 38, and B is a cross-sectional view when viewed from the A-A direction of A.
Figure 40:
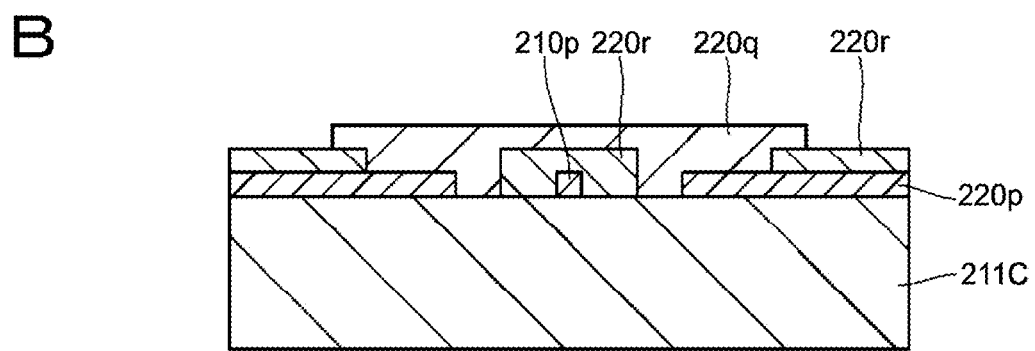

As shown in FIG. 40A, in regions in which the unit electrode bodies 210m and the unit electrode bodies 220m are mutually combined, the respective detection portions 20Cs are formed. The multiple sub-electrodes 210w of the unit electrode bodies 210m and the multiple sub-electrodes 220w of the unit electrode bodies 220m are alternately arrayed toward the Y-axis direction. In other words, the sub-electrodes 210w and 220w are disposed to be opposed to each other in the in-plane direction of the electrode substrate 20C (for example, in the Y-axis direction).

FIG. 40B is a cross-sectional view when viewed from the A-A direction of FIG. 40A. The Y electrodes 220 are provided so as to intersect with the X electrodes 210 as in the first embodiment and formed on the same plane as the X electrode 210. In this regard, as shown in FIG. 40B, a region in which the X electrode 210 and the Y electrode 220 intersect with each other is formed such that each X electrode 210 and each Y electrode 220 do not directly come into contact with each other. In other words, an insulating layer 220r is provided on the electrode wire portion 210p of the X electrode 210. Jumper wiring 220q is provided so as to step over the insulating layer 220r. The electrode wire portion 220p is coupled by the jumper wiring 220q.

Figure 41:
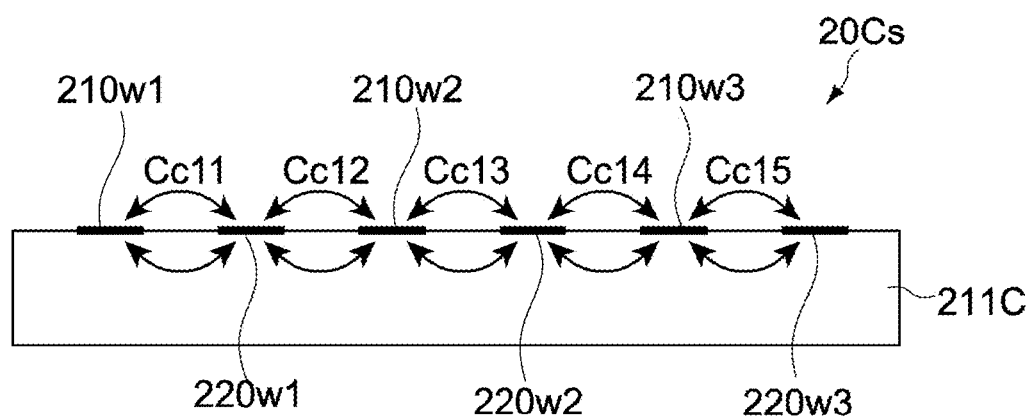
FIG. 41 A schematic cross-sectional view for describing a configuration of detection portions shown in FIG. 38.
Figure 41:
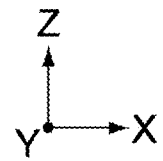

FIG. 41 is a schematic cross-sectional view for describing a configuration of the detection portion 20Cs according to this embodiment. In the example shown in the figure, in the detection portion 20Cs, a sub-electrode 210w1 and a sub-electrode 220w1, the sub-electrode 220w1 and a sub-electrode 210w2, the sub-electrode 210w2 and a sub-electrode 220w2, the sub-electrode 220w2 and a sub-electrode 210w3, and the sub-electrode 210w3 and a sub-electrode 220w3 are capacitively coupled to each other. In other words, with the base material 211C being as a dielectric layer, capacitances Cc11, Cc12, Cc13, Cc14, and Cc15 between the sub-electrodes are configured to be variable in accordance with the capacitive coupling between each of the metal film 12 and the conductive layer 50 and the first and second electrode wires 210C and 220C including sub-electrodes.

The configuration described above can make the second base material of the electrode substrate and the adhesion layer unnecessary and make it possible to contribute to a reduction in thickness of the input device 100C. Further, the configuration described above allows a large number of sub-electrodes to capacitively couple to each other and shorten a distance between the sub-electrodes capacitively coupled. This can increase the amount of capacitive coupling of the input device 100C as a whole and improve the detection sensitivity.

Fifth Embodiment

An input device 100D according to a fifth embodiment of the present technology is different from that of the first embodiment in that one of the X electrode 210 and the Y electrode 220 includes multiple electrode groups and the other electrode includes a flat-plate-shaped electrode.

First Structural Example

Figure 42:
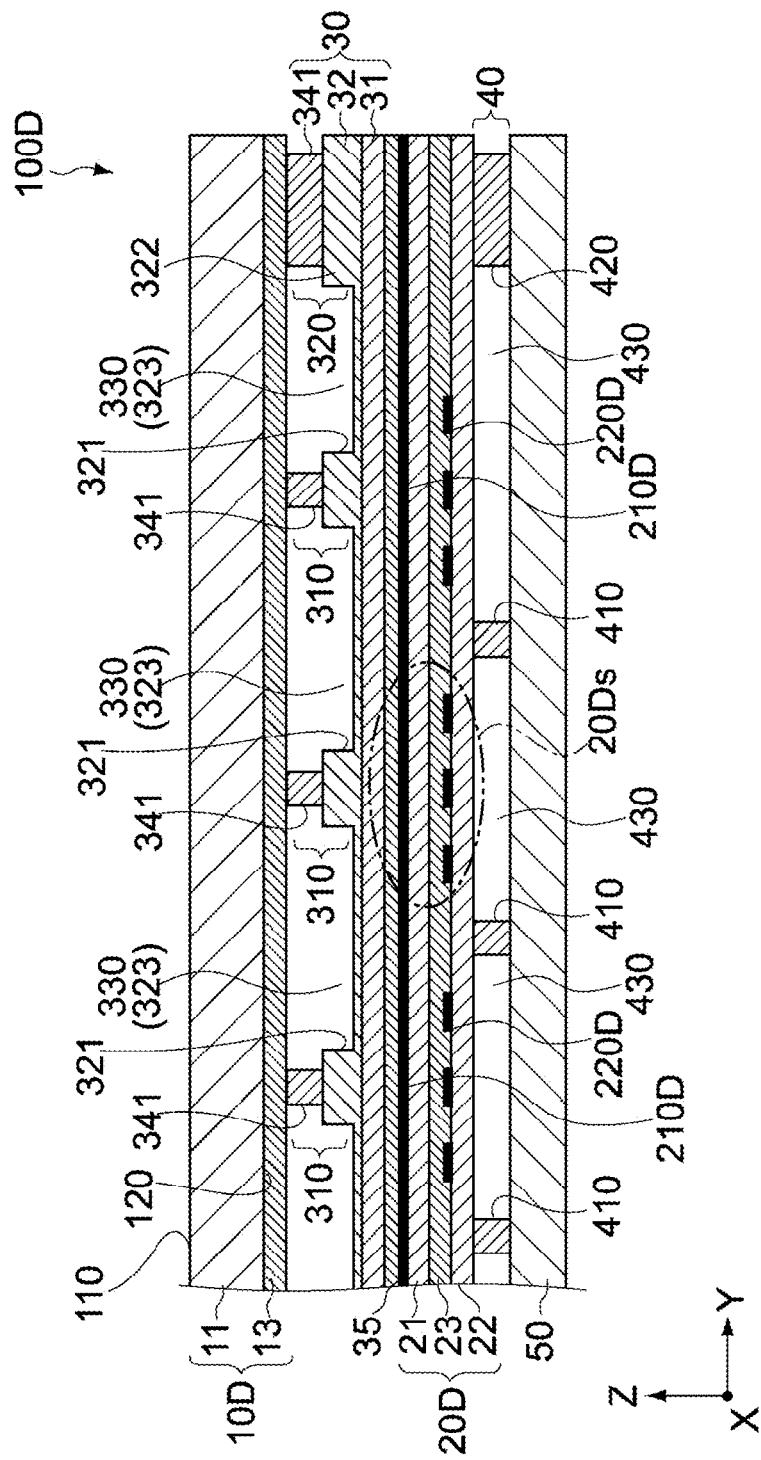
FIG. 42 A schematic cross-sectional view of an input device according to a configuration example of a fifth embodiment of the present technology.

FIG. 42 is a schematic cross-sectional view of the input device 100D according to this embodiment. As shown in the figure, the input device 100D includes an operation member 10D, a conductive layer 50, an electrode substrate 20D, a first support 30, and a second support 40. The conductive layer 50, the first support 30, and the second support 40 each have substantially the same configuration as the first embodiment, but the operation member 10D and the electrode substrate 20D have configurations different from those of the first embodiment. Specifically, the operation member 10D does not include a metal film. Further, in the electrode substrate 20D, multiple X electrodes (first electrode wires) 210D are flat-plate-shaped electrodes and are disposed on the operation member 10D side relative to multiple Y electrodes (second electrode wires) 220D. The multiple Y electrodes 220D each include multiple electrode groups 22Dw. Further, the electrode substrate 20D is configured to be capable of electrostatically detecting a change in distance from each of a conductive operating element such as a user's finger and the conductive layer 50.

Figure 43:
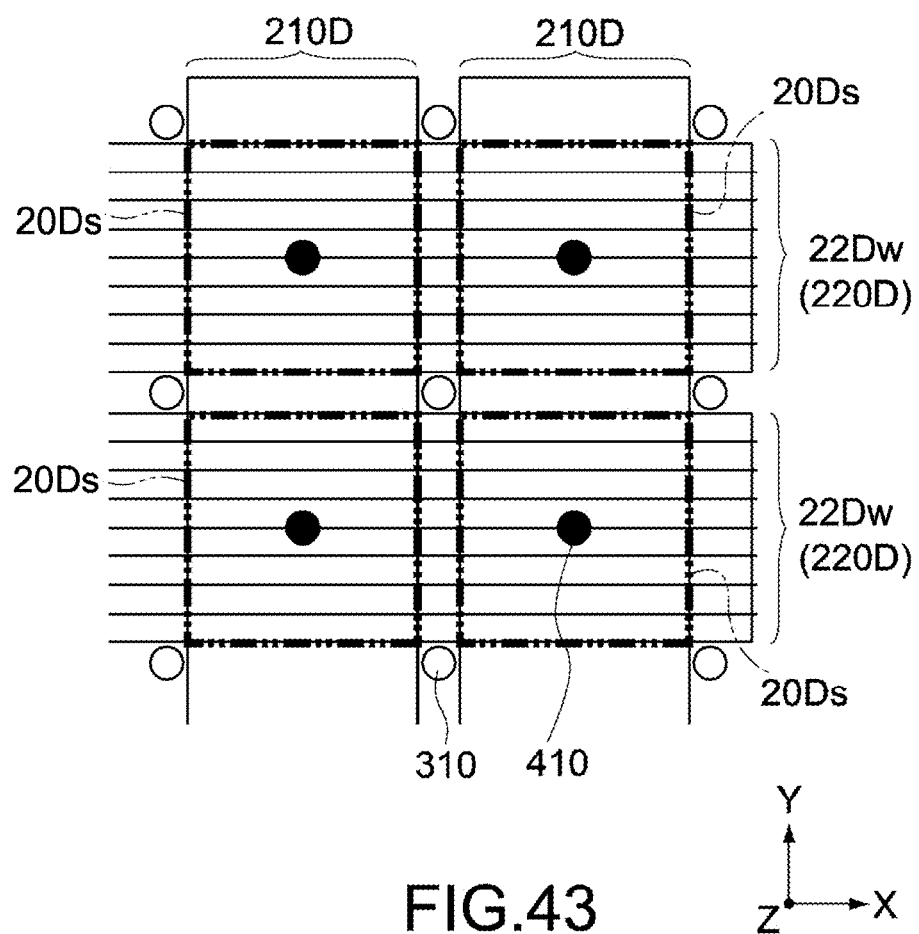
FIG. 43 A schematic plan view showing an arrangement example of first and second structures and first and second electrode wires of the input device shown in FIG. 42.

FIG. 43 is a schematic plan view showing an arrangement example of the first and second structures 310 and 410, the X electrodes 210D, and the Y electrodes 220D. As shown in the figure, each of the X electrodes 210D is a strip-shaped electrode extending in the Y-axis direction. Each of the Y electrodes 220D extends in the X-axis direction and includes multiple electrode groups 22Dw. The detection portion 20Ds is formed in an intersection region of each X electrode 210D and each Y electrode and formed to be opposed to each first structure 210, as in the first embodiment.

As shown in FIG. 42, the X electrode 210D is connected to a drive-side (pulse-input side) terminal of the controller 710, for example, and can be switched to a drive pulse potential in detection and to a ground potential in standby state, for example. This allows a shield effect to be exerted with respect to external noise (external electric field). This allows a shield effect to be kept with respect to external noise from the operation member 10D side and a metal film to be omitted, even if the input device 100D has a configuration in which the operation member 10D does not include a metal film. Therefore, it is possible to achieve simplification of the configuration and contribute to improvement of productivity. It should be noted that X electrode 210E may be connected to a ground potential irrespective of detection or standby state.

Moreover, as in the first embodiment, the metal film 12 is provided to the operation member 10 and connected to a ground potential, and thus a stronger shield effect can be exerted. This can make the detection portions 20Ds stable with respect to external noise and make it possible to stably keep the detection sensitivity.

Second Structural Example

Figure 44:
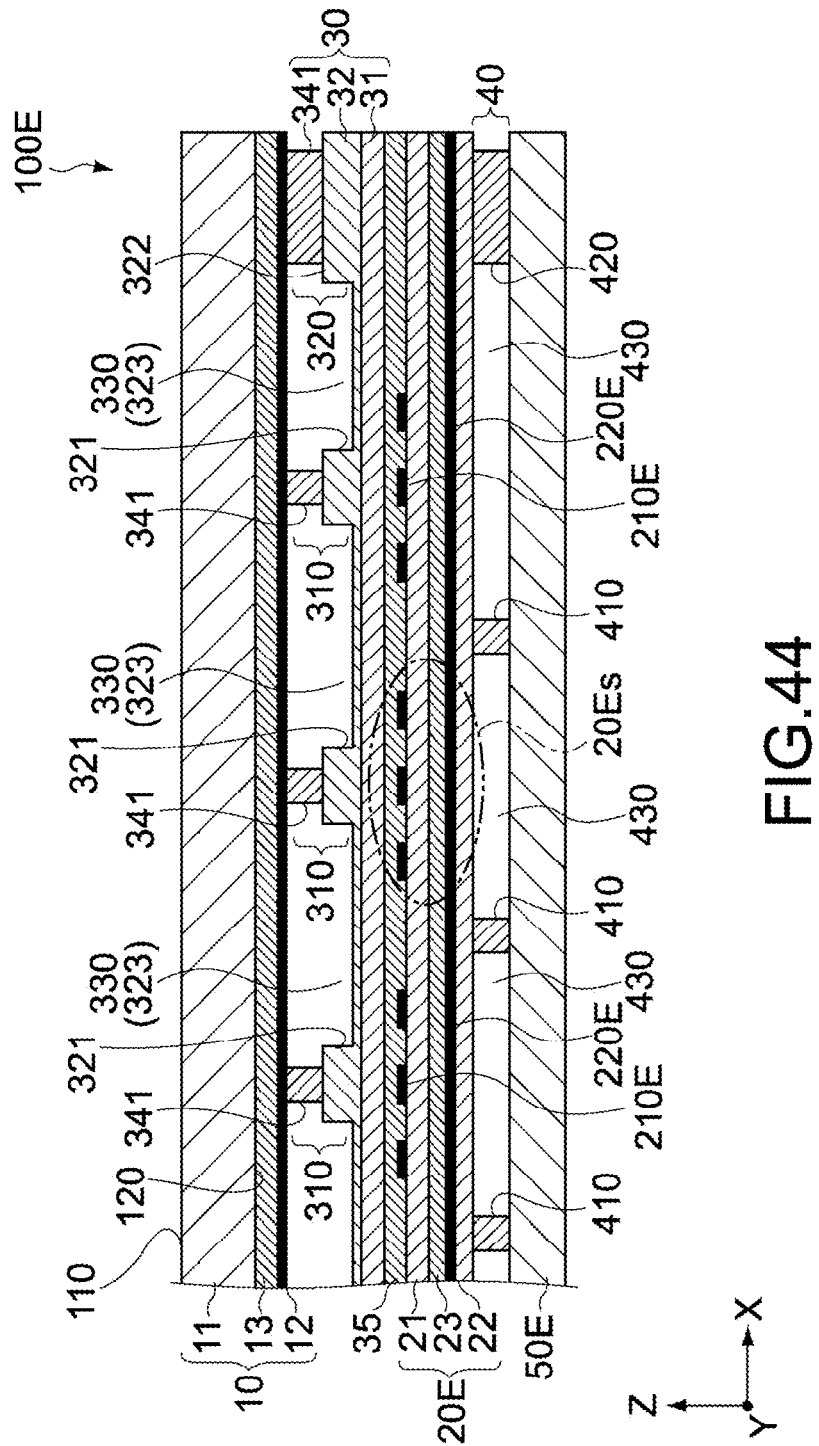
FIG. 44 A schematic cross-sectional view of an input device according to another configuration example of the fifth embodiment of the present technology.

FIG. 44 is a schematic cross-sectional view of an input device 100E according to this embodiment. As shown in the figure, the input device 100E includes an operation member 10, a back plate 50E, an electrode substrate 20E, a first support 30, and a second support 40. The operation member 10, the first support 30, and the second support 40 each have substantially the same configuration as the first embodiment, but this embodiment is different from the first embodiment in that the back plate 50E is provided instead of the conductive layer and in the configuration of the electrode substrate 20E.

The back plate 50E forms the lowermost part of the input device 100E, like the conductive layer according to the first embodiment, and is disposed to be opposed to a metal film (conductive layer) 12 (second surface 120) in the Z-axis direction. The back plate 50E functions as a support plate of the input device 100E and is formed to have higher bending rigidity than the operation member 10 and the electrode substrate 20E, for example. The material of the back plate 50E is not particularly limited as long as a desired strength is obtained, and may be a resin plate made of reinforced plastic, a metal plate, or the like. Moreover, as described on the conductive layer in the first embodiment, the back plate 50E may include step portions from the viewpoint of enhancement of rigidity or may be formed to be mesh-like from the viewpoint of radiation performance.

The electrode substrate 20E includes multiple X electrodes (first electrode wires) 210E and multiple Y electrodes (second electrode wires) 220E, as in the first embodiment. The Y electrodes 220E are flat-plate-shaped electrodes and are disposed on the back plate 50E side relative to the multiple X electrodes 210E. The multiple X electrodes 210E each include multiple electrode groups 21Ew. The electrode substrate 20E is configured to be capable of electrostatically detecting a change in distance from the metal film 12.

Figure 45:
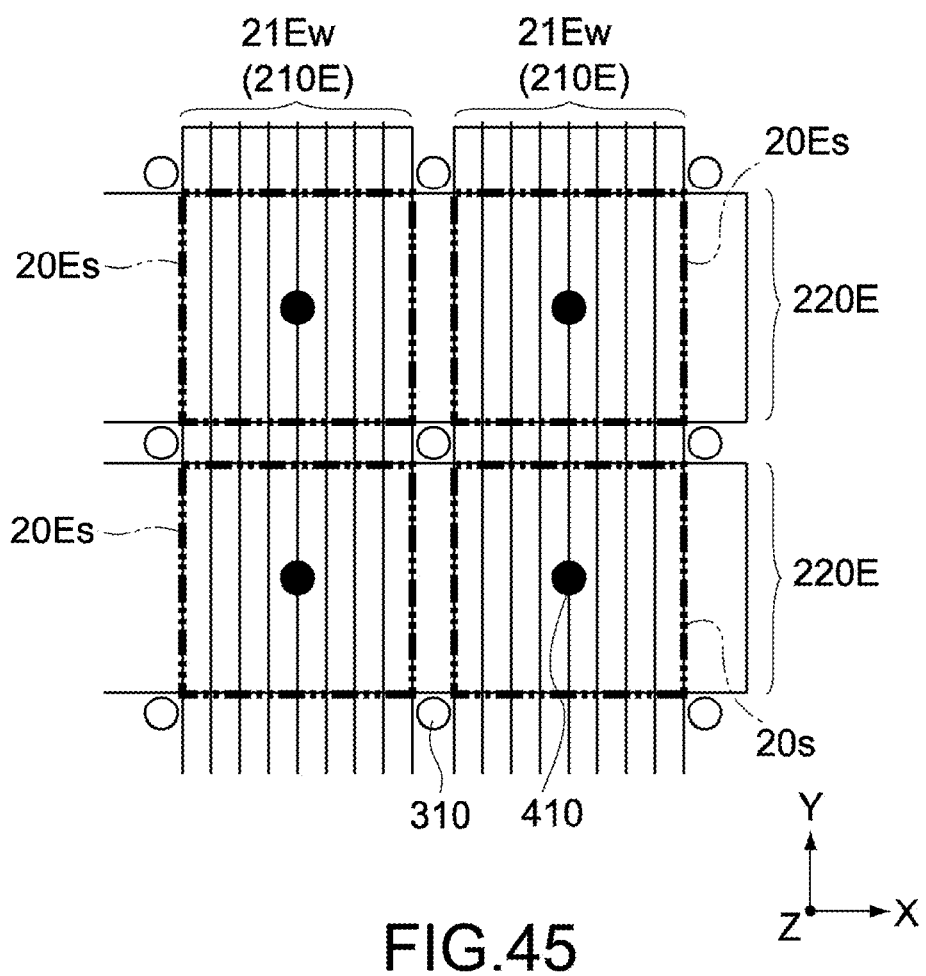
FIG. 45 A schematic plan view showing an arrangement example of first and second structures and first and second electrode wires of the input device shown in FIG. 44.

FIG. 45 is a schematic plan view showing an arrangement example of the first and second structures 310 and 410, the X electrodes 210E, and the Y electrodes 220E. As shown in the figure, each of the X electrodes 210E extends in the Y-axis direction and includes the multiple electrode groups 21Ew. Each of the Y electrodes 220E is a wide strip-shaped electrode extending in the X-axis direction. A detection portion 20Es is formed in an intersection region of each X electrode 210E and each Y electrode and formed to be opposed to each first structure 210, as in the first embodiment.

As shown in FIG. 44, the Y electrode 220E is connected to a drive-side (pulse-input side) terminal of the controller 710, for example, and can be switched to a drive pulse potential in detection and to a ground potential in standby state, for example. This allows a shield effect to be exerted with respect to external noise (external electric field). This allows a shield effect to be kept with respect to external noise from the back plate 50E side and the conductive plate 50E to be omitted, even if the input device 100E has the back plate 50E as an insulator. Therefore, it is possible to provide a configuration with which the material selectivity of the back plate 50E is enhanced and which is advantageous in terms of costs. It should be noted that the Y electrodes 220E may be connected to a ground potential irrespective of detection or standby state.

Moreover, forming the back plate 50E of a conductive plate and connecting both of the Y electrodes 220E and the back plate 50E to a ground potential allows a stronger shield effect to be exerted. This can make the detection portions 20Es stable with respect to external noise and make it possible to stably keep the detection sensitivity.

Figure 25:
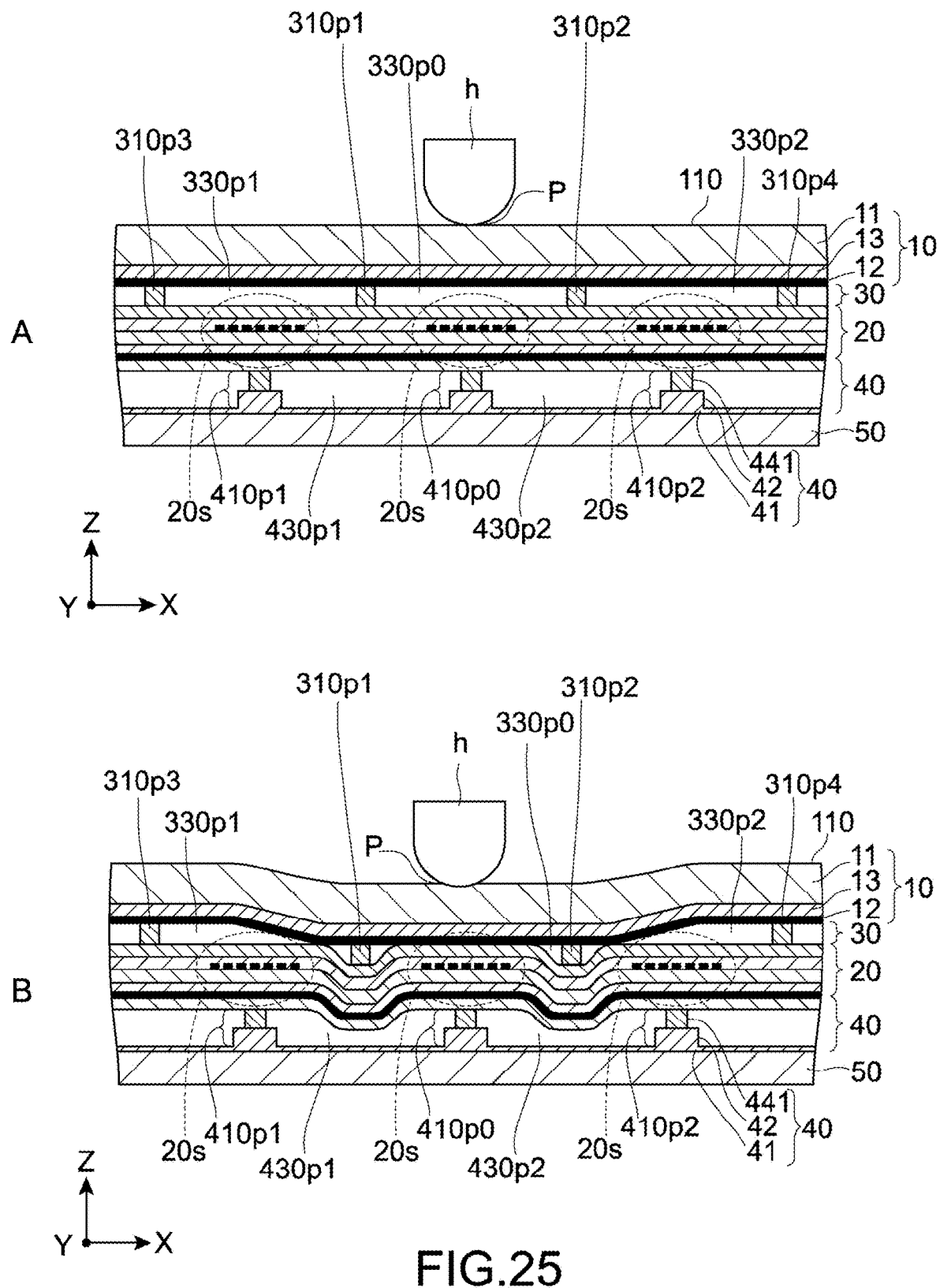
FIG. 25 A schematic cross-sectional view of a main part, showing an aspect of the input device when the first surface of the input device of FIG. 24 receives an operation by the operating element.

It should be noted that in the second structural example, the Y electrodes 220E are each configured to be flat-plate-shaped and capable of detecting a change in distance between each of the detection portions 20Es and the metal film 12. Thus, it is desirable to provide a configuration in which the distance between the detection portion 20Es and the metal film 12 can be largely changed and the second structures 410 are opposed to the detection portions 20Es, as shown in FIG. 25. Such a configuration can provide larger detection sensitivity.

MODIFIED EXAMPLES

Modified Example 1

Figure 46:
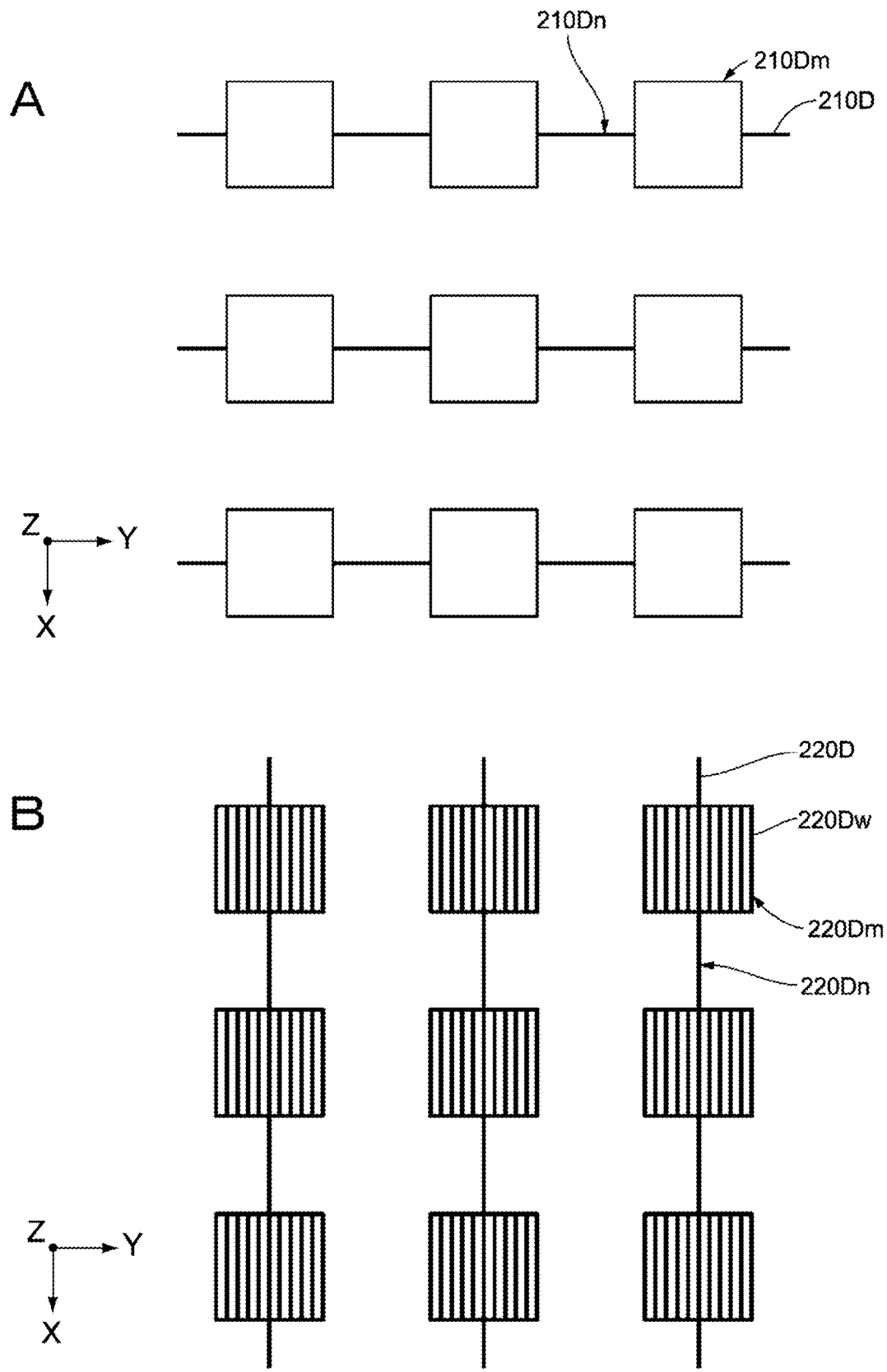
FIG. 46 A schematic plan view showing a configuration example of the first and second electrode wires according to a modified example of the input device shown in FIG. 42, in which A shows the first electrode wires and B shows the second electrode wires.

FIG. 46 is a schematic plan view showing an electrode configuration according to a modified example of the input device 100D (first configuration example). FIG. 46A shows a configuration example of the X electrodes 210D, and FIG. 46B shows a configuration example of the Y electrodes 220D. As shown in FIG. 46A, B, the X electrode 210D and the Y electrode 220D may include unit electrode bodies 210Dm and unit electrode bodies 220Dm, respectively. As shown in FIG. 46A, the unit electrode bodies 210Dm of the X electrode 210D are each a flat-plate-shaped electrode, and as shown in FIG. 46B, the unit electrode bodies 220Dm of the Y electrodes 220D are each formed of multiple sub-electrodes 220Dw. In this modified example, the multiple sub-electrodes 220Dw of each unit electrode body 220D functions as an electrode group.

Modified Example 2

Figure 47:
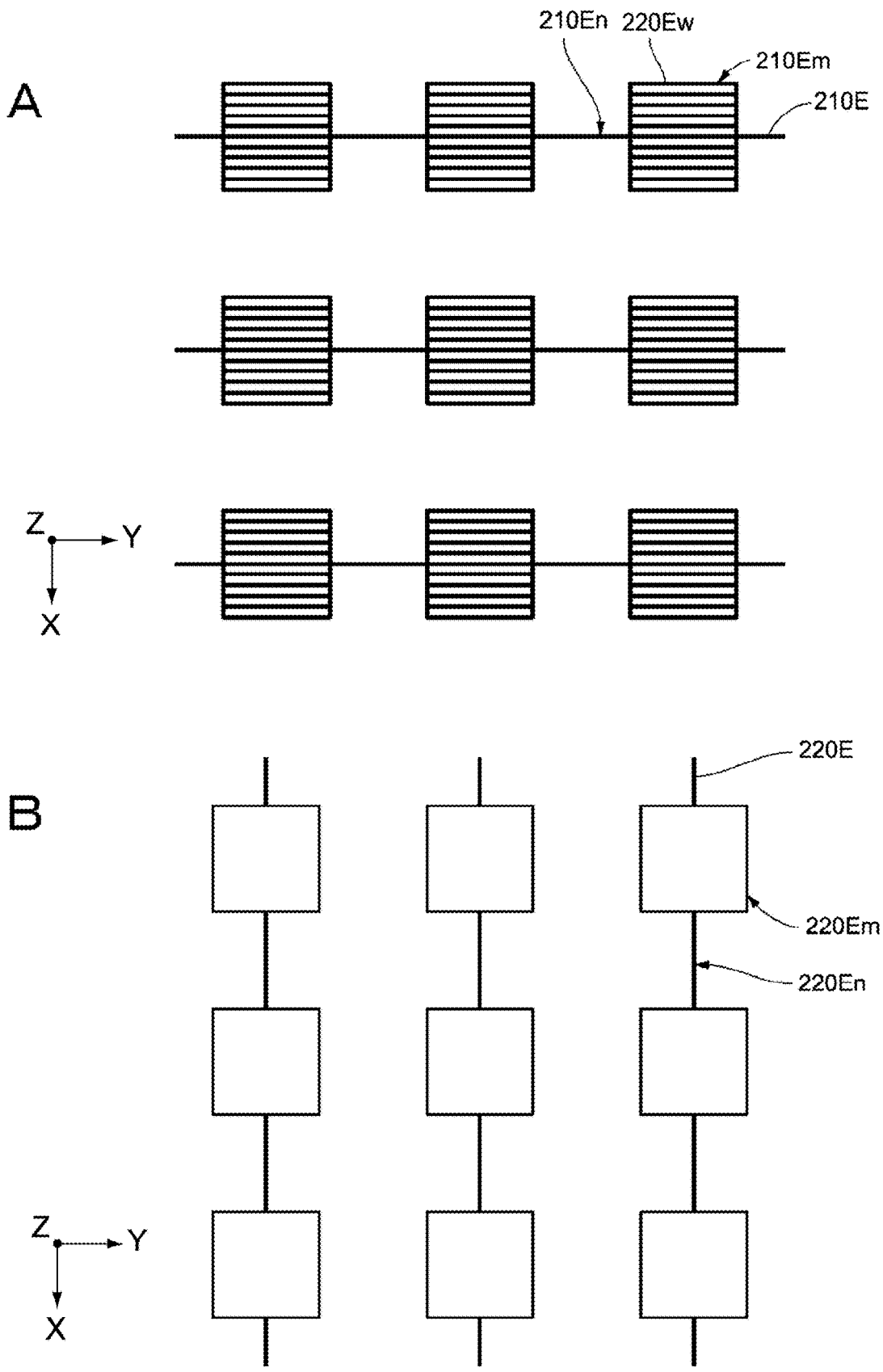
FIG. 47 A schematic plan view showing a configuration example of first and second electrode wires according to a modified example of the input device shown in FIG. 44, in which A shows the first electrode wires and B shows the second electrode wires.

FIG. 47 is a schematic plan view showing an electrode configuration according to a modified example of the input device 100E (second configuration example). FIG. 47A shows a configuration example of the X electrodes 210E, and FIG. 47B shows a configuration example of the Y electrodes 220E. As shown in FIG. 47A, B, the X electrode 210E and the Y electrode 220E may include unit electrode bodies 210Em and unit electrode bodies 220Em, respectively, as in the modified example 1. As shown in FIG. 47A, the unit electrode bodies 210Em of the X electrode 210E are each formed of multiple sub-electrodes 210Ew, and as shown in FIG. 47B, the unit electrode bodies 220Em of the Y electrode 220E are each a flat-plate-shaped electrode. In this modified example, the multiple sub-electrodes 210Ew of each unit electrode body 210E functions as an electrode group.

Other Modified Examples

In this embodiment, the configurations of the X electrodes 210D and 210E and the Y electrodes 220D and 220E are not limited to those described above, and both of the X electrodes 210D and 210E and the Y electrodes 220D and 220E may be formed of flat-plate-shaped electrodes.

Sixth Embodiment

Figure 48:
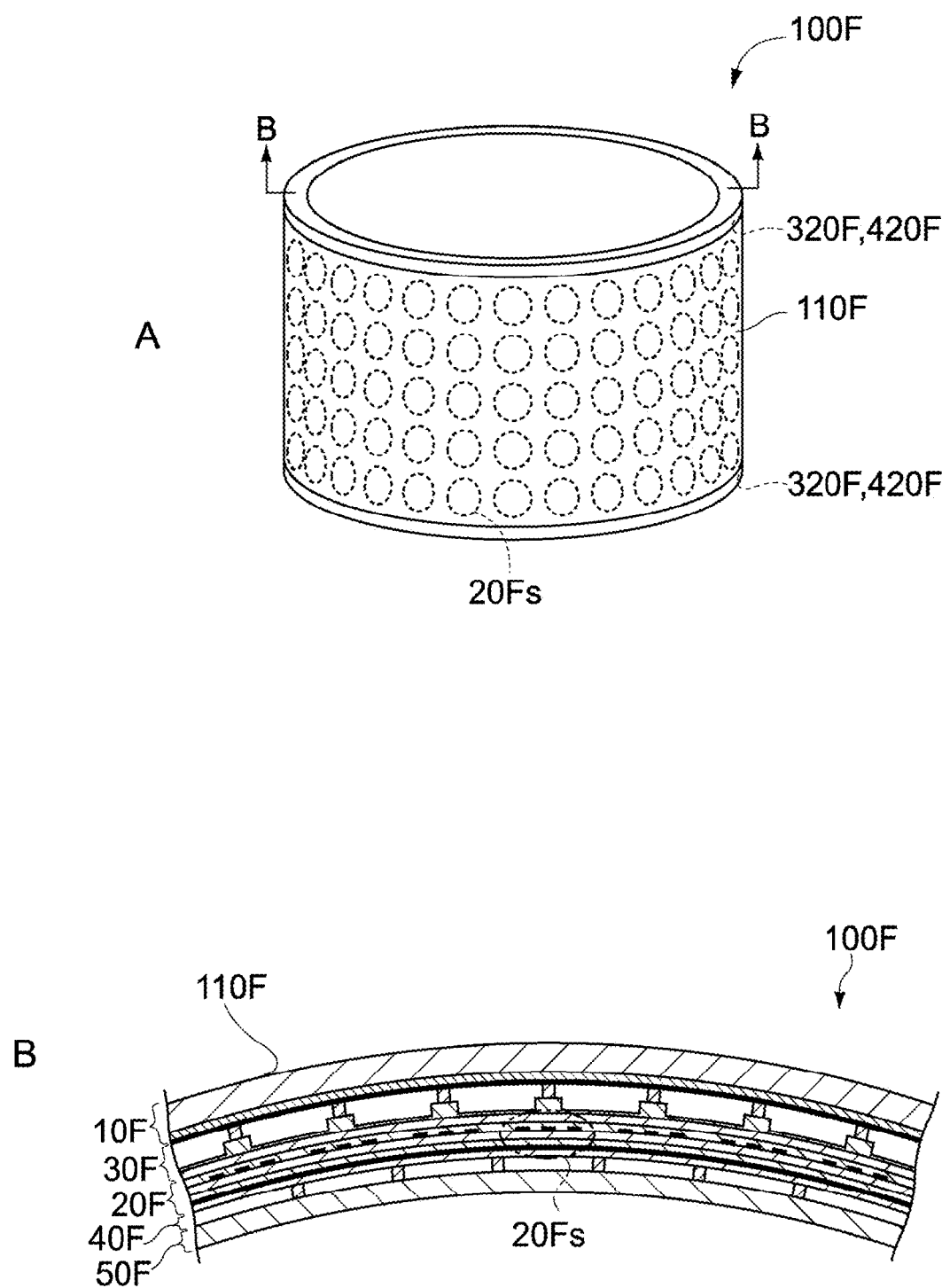
FIG. 48 A view showing a configuration of an input device according to a modified example of a sixth embodiment of the present technology, in which A is a perspective view and B is a cross-sectional view when viewed from the B-B direction of A.

FIG. 48A is a perspective view showing an example of the outer appearance of an input device 100F according to a sixth embodiment of the present technology. FIG. 48B is an enlarged cross-sectional view when viewed from the B-B direction of FIG. 48A. The input device 100F according to the sixth embodiment has a cylindrical shape as a whole. Therefore, a first surface 110F as an input operation surface has a cylindrical surface. Other configurations of the input device 100F are similar to those of the input device 100 according to the first embodiment.

An electrode substrate 20F includes multiple detection portions 20Fs that are two-dimensionally arrayed in an in-plane direction of the cylindrical shape. FIG. 48A shows an example in which the multiple detection portions 20Fs are two-dimensionally arrayed in a circumferential direction and an axial direction (height direction) of the electrode substrate 20F having the cylindrical shape. Further, in the example shown in FIG. 48A, first and second frames 320F and 420F are disposed in the circumferential direction of the upper and lower ends of the cylinder. This can enhance the strength of the entire input device 100F.

As shown in FIG. 48B, the input device 100F according to this embodiment has such a shape that the input device 100 of FIG. 1 is curved with the first surface 110 (110F) facing out. In other words, the input device 100F includes an operation member 10F, a conductive plate 50F, an electrode substrate 20F, a first support 30F, and a second support 40F, and is formed by those constituent elements curved into a cylindrical shape.

Even such an input device 100F can enhance the detection sensitivity of the first surface 110F at the time of an input operation, and can be used as a touch sensor or a keyboard device. It should be noted that the shape of the entire input device 100F is not limited to the cylindrical shape. For example, the shape may be a flattened cylindrical shape, and the cross section may be a rectangular cylindrical shape. Further, FIG. 48A shows an example in which the first and second frames 320F and 420F are disposed only in the circumferential direction of the upper and lower ends of the cylinder, but the arrangement is not limited thereto. The first and second frames 320F and 420F may be disposed along a longitudinal direction (height direction of the cylinder). This can make it possible to provide stronger support.

Modified Example 1

Figure 49:
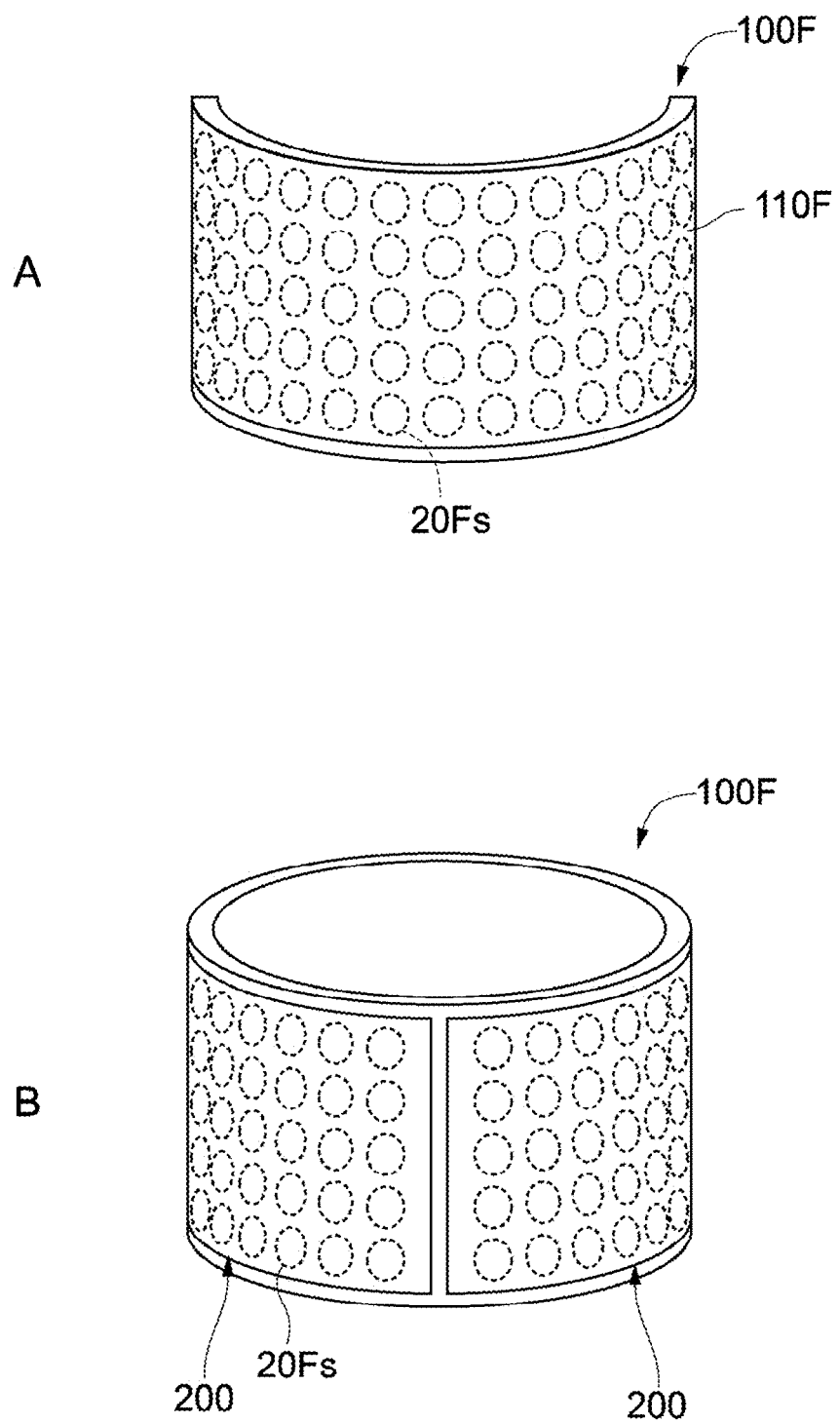
FIG. 49 A perspective view showing a configuration of a modified example of the input device shown in FIG. 48.

FIG. 49A is a perspective view showing an example of a configuration of an input device 100F according to a modified example of the sixth embodiment of the present technology. The input device 100F according to this modified example has a curved shape as a whole. In other words, the input device 100F has a configuration of a curved rectangular input device. Therefore, a first surface 110F as an input operation surface has a curved shape. Further, an electrode substrate (not shown) includes multiple detection portions 20Fs that are two-dimensionally arrayed in an in-plane direction of the cylindrical shape. It should be noted that the entire shape of the input device 100F is not limited to the example shown in FIG. 49A and can be formed into a desired curved shape.

Modified Example 2

FIG. 49B is a perspective view showing an example of a configuration of an input device 100F according to a modified example of the sixth embodiment of the present technology. In the input device 100F according to this modified example, two sensor devices each formed into a semicircular shape are coupled to each other to form one input device 100F. In other words, the input device 100F includes two detection regions 200 corresponding to the respective sensor devices and is formed into a cylindrical shape as a whole. It should be noted that the number of detection regions 200 is not limited and three or more detection regions 200 may be included. Further, the shape of the entire input device 100F is also not limited to the cylindrical shape. For example, the input device 100F may include four detection regions 200 and may be formed to have a rectangular cylindrical cross section such that the four detection regions 200 form the respective surfaces.

Hereinabove, the embodiments of the present technology have been described, but the present technology is not limited to the embodiments described above and can be variously modified without departing from the gist of the present technology as a matter of course.

For example, the input device may not include the metal film and may detect a capacitance change of a detection portion due to capacitive coupling between each of the operating element and the conductive layer and the X and Y electrodes. In this case, a flexible sheet (see second embodiment) made of an insulating material can be used as an operation member. With such a configuration as well, the first and second supports can change a distance from each of the operating element and the conductive layer and the detection portion, to obtain an input device with high detection accuracy for an operation position and a pressing force.

Further, in the embodiments described above, the detection portions are disposed immediately below the first structures, but are not limited thereto. For example, the detection portions may be formed to be opposed to the respective second structures or may be disposed at positions where the detection portions are not opposed to any of the first and second structures. Such configurations also allow highly accurate detection of an operation position and a pressing force as in the embodiments described above.

In the embodiments described above, the detection portions each form a capacitive element of the mutual capacitance system, but may form a capacitive element of a self-capacitance system. In this case, an input operation can be detected based on the amount of capacitance change between each of the metal film and the conductive layer and an electrode layer included in the detection portion.

In the embodiments described above, the first space portion is disposed between the multiple first structures, and the second space portion is disposed between the multiple second structures, but the space portions are not limited to this configuration. For example, a region corresponding to all or part of the multiple first and second space portions may be filled with an elastic material or the like. The elastic material or the like for filling is not particularly limited as long as it does not hinder the electrode substrate, the operation member, and the like from being deformed.

Further, the first and second supports 30 and 40 may not include the first and second frames 320 and 330.

Further, the input device is not limited to the flat-plate-shaped configuration or the configuration described in the sixth embodiment, and may be formed to have a plate shape having a first surface of an indefinite shape, for example. In other words, the sensor device of the present technology is flexible as a whole and thus a mounting method with a high degree of freedom is achieved.

It should be noted that the present technology can have the following configurations.

(1) A sensor device, including:
a deformable sheet-shaped first conductive layer;
a second conductive layer that is disposed to be opposed to the first conductive layer;
an electrode substrate that includes multiple first electrode wires and multiple second electrode wires and is disposed to be deformable between the first conductive layer and the second conductive layer, the multiple second electrode wires being disposed to be opposed to the multiple first electrode wires and intersecting with the multiple first electrode wires;
a first support that includes multiple first structures, the multiple first structures connecting the first conductive layer and the electrode substrate; and a second support that includes multiple second structures, the multiple second structures connecting the second conductive layer and the electrode substrate.

(2) A sensor device, including:
a deformable sheet-shaped first conductive layer;
a second conductive layer that is disposed to be opposed to the first conductive layer;
an electrode substrate that includes multiple first electrode wires and multiple second electrode wires, the multiple second electrode wires being disposed to be opposed to the multiple first electrode wires and intersecting with the multiple first electrode wires, the electrode substrate being disposed to be deformable between the first conductive layer and the second conductive layer and being capable of electrostatically detecting a change in distance from each of the first conductive layer and the second conductive layer;
a first support that includes multiple first structures and a first space portion, the multiple first structures connecting the first conductive layer and the electrode substrate, the first space portion being formed between the multiple first structures; and
a second support that includes multiple second structures and a second space portion, the multiple second structures being each disposed between the first structures adjacent to each other and connecting the second conductive layer and the electrode substrate, the second space portion being formed between the multiple second structures.

(3) The sensor device according to (1) or (2), in which
the electrode substrate further includes multiple detection portions, each of the multiple detection portions being formed in each of intersection regions of the multiple first electrode wires and the multiple second electrode wires and having a capacitance variable in accordance with a relative distance from each of the first conductive layer and the second conductive layer.

(4) The sensor device according to (3), in which the multiple detection portions are formed to be opposed to the multiple first structures.

(5) The sensor device according to (3), in which the multiple detection portions are formed to be opposed to the multiple second structures.

(6) The sensor device according to any one of (1) to (5), in which
the first support includes a first frame, the first frame connecting the first conductive layer and the electrode substrate and being disposed along a circumferential edge of the electrode substrate, and
the second support includes a second frame, the second frame connecting the second conductive layer and the electrode substrate and being disposed to be opposed to the first frame.

(7) The sensor device according to any one of (1) to (6), in which
the second conductive layer includes a step portion.

(8) The sensor device according to (1), in which
the electrode substrate is configured to be capable of electrostatically detecting a change in distance from each of the first conductive layer and the second conductive layer.

(9) The sensor device according to (1) or (8), in which
the first support further includes a first space portion, the first space portion being formed between the multiple first structures.

(10) The sensor device according to any one of (1), (8), and (9), in which
the second support further includes a second space portion, the second space portion being formed between the multiple second structures.

(11) The sensor device according to any one of (1), (2), and (8) to (10), in which
each of the multiple first electrode wires includes multiple first unit electrode bodies, the multiple first unit electrode bodies each including multiple first sub-electrodes,
each of the multiple second electrode wires includes multiple second unit electrode bodies, the multiple second unit electrode bodies each including multiple second sub-electrodes and being opposed to the multiple first unit electrode bodies, and
the electrode substrate includes
a base material, the multiple first electrode wires and the multiple second electrode wires being disposed on the base material, and
multiple detection portions in which the multiple first sub-electrodes of each of the first unit electrode bodies and the multiple second sub-electrodes of each of the second unit electrode bodies are opposed to each other in an in-plane direction of the electrode substrate.

(12) An input device, including:
a deformable sheet-shaped operation member that includes a first surface and a second surface, the first surface receiving an operation by a user, the second surface being on the opposite side to the first surface;
a conductive layer that is disposed to be opposed to the second surface;
an electrode substrate that includes multiple first electrode wires and multiple second electrode wires and is disposed to be deformable between the operation member and the conductive layer, the multiple second electrode wires being disposed to be opposed to the multiple first electrode wires and intersecting with the multiple first electrode wires;
a first support that includes multiple first structures, the multiple first structures connecting the operation member and the electrode substrate; and a second support that includes multiple second structures, the multiple second structures connecting the conductive layer and the electrode substrate.

(13) An input device, including:
a deformable sheet-shaped operation member that includes a first surface and a second surface, the first surface receiving an operation by a user, the second surface being on the opposite side to the first surface;
a first conductive layer that is disposed to be opposed to the second surface;
an electrode substrate that includes multiple first electrode wires and multiple second electrode wires, the multiple second electrode wires being disposed to be opposed to the multiple first electrode wires and intersecting with the multiple first electrode wires, the electrode substrate being disposed to be deformable between the operation member and the first conductive layer and being capable of electrostatically detecting a change in distance from the first conductive layer;
a first support that includes multiple first structures and a first space portion, the multiple first structures connecting the operation member and the electrode substrate, the first space portion being formed between the multiple first structures; and
a second support that includes multiple second structures and a second space portion, the multiple second structures being each disposed between the first structures adjacent to each other and connecting the first conductive layer and the electrode substrate, the second space portion being formed between the multiple second structures.

(14) The input device according to (12), in which
the operation member further includes a second conductive layer that is formed on the second surface, and
the detection substrate is capable of electrostatically detecting a change in distance from each of the first conductive layer and the second conductive layer.

(15) The input device according to (12) or (13), in which the operation member includes a display unit.

(16) The input device according to (12) or (13), in which
the operation member includes multiple key regions.

(17) The input device according to (16), in which
the electrode substrate further includes multiple detection portions, each of the multiple detection portions being formed in each of intersection regions of the multiple first electrode wires and the multiple second electrode wires and having a capacitance variable in accordance with a relative distance from the first conductive layer.

(18) The input device according to (17), further including a control unit that is electrically connected to the electrode substrate and is capable of generating information on an input operation with respect to each of the multiple key regions based on outputs of the multiple detection portions.

(19) The input device according to any one of (16) to (18), in which
the multiple first structures are disposed along boundaries between the multiple key regions.

(20) The input device according to any one of (12) to (19), in which
the multiple first electrode wires are flat-plate-shaped electrodes and are disposed on the operation member side relative to the multiple second electrode wires, and
each of the multiple second electrode wires includes multiple electrode groups.

(21) An input device, including:
a deformable sheet-shaped operation member that includes a first surface, a second surface, and a metal film, the first surface receiving an operation by a user, the second surface being on the opposite side to the first surface, the metal film being formed on the second surface;
a back plate that is disposed to be opposed to the second surface;
an electrode substrate that includes multiple first electrode wires and multiple second electrode wires, the multiple second electrode wires being disposed to be opposed to the multiple first electrode wires and intersecting with the multiple first electrode wires, the electrode substrate being disposed to be deformable between the operation member and the back plate and being capable of electrostatically detecting a change in distance from the metal film;
a first support that includes multiple first structures and a first space portion, the multiple first structures connecting the operation member and the electrode substrate, the first space portion being formed between the multiple first structures; and
a second support that includes multiple second structures and a second space portion, the multiple second structures being each disposed between the first structures adjacent to each other and connecting the back plate and the electrode substrate, the second space portion being formed between the multiple second structures.

(22) The input device according to (21), in which
the multiple second electrode wires are flat-plate-shaped electrodes and are disposed on the back plate side relative to the multiple first electrode wires, and
each of the multiple first electrode wires includes multiple electrode groups.

(23) An electronic apparatus, including:
a deformable sheet-shaped operation member that includes a first surface and a second surface, the first surface receiving an operation by a user, the second surface being on the opposite side to the first surface;
a conductive layer that is disposed to be opposed to the second surface;
an electrode substrate that includes multiple first electrode wires and multiple second electrode wires, the multiple second electrode wires being disposed to be opposed to the multiple first electrode wires and intersecting with the multiple first electrode wires, the electrode substrate being disposed to be deformable between the operation member and the conductive layer and being capable of electrostatically detecting a change in distance from the conductive layer;
a first support that includes multiple first structures and a first space portion, the multiple first structures connecting the operation member and the electrode substrate, the first space portion being formed between the multiple first structures;
a second support that includes multiple second structures and a second space portion, the multiple second structures being each disposed between the first structures adjacent to each other and connecting the conductive layer and the electrode substrate, the second space portion being formed between the multiple second structures; and a controller including a control unit that is electrically connected to the electrode substrate and is capable of generating information on an input operation with respect to each of the multiple operation members based on an output of the electrode substrate.

DESCRIPTION OF SYMBOLS 1 sensor device
100, 100A, 100B, 100C, 100D, 100E, 100F input device
10, 10A, 10B, 10D, 10F operation member
11 flexible display (display unit)
12 metal film (first conductive layer)
20, 20A, 20D, 20E, 20F electrode substrate
20$s$, 20Cs, 20Ds detection portion
210 first electrode wire
220 second electrode wire
30, 30F first support
310 first structure
320 first frame
330 first space portion
40, 40F second support
410 second structure
420 second frame
430 second space portion
50, 50B, 50C conductive layer (second conductive layer)
50E, 50F back plate
51, 51B, 51C step portion control unit
70, 70B electronic apparatus
710 controller

The invention claimed is:
1. A sensor device comprising:
a deformable sheet-shaped first conductive layer;
a second conductive layer that is disposed to be opposed to the first conductive layer;
an electrode substrate that includes multiple first electrode wires and multiple second electrode wires and is disposed to be deformable between the first conductive layer and the second conductive layer, the multiple second electrode wires being disposed to be opposed to the multiple first electrode wires and intersecting with the multiple first electrode wires;
a first support; and
a second support,
wherein each of the multiple first electrode wires includes multiple first unit electrode bodies, the multiple first unit electrode bodies each including multiple first sub-electrodes,
wherein each of the multiple second electrode wires includes multiple second unit electrode bodies, the multiple second unit electrode bodies each including multiple second sub-electrodes and being opposed to the multiple first unit electrode bodies,
wherein the electrode substrate includes a base material, the multiple first electrode wires and the multiple second electrode wires being disposed on the base material, and
wherein multiple detection portions are formed in which the multiple first sub-electrodes of each of the first unit electrode bodies and the multiple second sub-electrodes of each of the second unit electrode bodies are opposed to each other in an in-plane direction of the electrode substrate.

2. The sensor device according to claim 1, wherein the first support includes a first frame, the first frame connecting the first conductive layer and the electrode substrate and being disposed along a circumferential edge of the electrode substrate, and the second support includes a second frame, the second frame connecting the second conductive layer and the electrode substrate and being disposed to be opposed to the first frame.

3. The sensor device according to claim 1, wherein the second conductive layer includes a step portion.

4. The sensor device according to claim 1, wherein the electrode substrate is configured to be capable of electrostatically detecting a change in distance from each of the first conductive layer and the second conductive layer.

5. The sensor device according to claim 1, wherein the first support further includes a first space portion, the first space portion being formed between the multiple first structures.

6. The sensor device according to claim 1, wherein the second support further includes a second space portion, the second space portion being formed between the multiple second structures.

7. The sensor device according to claim 1, wherein the electrode substrate further includes multiple detection portions, each of the multiple detection portions being formed in each of intersection regions of the multiple first electrode wires and the multiple second electrode wires and having a capacitance variable in accordance with a relative distance from each of the first conductive layer and the second conductive layer.

8. The sensor device according to claim 1, further comprising:
an electromagnetic shield configured to suppress intrusion of electromagnetic waves from outside the electrode substrate,
wherein the multiple first electrode wires are connected to a ground.

9. The sensor device according to claim 1, wherein the first conductive layer includes a display unit.

10. The sensor device according to claim 1, wherein the first conductive layer includes multiple key regions.

11. The sensor device according to claim 10, wherein the multiple first structures are disposed along boundaries between the multiple key regions.

12. The sensor device according to claim 1, wherein the multiple first electrode wires are flat-plate-shaped electrodes and are disposed on the first conductive layer side relative to the multiple second electrode wires, and
each of the multiple second electrode wires includes multiple electrode groups.

13. An electronic apparatus comprising:
a deformable sheet-shaped first conductive layer;
a second conductive layer that is disposed to be opposed to the first conductive layer;
an electrode substrate that includes multiple first electrode wires and multiple second electrode wires and is disposed to be deformable between the first conductive layer and the second conductive layer, the multiple second electrode wires being disposed to be opposed to the multiple first electrode wires and intersecting with the multiple first electrode wires;
a first support; and
a second support,
wherein each of the multiple first electrode wires includes multiple first unit electrode bodies, the multiple first unit electrode bodies each including multiple first sub-electrodes,
wherein each of the multiple second electrode wires includes multiple second unit electrode bodies, the multiple second unit electrode bodies each including multiple second sub-electrodes and being opposed to the multiple first unit electrode bodies,
wherein the electrode substrate includes a base material, the multiple first electrode wires and the multiple second electrode wires being disposed on the base material, and
wherein multiple detection portions are formed in which the multiple first sub-electrodes of each of the first unit electrode bodies and the multiple second sub-electrodes of each of the second unit electrode bodies are opposed to each other in an in-plane direction of the electrode substrate.

14. The electronic apparatus according to claim 13, wherein the first support includes a first frame, the first frame connecting the first conductive layer and the electrode substrate and being disposed along a circumferential edge of the electrode substrate, and the second support includes a second frame, the second frame connecting the second conductive layer and the electrode substrate and being disposed to be opposed to the first frame.

15. The electronic apparatus according to claim 13, wherein the second conductive layer includes a step portion.

16. The electronic apparatus according to claim 13, wherein the electrode substrate is configured to be capable of electrostatically detecting a change in distance from each of the first conductive layer and the second conductive layer.

17. The electronic apparatus according to claim 13, wherein the first support further includes a first space portion, the first space portion being formed between the multiple first structures.

18. The electronic apparatus according to claim 13, wherein the second support further includes a second space portion, the second space portion being formed between the multiple second structures.

19. The electronic apparatus according to claim 13, wherein the electrode substrate further includes multiple detection portions, each of the multiple detection portions being formed in each of intersection regions of the multiple first electrode wires and the multiple second electrode wires and having a capacitance variable in accordance with a relative distance from each of the first conductive layer and the second conductive layer.

20. The electronic apparatus according to claim 13, further comprising:
an electromagnetic shield configured to suppress intrusion of electromagnetic waves from outside the electrode substrate,
wherein the multiple first electrode wires are connected to a ground.

* * * * *